US008036817B2

(12) United States Patent
Ota et al.

(10) Patent No.: US 8,036,817 B2
(45) Date of Patent: Oct. 11, 2011

(54) METHOD OF STARTING SPARK IGNITION ENGINE WITHOUT USING STARTER MOTOR

(75) Inventors: Noriyuki Ota, Hiroshima (JP); Masahiko Fujimoto, Hiroshima (JP); Yasushi Murakami, Hiroshima (JP); Keiji Araki, Hatsukaichi (JP); Kazuya Yokota, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 216 days.

(21) Appl. No.: 12/323,343

(22) Filed: Nov. 25, 2008

(65) Prior Publication Data
US 2009/0088958 A1 Apr. 2, 2009

Related U.S. Application Data

(63) Continuation of application No. 11/533,040, filed on Sep. 19, 2006, now Pat. No. 7,461,621.

(30) Foreign Application Priority Data

Sep. 22, 2005 (JP) .................. 2005-276266
Sep. 30, 2005 (JP) .................. 2005-286387
Sep. 30, 2005 (JP) .................. 2005-287068
Sep. 30, 2005 (JP) .................. 2005-287069

(51) Int. Cl.
*F02D 41/06* (2006.01)
(52) U.S. Cl. .................. 701/113; 123/179.16
(58) Field of Classification Search .............. 123/179.4, 123/179.5, 198 DB; 701/112, 113
See application file for complete search history.

(56) References Cited

U.S. PATENT DOCUMENTS

| 6,588,397 | B1 * | 7/2003 | Sieber | 123/179.5 |
| 6,772,723 | B2 * | 8/2004 | Aoki et al. | 123/179.4 |
| 6,799,547 | B2 * | 10/2004 | Sieber | 123/179.5 |
| 6,834,632 | B2 * | 12/2004 | Kataoka et al. | 123/179.4 |
| 7,011,063 | B2 | 3/2006 | Condemine et al. | |
| 7,051,693 | B2 * | 5/2006 | Tetsuno et al. | 123/179.5 |
| 7,377,248 | B2 * | 5/2008 | Hokuto | 123/179.4 |

(Continued)

FOREIGN PATENT DOCUMENTS

DE 19527503 1/1997

(Continued)

OTHER PUBLICATIONS

European Patent Office, European Search Report of EP06019782, Apr. 18, 2008, 3 pages.

*Primary Examiner* — Stephen K Cronin
*Assistant Examiner* — Arnold Castro
(74) *Attorney, Agent, or Firm* — Alleman Hall McCoy Russell & Tuttle LLP

(57) ABSTRACT

There is provided a method for starting a spark ignition engine having multiple cylinders. The method may comprise supplying air and fuel for restart into a first cylinder before said engine completely stops, and igniting the mixture of said air and said fuel in said first cylinder in response to an engine restart request, wherein said first cylinder is on an expansion stroke when said engine stops. The method may also include, after said piston in said first cylinder starts moving, injecting fuel into a second cylinder that is on a compression stroke when said engine stops, on a compression stroke where a piston of said second cylinder is moving in a direction opposite to an operative direction of said piston in said first cylinder.

16 Claims, 30 Drawing Sheets

U.S. PATENT DOCUMENTS

| | | | |
|---|---|---|---|
| 7,438,042 B1* | 10/2008 | Kawada | 123/198 B |
| 7,461,621 B2* | 12/2008 | Ota et al. | 123/179.4 |
| 7,562,650 B2* | 7/2009 | Tabata et al. | 123/491 |
| 2002/0157630 A1* | 10/2002 | Gerhard et al. | 123/179.5 |
| 2003/0041830 A1* | 3/2003 | Sugiura et al. | 123/179.4 |
| 2003/0101956 A1* | 6/2003 | Sieber | 123/179.5 |
| 2003/0140881 A1* | 7/2003 | Makajima et al. | 123/179.3 |
| 2004/0200448 A1 | 10/2004 | Kojima et al. | |
| 2005/0081828 A1 | 4/2005 | Toth | |
| 2005/0109302 A1* | 5/2005 | Tetsuno et al. | 123/179.5 |
| 2005/0199209 A1* | 9/2005 | Shimokawa et al. | 123/179.4 |
| 2005/0211194 A1* | 9/2005 | Hanson et al. | 123/179.5 |
| 2005/0221952 A1* | 10/2005 | Tetsuno et al. | 123/179.5 |
| 2006/0016413 A1* | 1/2006 | Satake et al. | 123/179.4 |
| 2006/0090721 A1* | 5/2006 | Brehob et al. | 123/179.5 |
| 2007/0062476 A1* | 3/2007 | Ota et al. | 123/179.4 |
| 2007/0131188 A1* | 6/2007 | Hokuto | 123/179.4 |
| 2007/0204827 A1* | 9/2007 | Kishibata et al. | 123/179.5 |
| 2008/0103683 A1* | 5/2008 | Tabata et al. | 701/112 |
| 2008/0105230 A1* | 5/2008 | Kishibata et al. | 123/179.5 |

FOREIGN PATENT DOCUMENTS

| | | |
|---|---|---|
| DE | 10328123 | 1/2004 |
| DE | 10351891 | 6/2005 |
| EP | 1403511 | 3/2004 |
| EP | 1533501 | 5/2005 |
| EP | 1544456 | 6/2005 |
| JP | 2004-124753 A | 4/2004 |
| JP | 2004263569 A | 9/2004 |
| JP | 2004/324479 | 11/2004 |
| JP | 2005/090498 | 4/2005 |
| WO | 03/012273 | 2/2003 |

* cited by examiner (A)

Cylinder #1 in Compression Stroke

Cylinder #2 in Expansion Stroke (B)

Piston Stop Position (Crank Angle Degree)

METHOD OF STARTING SPARK IGNITION ENGINE WITHOUT USING STARTER MOTOR

CROSS REFERENCE TO RELATED APPLICATIONS

The present application is a continuation of U.S. Ser. No. 11/533,040, titled "Method of Starting Spark Ignition Engine without Using Starter Motor", filed Sep. 19, 2006, the entire contents of which are incorporated herein by reference.

BACKGROUND

The present description relates to a method of starting an internal combustion engine, more particularly to a method of starting a spark ignition engine without using a starter motor.

In recent years, to improve fuel economy of vehicle engines, particularly for city driving, there has been the development of so called idle stop control. This method automatically stops the vehicle's engine when stop conditions are met, for example when the vehicle is stopping at a traffic light. The engine is automatically restarted when a restart condition is met or upon a restart request, such as when the driver operates the accelerator pedal for the vehicle launch from the traffic light.

A method of the idle stop control is presented such as in European Patent Application publications EP1403511A1 and EP1544456A2. This method does not use a conventional electric starter for automatically restarting the engine because of starter motor durability concerns and because electric power consumption may be excessive due to the potential frequent use of the electric starter during idle stop control. Instead, the method first injects fuel directly in a cylinder, which is on the compression stroke when the engine stops and is referred to as "compression stroke cylinder". Then, it ignites the mixture of air and fuel in the compression stroke cylinder. As a result, combustion of the ignited mixture generates higher pressure in the compression stroke cylinder and, moves the piston downward. The downward movement of the piston moves the crankshaft in reverse direction for a short interval, because the piston is in the compression stroke and it is supposed to move upward during four cycle engine operation.

The reverse rotation of the crankshaft causes movement of pistons in other cylinders as well. A piston in a cylinder, which is on the expansion stroke when the engine stops and is referred to as "expansion stroke cylinder", is moved upward by the reverse rotation of the crankshaft. The upward moving piston compresses the air in the expansion stroke cylinder. Then, fuel is directly injected in the expansion stroke cylinder and, the mixture is ignited and combusted to generate a higher pressure in the expansion stroke cylinder. The higher pressure pushes down the piston to move the crankshaft in the forward direction, thereby initiating the forward or normal rotation of the crankshaft. Movement of the piston also causes the other pistons to move because the pistons are linked together through the crankshaft. The piston in the compression stroke cylinder ascends and approaches the compression top dead center (hereafter referred to as "first compression top dead center"). Then, generally, the mixture in the compression stroke cylinder is already combusted or used up and does not make energy to crank the crankshaft. So, a cylinder that makes torque after the expansion stroke cylinder is a cylinder that is on the intake stroke when the engine stops and is therefore referred to as "intake stroke cylinder".

As the crankshaft continues to rotate, a piston in the intake stroke cylinder now moves into the compression stroke from the intake stroke. The molar mass of air contained in the intake stroke cylinder is close to the molar mass of air that the cylinder contained when the piston passed through bottom-dead-center, cylinder pressure was near intake manifold pressure, and when the cylinder volume was greatest. On the other hand, the compression stroke cylinder and the expansion stroke cylinder contained less air molar mass than some other cylinders, because some air may leak from the cylinder over time during the engine stop due to the pressure difference between the inside and outside of the cylinder. Then, the piston in the intake stroke cylinder compresses the full molar mass of the air and the cylinder pressure therein rises, as the crank shaft rotates forward on the inertia exerted by the combustion in the expansion stroke cylinder. When the piston in the intake stroke cylinder approaches the compression top dead center (hereafter referred to as "second top dead center), the pressure in the intake stroke cylinder might be so high that the piston does not pass the second compression top dead center. If the piston passes the second compression top dead center, the mixture in the intake stroke cylinder may be ignited and combustion may generate enough energy for subsequent continuous rotation of the crankshaft. So, for an engine restart, it is desirable that the rotational inertia on the crankshaft overcomes the counterforce exerted by the pressure in the intake stroke cylinder at the second top dead center.

To increase the inertia of the crankshaft at the second compression top dead center, the EP1403511 publication presents a method of combusting air and fuel mixture in the compression stroke cylinder following the first combustion in the expansion stroke cylinder. Specifically, it leaves some fresh air in the compression stroke cylinder after the combustion for the reverse rotation by setting the initial air fuel ratio lean of the stoichiometry and injects additional fuel afterwards. Then, the mixture is of remaining air and the additional fuel just is ignited just after the first compression top dead center, thereby deriving additional energy to crank the engine from the compression stroke cylinder. Alternatively, the '511 publication presents a method to open the intake valve of the compression stroke cylinder at the late stage of the reverse rotation and close it at the early stage of the forward rotation so that some fresh air is inducted into the compression stroke cylinder. The mixture of newly inducted air and remaining or newly injected fuel in the compression stroke cylinder can be ignited after the top dead center, thereby deriving the additional energy to crank the engine from the compression stroke cylinder to increase the inertia of the crankshaft at the second top dead center.

For the same purpose, the EP1544456A2 publication presents a method of reducing pressure in the compression stroke cylinder at the first compression top dead center to reduce the counterforce acting against the inertia of the crankshaft. Specifically, it injects additional fuel into the compression stroke cylinder after the combustion for the reverse rotation in the compression stroke cylinder so that evaporative latent heat of the additional fuel cools down the combusted gas and decreases the pressure in the compression stroke cylinder. The decrease of the pressure in the compression stroke cylinder leads to a decrease of the counterforce acting against the inertia of the crankshaft.

Although the above prior methods may improve the success rate of the engine starting, the inventors herein have recognized that there is still need to increase the rotational inertia of the crankshaft at the second top dead center for a more reliable engine restart, more specifically there is still room to increase the torque exerted by a first combustion after a restart request.

SUMMARY

Accordingly, there is provided, in one aspect of the present description, a method of starting a spark ignition engine having multiple cylinders. The method comprises supplying air and fuel for restart into a first cylinder before the engine completely stops, and igniting the mixture of the air and the fuel in the first cylinder in response to an engine start request.

In accordance with the method, by supplying air and fuel into the first cylinder before the engine completely stops, the mixture of air and fuel in the first cylinder may be homogeneous at the time of the engine start request. Also, there may be less mixture turbulence and combustion may propagate better within the cylinder. These conditions may reduce the rate of combustion in the first cylinder after a start request is initiated. The slower combustion rate may decrease temperature of the combusted gas while the cylinder wall temperature is relatively low because the engine has stopped. As a result, the slower combustion may reduce heat loss in the first cylinder because of the smaller difference between the temperatures of the combusted gas and the cylinder wall. Consequently, more energy may be directed from the first cylinder to the crankshaft. Then if the first cylinder is on the compression stroke when the engine stops, as the compression stroke cylinder described above, the crankshaft may rotate more in reverse so that the expansion stroke cylinder described above may ascend more and compress more air therein and exert more reaction force from the compression. It also may combust greater molar mass of air in the cylinder and may generate more combustion energy from the expansion stroke cylinder. Consequently, the additional compressive reaction force and the additional combustion energy may work together to increase the inertia of the crankshaft at the second top dead center of the engine, so that the engine restart becomes more reliable.

In an embodiment, the restart fuel may be injected after a last exhaust stroke before the engine stops. Therefore, the fuel may be prevented from flowing out of the first cylinder. If the restart fuel is injected in a last intake stroke before the engine stops, the fuel may be mixed well with the air inducted into the first cylinder so that the rate of combustion during a subsequent restart is reduced.

In an embodiment, the engine may be controlled to stop the piston of the first cylinder at more than 90° crank angle above the bottom dead center when the engine stops. Therefore, the piston of the first cylinder may descend for more distance and may transmit more energy derived from the slower combustion to the crankshaft. If the first cylinder is the compression stroke cylinder described above, additional fuel may be injected into the first cylinder after a last bottom-dead-center before the engine stops, so that evaporative latent heat of the additional fuel may reduce the pressure in the cylinder and pull up the piston position at the engine stopping for the more distance of the piston descend in the first cylinder.

In an embodiment, additional fuel may be injected into the first cylinder in response to the restart request in accordance with a certain condition, for example, if certain time period has passed since the injection of the restart fuel. Thereby, the mixture which was formed before the engine stops may be prevented at the time of restart from being diluted too much to be ignited.

In an embodiment, the combustion in the first cylinder, such as the compression stroke cylinder described above, may cause reverse rotation of the engine, and a valve for the first cylinder, such as an intake valve, may be opened during the reverse rotation of the engine. Thereafter, mixture of air and fuel in a second cylinder, such as the expansion stroke cylinder described above, may be ignited, thereby rotating the engine forward. Then, the valve for the first cylinder may be closed and the compressed mixture may be ignited again for the forward rotation. Consequently, the mixture in the first cylinder may contain some fresh air inducted while the valve is opened and may be used for the forward rotation in addition to the reverse rotation, so that the rotational inertia of the crankshaft at the second compression top dead center of the engine may be significantly increased. In this embodiment, additional fuel, may be injected when the valve is opened, so that the additional fuel may be well mixed with the fresh air. Considering mass of the fresh air in this instance, mass of the additional fuel may be less than mass of fuel injected before the engine completely stops.

In an embodiment, the first cylinder may be on an expansion stroke when the engine stops, as the expansion stroke cylinder described above. The crankshaft may be rotated forward by igniting the mixture in response to the start request so that more energy may be derived from the expansion stroke cylinder to the crankshaft.

In a second aspect of the present description, there is provided a method comprising combusting mixture of air and fuel in a first cylinder to rotate the engine in reverse in response to an engine start request, thereby compressing air in a second cylinder, and combusting mixture of the compressed air and fuel in the second cylinder to rotate the engine in forward, the combustion in the second cylinder being faster than that in the first cylinder.

In accordance with the method, the combustion in the second cylinder such as the expansion stroke cylinder described above to rotate the engine in forward is faster than the combustion in the first cylinder such as the compression stroke cylinder described above to rotate the engine in reverse. In other words, the rate of combustion in the first cylinder is slower than that in the second cylinder. The slower combustion rate may derive more energy from the first cylinder to the crankshaft, as described above. By rotating the engine in reverse with the more energy, the air in the second cylinder may be more compressed, so that more compressive reaction force against the piston of the second cylinder may be exerted. This reaction force may accelerate the forward rotation of the engine, while there was no such a force for the reverse rotation at the first cylinder. Therefore, optimal time period for combustion of the second cylinder, which is between the reversal of the rotation and the bottom dead center of the second cylinder, may be shorter than that of the first cylinder. In this regard, the faster combustion is made in the second cylinder so that it may be completed within the shorter time period for combustion, thereby reducing loss of heat which the slower combustion could increase if the combustion occurred after the bottom dead center of the second cylinder. Consequently, the additional reaction force and the additional combustion energy may be exerted at the second cylinder for the forward rotation and eventually may turn into more rotational inertia at the second top dead center of the engine, so that the engine restart becomes more reliable.

In an embodiment, a time difference between the fuel injection and the ignition for the first cylinder may be longer than that for the second cylinder, so that the mixture in the second cylinder may be more stratified than the mixture in the first cylinder and the combustion in the second cylinder may be faster. In another embodiment, the mixture in the first cylinder may be ignited with a single spark, while the mixture in the second cylinder may be ignited with simultaneous multipoint sparks, so that the combustion in the second cylinder may be faster due to multipoint flame propagations.

In a third aspect of the present description, there is provided a method comprising combusting mixture of air and fuel in a first cylinder for reverse rotation of the engine in response to an engine start request, thereby compressing air in a second cylinder, injecting fuel for forward rotation of the engine into the second cylinder during the reverse rotation of the engine, thereby causing turbulence of mixture of air and fuel in the second cylinder, and igniting the mixture of air and fuel in the second cylinder by the time when the turbulence of mixture is substantially diminished in the second cylinder.

In accordance with the method, the engine is rotated in reverse by the combustion in the first cylinder, thereby compressing the air in the second cylinder. As described above, the time period for combustion in the second cylinder is shorter than that for the first cylinder, because of the compressive reaction force against the piston in the second cylinder and the acceleration of the forward rotation by the compression reaction force. By igniting the mixture in the second cylinder by the time when the turbulence of mixture is substantially diminished in the second cylinder, the mixture with some turbulence may be ignited so that the flame propagation may be faster and the combustion may be fast enough to finish within the time period for combustion in the second cylinder, thereby reducing loss of heat which the slower combustion could increase if the combustion occurred after the bottom dead center of the second cylinder. Consequently, the additional reaction force and the additional combustion energy may be exerted at the second cylinder for the forward rotation and eventually may turn into more rotational inertia at the second top dead center of the engine, so that the engine restart becomes more reliable.

In an embodiment, the fuel may be injected into the second cylinder with higher pressure, such as 4 MPa, and may comprise first and second parts of the injection, the first part being injected before 90° crank angle after bottom dead center during the reverse rotation of the engine and the second part being injected after the first part, for example 75 ms or 10° crank angle before the reversal of the rotation of the engine, so that the first part may be injected relatively early and the fuel may be well mixed with air at the time of the second part being injected. Therefore, the combustion may be completed within the time period for combustion in the second cylinder because of the faster combustion accelerated by the turbulence caused by the second part of the fuel injected later and remaining at the time of ignition, while more fuel may be combusted thanks to the first par of fuel injected earlier. Consequently, more energy can be derived from the second cylinder

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

The embodiments of the present description will now be described with reference to the drawings, starting with FIG. 1, which shows an overview of an engine system of an internal combustion engine 1. In the embodiments, the engine 1 is onboard of an automotive vehicle and drives wheels of the vehicle through a drive-train including a transmission, as is well known in the art.

Figure 1:
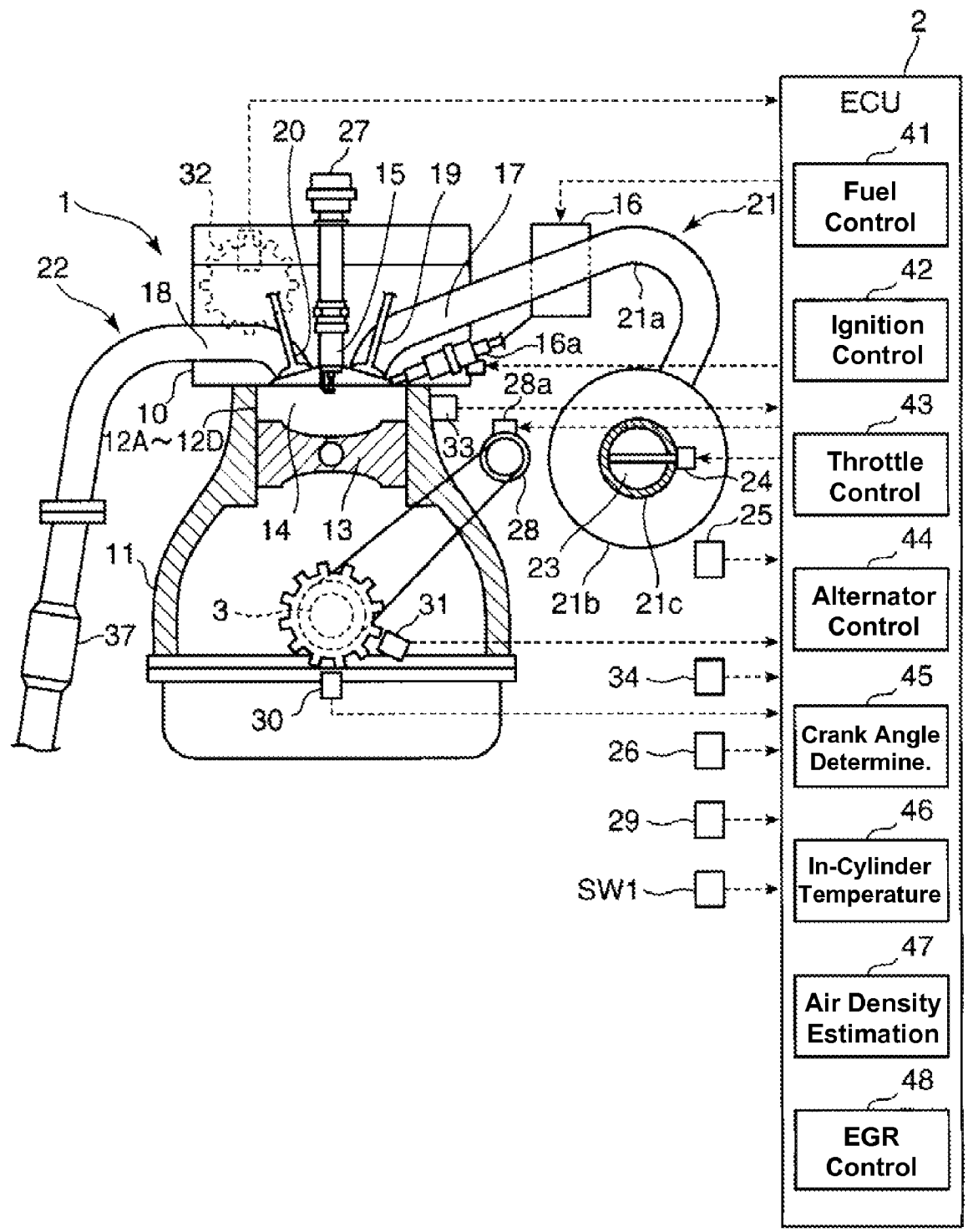
FIG. 1 is a schematic diagram of an engine system according to embodiments of the present description.

In the embodiment of FIG. 1, the engine 1 is a direct injection spark ignition engine, although a port injection type spark ignition engine may be employed. The engine 1 comprises a cylinder head 10 and a cylinder block 11 to form four cylinders 12A-12D therein, although only one cylinder is shown in FIG. 1. A piston 13 is arranged is inserted to the cylinder 12 to form a combustion chamber 14 and connected to a crankshaft 3, as is well known in the art. An engine control unit (ECU) 2 controls various actuators of the engine 2 based on various signals from sensors detecting engine operating conditions. The ECU 2 is a microcomputer based controller which comprises a memory storing computer program and data, a microprocessor executing the computer program and data, and input and output (I/O) busses inputting and outputting the signals, as is well known in the art. There are a fuel control section 41 and other sections shown within the ECU 2. In this embodiment, those sections are not physically separated but integrated in the computer program stored in the ECU 2, although some of the sections may be physically separated from the rest of the sections, for example, by using two microcomputers or more for the ECU 2.

A spark plug 15 is arranged at the top of the combustion chamber with its electrode located in the combustion chamber 14. The spark plug 15 is made to spark by an ignition device 27 well known in the art, which is controlled by an ignition control section 42 of the ECU 2 so as to set proper ignition timing for each of the cylinders 12A-12D.

A fuel supply system 16 supplies fuel to the engine 1. Fuel that may be used in the fuel supply system 16 includes gasoline, ethanol, hydrogen, any other fuel suitable for spark ignition and mix of them. The fuel supply system 16 includes a fuel injector 16a which is arranged at a side of the combustion chamber 14 on the cylinder head 10 to directly inject fuel into the combustion chamber 14. The fuel supply system 16 also includes high pressure fuel pump not shown. The fuel pump supplies fuel from a fuel tank through a fuel delivery pipe to the injector 16b with a higher pressure. The fuel control section 41 of the ECU 2 may control the pressure of the fuel pump for example between 3 and 13 MPa.

The fuel injector 16a includes therein a needle valve and a solenoid to drive the needle valve. The solenoid is exerted to open the needle valve for a time period corresponding to a pulse width of a pulse signal input from the fuel control section 41 of the ECU 2. While the needle valve is open, fuel is injected toward proximity of the electrode of the spark plug 15 in the combustion chamber 14. The fuel injector 16a has a plurality of injection holes, and is of a so called multiple hole type.

Figure 2:
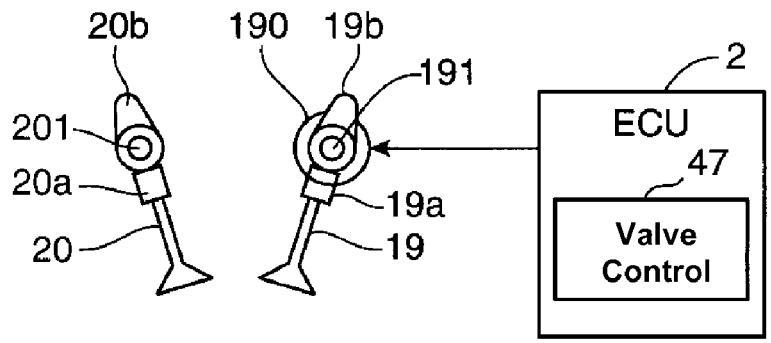
FIG. 2 is a schematic diagram of a variable system according to the embodiments.

There are arranged at the cylinder head 10, an intake port 17 and an exhaust port 18 opening into the combustion chamber 14. open and close the intake port 17 and the exhaust port 18 are respectively opened and closed by an intake valve 19 and an exhaust valve 20 which are driven by a valve driving mechanism. FIG. 2 shows an example of the valve driving mechanism. The intake valve 19 is reciprocally actuated by a tappet 19a which is arranged above the valve stem. The tappet 19a is contacted and pushed by an intake cam 19b which is formed with and rotationally driven by an intake camshaft 191. Likewise, the exhaust valve 20 is reciprocally actuated by a tappet 20a which is contacted and pushed by an exhaust cam 20b formed with an exhaust cam shaft 201. The camshafts 191 and 201 are connected to and rotationally driven by the crankshaft 3 through a chain or belt, as is well known in the art. In this embodiment for the four cylinder four cylinder engine, all of the four cylinders 12A through 12D have the same valves 19 and 20 associated with the camshafts 191 and 201. Engine cycles take place sequentially in the order of the first cylinder 12A, the third cylinder 12C, the fourth cylinder 12D and the second cylinder 12B (see FIG. 3 for a physical arrangement of the cylinders within the cylinder block 11) with a phase difference of 180 degree crank angle (° CA), as is common in the four cycle four cylinder engines.

In this embodiment, there is provided a variable valve mechanism 190 for the intake cam shaft 191. The variable valve mechanism 190 is controlled by a valve control section 49 of the ECU 2 to change a phase of the intake camshaft 191 so that open and closing timing of the intake valve 19 thereby achieving valve timing (VVT) function. Although the VVT function is only available for the intake valve 19, the exhaust valve 20 may be provided with it. Further, in addition to the VVT function, variable valve lift (VVL) function may be provided for either of the intake valve 19 and the exhaust valve 20 by a VVL mechanism which may vary, preferably, continuously a valve lift, preferably, from zero to a maximum stroke defined by a cam profile. Further, the valve driving mechanism and the variable valve mechanism for either of the intake valve 19 and the exhaust valve 20 may be substituted with an electromagnetic or electro-hydraulic valve drive mechanism or other valve mechanism which may open and close the valve free of correlation with a rotational angle or phase of the crankshaft 3.

Figure 3:
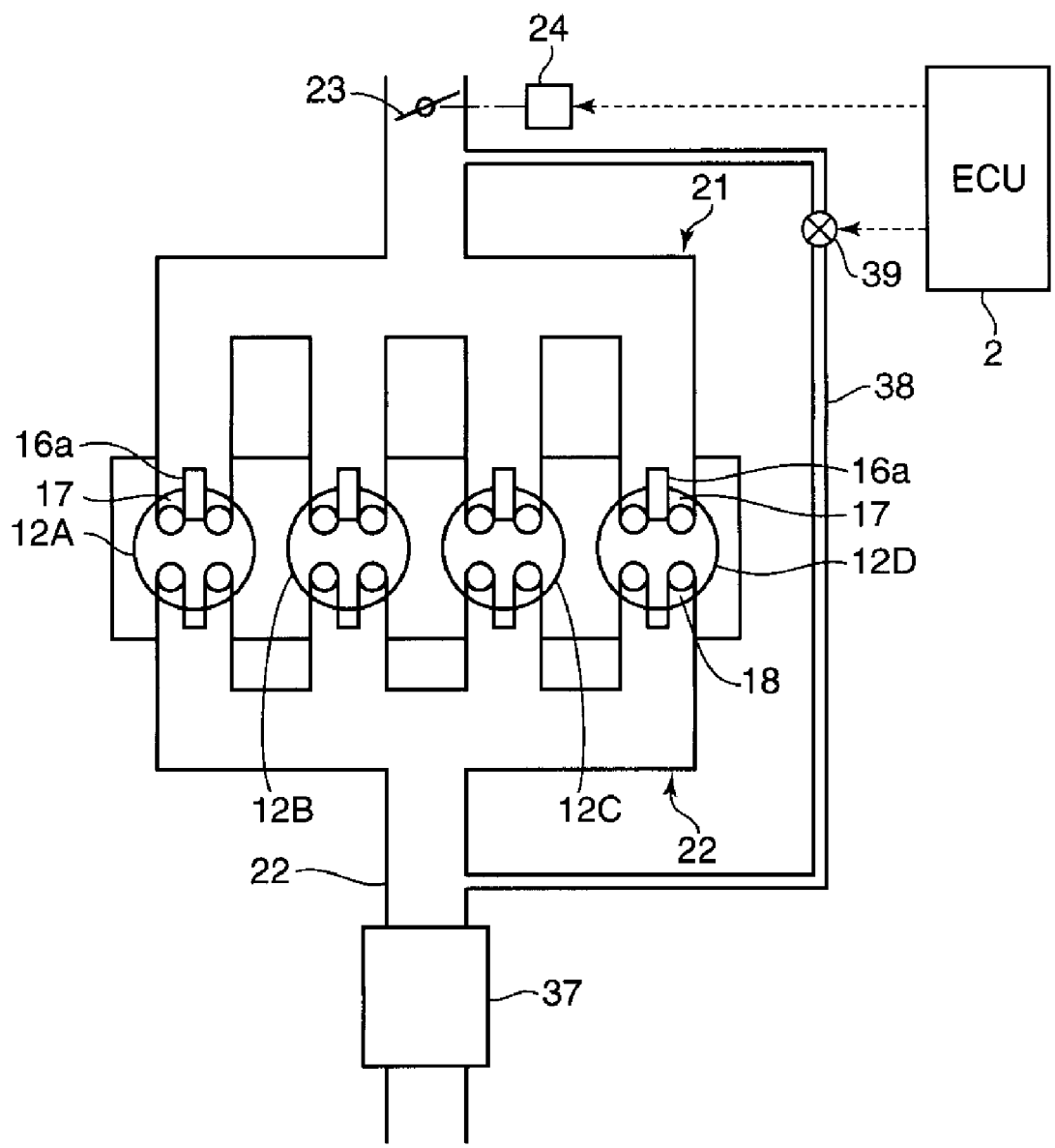
FIG. 3 is another schematic diagram of the engine system showing an exhaust recirculation passage according to the present embodiments.

As shown in FIG. 3, an intake passage 21 and an exhaust passage 22 are respectively connected to the intake ports 17 and the exhaust ports 18. The intake passage 21 consists of a surge tank 21a at its upstream side, branch passages 21b communicating between the surge tank 21a and the respective intake ports 17 and a common intake passage 21c upstream of the surge tank 21b. A throttle valve 23 is arranged in the common intake passage 21c and actuated by an actuator 24, for example, an electric motor, which changes an opening of the throttle valve 23 according to a control signal computed by a throttle control section 43 of the ECU 2. When stopping the engine, a change of opening of the throttle valve 23 may correspond to an individual air amount or mass within a particular cylinder, particularly just before a complete stop of the engine 1. That eventually may affect a stop position of the engine or a position of the piston 13 when the engine stops, as a result of a difference of the individual air amount within the individual cylinders.

Along the intake passage 21, there are arranged an airflow sensor 25 detecting intake airflow, an intake air temperature sensor 29 detecting a temperature of the intake air and an ambient pressure sensor SW1 detecting a pressure of the atmosphere upstream of the throttle valve 23, and an intake air pressure sensor 26 downstream of the throttle valve 23, all of which output signals to the ECU 2, while these sensors are not shown in FIG. 3, but only in FIG. 1.

As shown in FIGS. 1 and 3, downstream of a converging portion of the exhaust passage 22, there is arranged a catalyst converter 37 for purifying the exhaust gas. The catalyst 37 may comprise, in its can, a so called three way catalyst (TWC) which has higher purification ratios of HC, CO and NOx when an air fuel ratio of the exhaust gas is near the stoichiometry and has an oxygen storage capacity to adsorb oxygen in an oxygen excess atmosphere where an oxygen concentration in the exhaust gas is higher than the stoichiometry and releases the adsorbed oxygen to react it with HC, CO when the oxygen concentration is lower than the stoichiometry. The catalyst is not limited to TWC, but it may be one having the oxygen storage capacity and, for example, may be a so called lean NOx catalyst which can purify NOx in an excess oxygen atmosphere.

As shown in FIG. 3, there is arranged an exhaust gas recirculation (EGR) passage 38 which communicates between the intake passage 21 downstream of the throttle valve 23 and the exhaust passage 22 upstream of the catalyst converter 37 for re-circulating the exhaust gas to the engine 1. In the EGR passage 38, there is arranged an EGR valve 39 which is controlled by an EGR control section 48 of the ECU 2 to regulate an amount of the re-circulated exhaust gas.

Referring back to FIG. 1, there is provided an alternator 28 which is connected through a belt to and driven by the crankshaft 3 to generate electricity while the engine 1 is running. The alternator 28 has a regulator circuit 28a which adjusts an electric generation amount by adjusting a field current to a field coil of the alternator 28, as is known in the art. The regulator circuit 28a is controlled by a signal from an alternator control section 44 of the ECU 2 to adjust the field current. The alternator control section 44 computes the signal to the regulator circuit based on various operating conditions such as electric load of the vehicle and a voltage of a battery onboard. Further it may change the load on the engine 1 by varying the field current of the alternator 28. As a result, it may help to stop the engine 1 at a desired position or prevent too much spin up of the engine just after an engine start.

There is arranged a cam angle sensor 32 around a wheel which is affixed to and rotates with the exhaust camshaft 201 and has one tooth at its periphery. The cam angle sensor 32 outputs a signal to the ECU 2. The cam angle signal gives a falling or rising edge as a rotational reference signal once per rotation of the camshaft 191 or 201 or two rotations of the crankshaft 3 which is 720° CA. Around a wheel which is affixed to and rotates with the crankshaft 3 and has equally spaced tooth at its periphery, there are arranged two crank angle sensors 30 and 31 which detect change of magnetic field depending on the rotation of the tooth wheel and output crank angle signals CA1 and CA2 respectively to the ECU 2. The ECU 2 may compute an engine speed $N_E$ by counting number of edges of either of the rotational reference signal and the crank angle signal CA1 or CA2 per unit of time, although the crank angle signal is more accurate because of more number of teeth the tooth wheel has. In addition to the engine speed $N_E$, the ECU 2, specifically a crank angle computation section 45 therein, may compute an angular position of the crankshaft 3 or a position of each of the pistons 13 in the first through fourth cylinders 12A through 12D based on the rotational reference signal and the crank angle signal CA1 or CA2 by counting number of edges from the crank angle signal since a last edge of the rotational reference signal, as is known in the art.

Figure 4:
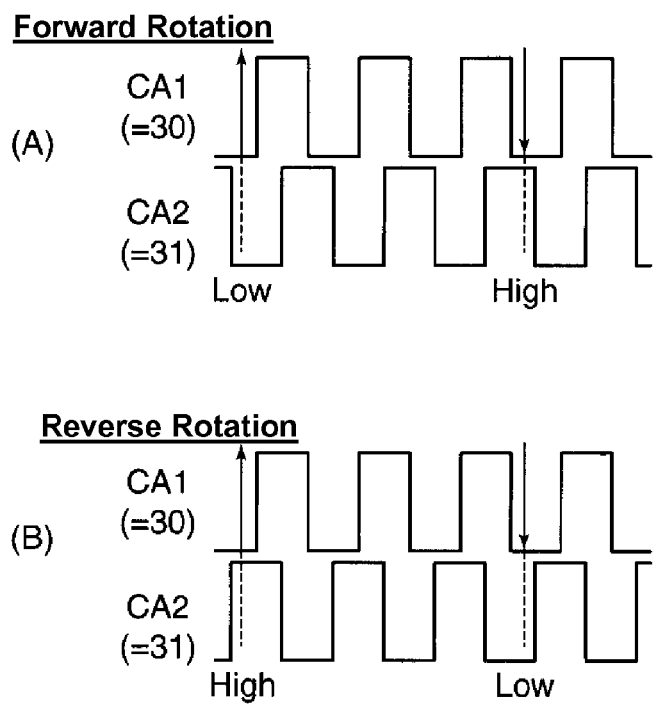
FIG. 4 is a diagram showing changes of crank angle sensor signals according to the embodiments.

Further in the present embodiment, a crank angle determination section 45 of the ECU 2 can compute a position of the piston 13, not only during normal rotation of the engine 1, but also when the engine 1 stops, reverses or repeats forward and reverse rotation, using the two crank angle sensors 30 and 31. They are so arranged around the tooth wheel that the crank angle signals CA1 and CA2 have a phase difference, for example by a half of the pulse width, as shown in FIG. 4. Based on a difference between the crank angle signals CA1 and CA2 during a forward rotation of the crankshaft 2 shown in FIG. 4(A) and during a reverse rotation in FIG. 4(B), the ECU 2 can determine a rotational direction of the crankshaft 2.

Figure 5:
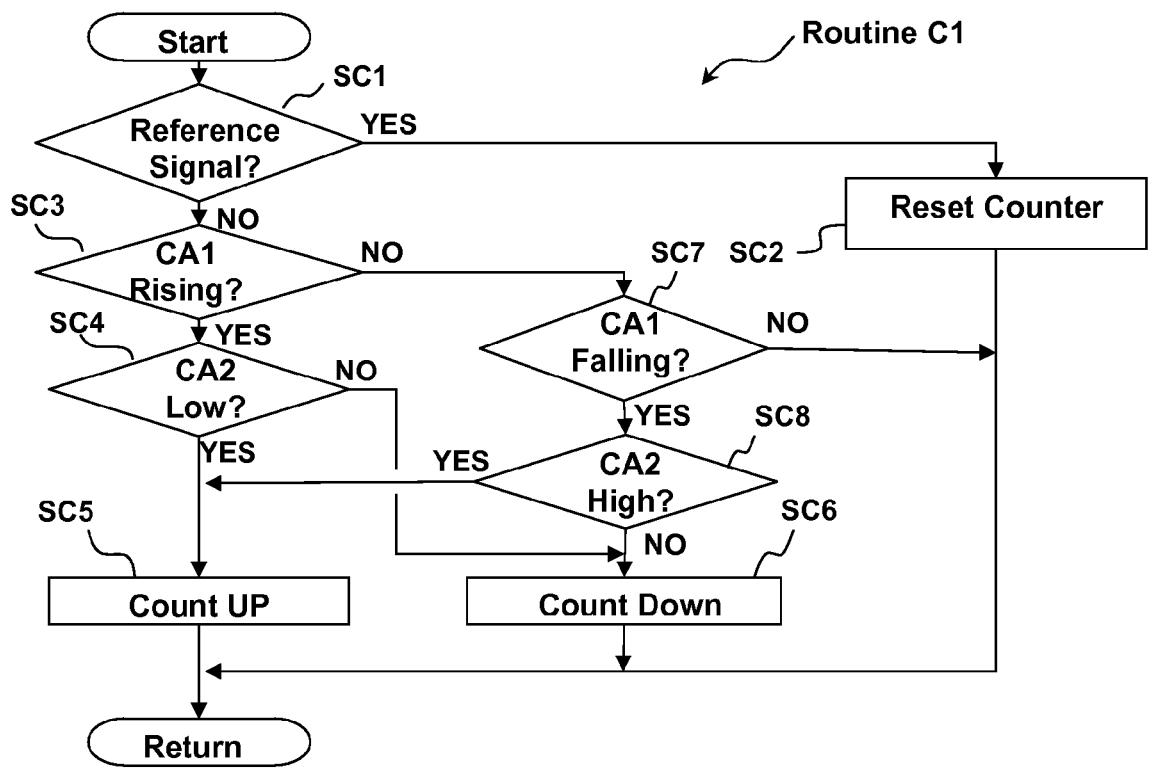
FIG. 5 is a flowchart showing a control routine for detecting a position of a piston or a crankshaft of the engine according to the embodiments.

Specifically, a flowchart of FIG. 5 shows a crank angle determination routine C run by the crank angle determination section 45 of the ECU 2. After the start, the routine proceeds to a step SP1 where it is determined whether a reference signal from the cam angle sensor 32 is detected or not. If it is detected that at the step SC1, the routine proceeds to a step SC2, where a crank angle counter CA in the crank angle determination section 45 is reset to be zero. If the reference signal is not detected at the step SC1, the routine proceeds to a step SC3 where it is determined whether a rising edge of the crank angle signal CA1 is detected or not. If a rising edge of CA1 is detected (YES) at the step SC3, the routine proceeds to a step SC4. There it is determined whether the crank angle signal CA2 is low or not. If the CA2 is low (YES) at the step SC4, it means that the crankshaft 3 is in a forward rotation as can be seen in FIG. 4(A). Then, the routine proceeds to a step SC5 where the counter CA that is initially zero at the step SC2 is counted up by one. On the other hand, if the CA2 is high (NO) at the step SC4, it means that the crankshaft 3 is in a reverse rotation as can be seen in FIG. 4(B). In this case, the routine proceeds to a step SC6 and counts down the counter CA by one.

If a rising edge of CA1 is not detected at the step SP4, the routine proceeds to a step PP7 and determines whether a falling edge of CA1 is detected. If it is not detected, the routine returns to the step SP3 and waits for a rising edge of CA1. If the falling edge of CA1 is detected, the routine proceeds to a step SP8 and determines whether or not the signal CA2 is high. If the CA2 is high (YES) at the step SP8, it means that the crankshaft 3 is in a forward rotation as can be seen in FIG. 4(A). Then the routine proceeds to the step SP5 and counts up the counter CA by one. If the CA2 is low (NO) at the step SP8, it means that the crankshaft 3 is in a reverse rotation as can be seen in FIG. 4(B) and the routine proceeds to the step SP6 and counts up the counter CA by one.

After the step SP5 or SP6, the routine proceeds to a step SP9 and reads out a count number from the counter CA. The count number shows number of rising and falling edges of the crank angle signal CA1 which corresponds to number of tooth of the tooth wheel of the crankshaft 3 from the reference rotational position of the engine 1 that is derived from the reference signal from the cam angle sensor 32. Eventually, the count number shows an absolute angular position CA of the crankshaft 3. Consequently, an angular position of the crankshaft 3 or a piston position can be determined even after repeated back and forth movements of the crankshaft 3 just before the engine completely stops.

Referring back to FIG. 1, there are provided an engine temperature sensor 33 which detects a temperature of engine coolant in the cylinder block 11 and a driver operation sensor 34 which detects operations of a vehicle driver such as a position of an accelerator pedal, a position of a brake pedal or a gear position or shift range of the vehicle transmission. These sensors output signals to the ECU 2 as well.

There is also provided within the ECU 2 an in-cylinder temperature estimation section 46, which estimates air temperatures of the respective cylinders 12A-12D based on an engine temperature detected by the engine temperature sensor 33, an intake air temperature detected by the intake air temperature sensor 29 and others, using a map predetermined through an experiment. Particularly in this embodiment, when restarting the engine 1, the section 46 consider a time period of the engine 1 stopping for an in-cylinder temperature estimation at the time of restarting the engine 1.

Further there is provided within the ECU 2 an air density estimation section 47 which estimates an air density of the atmosphere based on intake air temperature sensor 29 and the ambient air pressure sensor SW1. The estimated air density may be used for determining engine control parameters at the time of restarting the engine 1.

Reverse Rotational Type of Idle Stop Control

Now, an operation of a reverse rotational type of idle stop control will be described. In this reverse rotational type, engine stop control attempts to stop the engine at an crank angle CA within a preferred stop range R which is described in greater detail later with reference to FIG. 15. At the time of restarting the engine 1, fuel may already exist in a cylinder which has stopped in its compression stroke (hereafter may be referred to as "compression stroke cylinder") and the number one cylinder (cylinder #1) in an example of FIG. 22. Then, a spark is made in the compression stroke cylinder, thereby initiating combustion. This combustion raises the cylinder pressure, pushes down the piston 13 of the compression stroke cylinder and rotates the crankshaft 3 in reverse.

Figure 22:
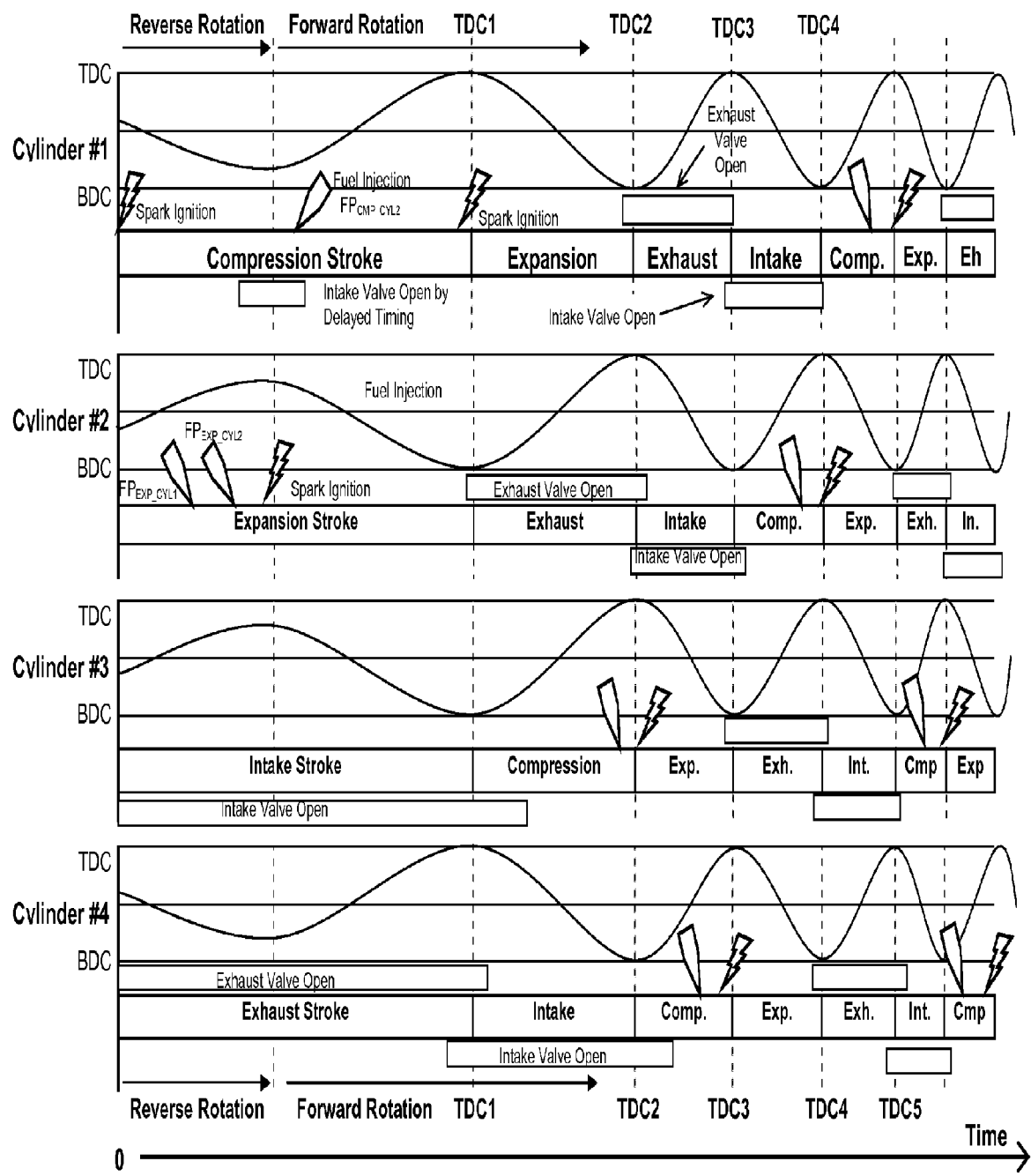
FIG. 22 is a diagram showing operations and changes of parameters of the engine system during the engine restart control according to the embodiment of the present description.

Then, the crankshaft 3 in the reverse rotation raises the piston 13 of a cylinder which has stopped in its expansion stroke (hereafter referred to as "expansion stroke cylinder") and the number two cylinder (cylinder #3) in the case of FIG. 22. The piston 13 of the expansion stroke cylinder compresses the air inside and receives a counterforce from the compressed air. This counterforce may help to reverse the rotation of the crankshaft 3. Before the reversal of the rotation or change of the rotational direction, fuel is injected into the expansion stroke cylinder, and then around the rotational reversal, a spark is made in the expansion stroke cylinder, thereby initiating combustion. This combustion accelerates the forward rotation of the crankshaft 2. This puts rotational inertia or energy to pass a first top dead center TDC1 and a second top dead center TDC2, because a next substantial combustion is made after the second top dead center in a cylinder which has stopped in its intake stroke and is the number three cylinder (cylinder #3) in the case of FIG. 22.

At first, the engine stop control part of the reverse rotational type of the idle stop control is described below, mainly with reference to flowcharts illustrated in FIGS. 6 through 12.

Engine Stop Control

The ECU 2 processes the engine stop control by running a computer program, which is stored in its memory, particularly control routines illustrated by the flowcharts of FIGS. 6 through 12. The engine stop control is comprised of first through seventh stages or seven control routines S1 through S7. The first stage in particular is a preliminary stage of the engine stop control.

Figure 6:
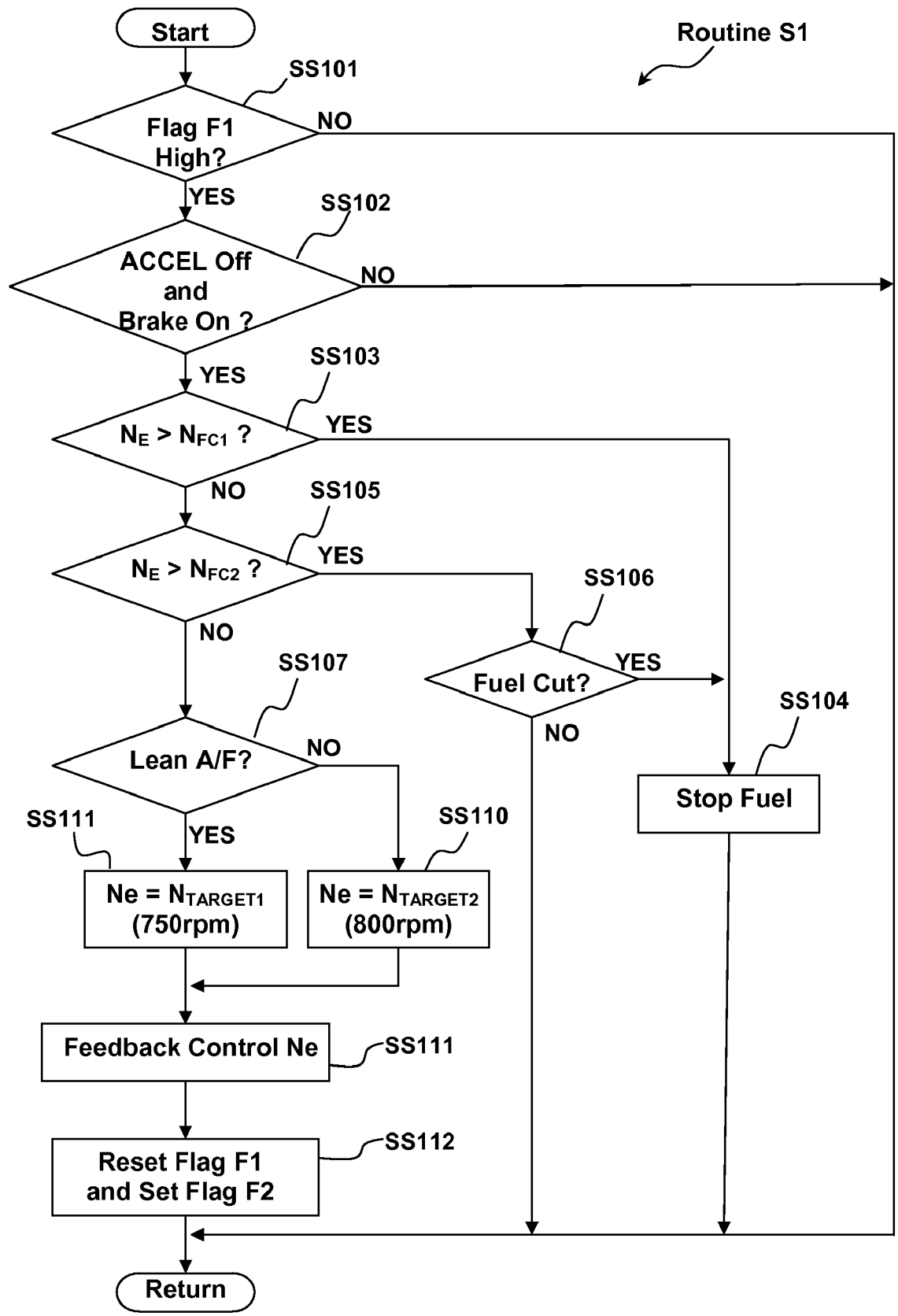
FIG. 6 is a flowchart showing a first stage of engine stop control of idle stop control of a reverse rotational type according to an embodiment of the present description.

After a start of the first stage or the routine S1 shown in FIG. 6, it determines at a step SS101 whether a flag F1 is High or not. The flag F1 is set High, when it is determined possible to initiate the first stage of the engine stop control or if several predetermined conditions are met. The conditions include that a speed of the vehicle is faster than a reference speed such as 10 km/h, that a steering angle of the vehicle is less than a reference angle, that a voltage of a vehicle battery is more than a reference voltage and that an air conditioner of the vehicle is OFF. All of these conditions are met, it can be determined that the engine stop can be desired and the engine 1 can be restarted. If the flag F1 is High, the routine determines at a step SS102 whether the accelerator pedal is fully released and the brake pedal is depressed more than a reference level or not from the driver operation sensor 34. If it is determined that the accelerator pedal is fully released and the brake pedal is depressed more than the reference level (YES) at the step SS102, which means that the engine 1 is in an engine deceleration condition and not in a coasting condition and that the vehicle is more likely to stop, the routine proceeds to a step SS103, and otherwise returns.

At the step SS103, the routine determines whether an engine speed $N_E$ is higher than a first reference engine speed for fuel cut ($N_{FC1}$), such as 1100 rpm. If it is determined that the engine speed $N_E$ is higher than the first reference value $N_{FC1}$ (YES) at the step SS103, it means the engine speed is relatively high in the deceleration condition and it is beneficial to cut off the fuel supply to the engine for a fuel economy improvement, and the routine proceeds to a step SS104 and stops the fuel supply as is known in the art, then returns. If it is determined that the engine speed $N_E$ is lower than the first reference value $N_{FC1}$ (NO) at the step SS103, the routine proceeds to a step SS105 and determines whether the engine speed $N_E$ is lower than a second reference engine speed for fuel cut ($N_{FC2}$), such as 900 rpm, or not. If it is determined that the engine speed $N_E$ is higher than the second reference speed $N_{FC2}$ (YES) at the step SS105, the routine proceeds to a step SS106 and determines whether the fuel is already cut off or not. If it is determined that the fuel is already cut off (YES) at the step SS106, the routines proceeds to the step SS104 and continues to stop the fuel supply, while if NO at the step SS106, the routine returns because a substantial fuel saving benefit can not be expected. If it is determined at the step SS105 that the engine speed Ne is lower than the second reference speed $N_{FC2}$, the routine does not cut off the fuel and proceeds to a step SS108.

At the step SS108, the routine determines whether a target air fuel ratio for the engine 1 is set substantially leaner than the stoichiometric air fuel ratio or not. If it is determined that the target air fuel ratio is leaner than the stoichiometry (YES) at the step SS108, the routine proceeds to a step SS109 and sets a first target speed of the engine 1 ($N_{TARGET1}$) substantially higher than a normal idle speed ($N_{IDLE}$), such as 650 rpm. The first target speed in this case may be for example 750 rpm. On the other hand, if it is determined at the step SS109 that the target air fuel ratio is the stoichiometry or richer than that, the routine proceeds to a step SS110 and sets a second target speed $N_{TARGET2}$ which is higher than the first target speed $N_{TARGET1}$ and may be for example 800 rpm. From either of the steps SS109 and SS110, the routine proceeds to a step SS111 and initiates a feed back control of the target engine speed adjusting the throttle opening K, the fuel injection amount FP or mass or duration of opening of the fuel injector 16a or the ignition timing. Then the routine proceeds to a step SS112 and sets the flag F1 to be High and a flag F2 to be Low. The flag F2 indicates readiness of executing the second stage of the engine stop control.

The engine idle speed is set higher than the normal idle speed at the step SS109 or SS110 and it is maintained at the step SS111. When the ECU 2 executes the second stage of the engine stop control afterward, the engine idle speed is relatively high and stable, so that more precise engine stop control can be made. Also it is not necessary to increase the engine speed from the normal speed for the more stable engine rotation after the vehicle really stops and requires the engine stop control, thereby reducing some discomfort of vehicle occupants and longer time period of the engine stop control which the increase of the engine speed for the longer gap may cause.

Figure 7:
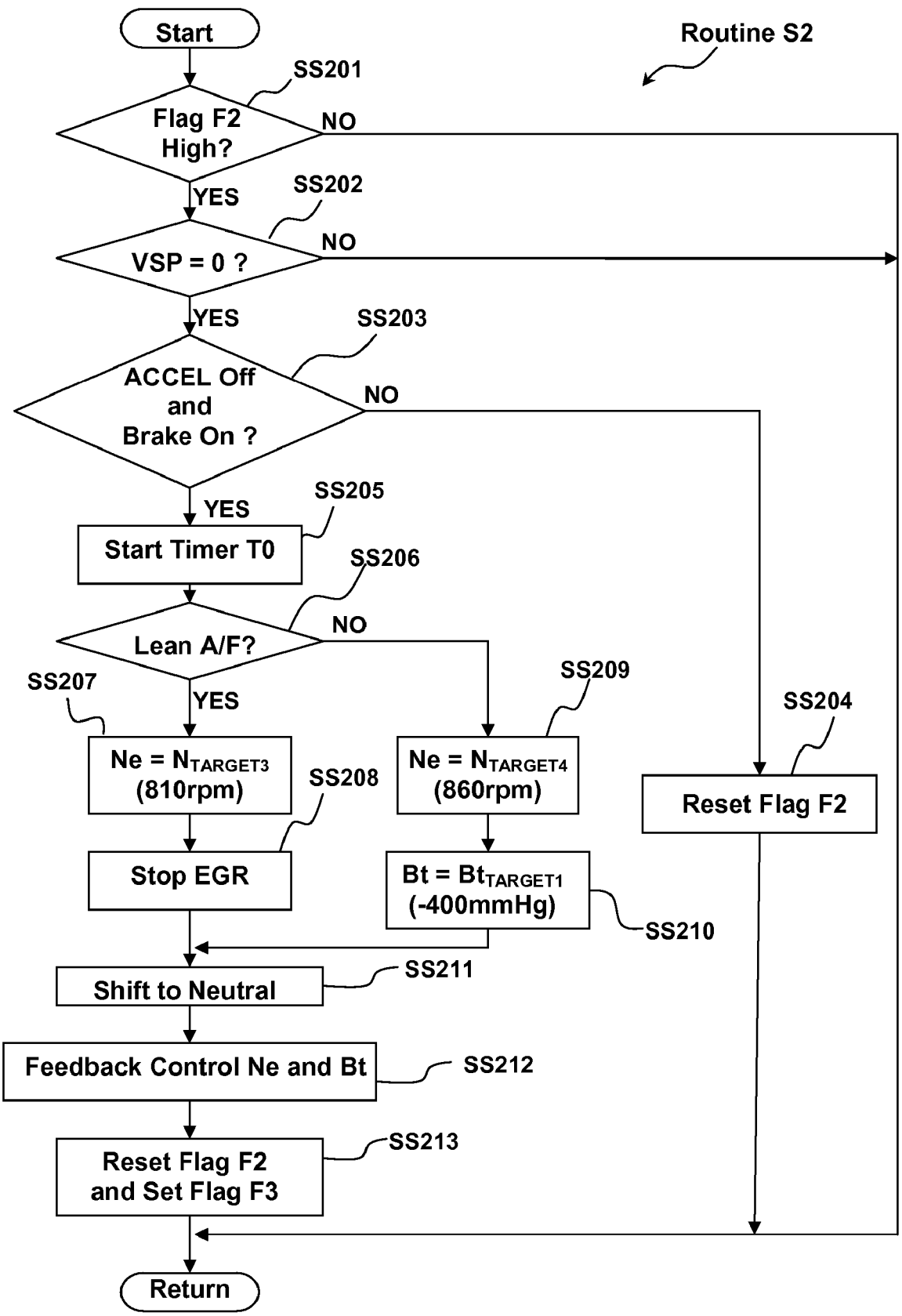
FIG. 7 is a flowchart showing a second stage of the engine stop control of FIG. 6.

Now the second stage of the engine stop control will be described with reference to a flow chart of FIG. 7 which illustrates the second control routine S2. After the start, at a step SS201, the routine determines whether the flag F2 is High or not. If it is OFF, the routine returns and waits for the flag F2 high. If it is ON, it proceeds to a step SS202 and determines whether or not a vehicle speed VSP is zero or the vehicle is completely stopped. If it is NO at the step SS202, the engine stop is not required yet, so the routine S2 returns. If it is YES at the step SS202, the routine S2 proceeds to a step SS203 and determines whether or not the accelerator pedal is fully released and the brake pedal is depressed more than a reference level from the driver operation sensor 34. If it is NO at the step SS203, that means the engine stop is not desired any more, and the routine proceeds to a step SS204 and resets the flag F2 to be Low so that the ECU 2 takes the normal engine control. Then the routine returns. If it is YES at the step SS204, the routine S2 proceeds to a step SS205 and starts a timer T0. Then the routine proceeds to a step SS206 and determines whether or not a target air fuel ratio for the engine 1 is set substantially leaner than the stoichiometric air fuel ratio. If it is determined that the target air fuel ratio is leaner than the stoichiometry (YES) at the step SS206, the routine proceeds to a step SS207 and sets a third target speed $N_{TARGET3}$ which is a little bit of higher than the first target idle speed $N_{TARGET1}$ and may be for example 810 rpm. Then the routine proceeds to a step S208 and the EGR control section of the ECU2 controls the EGR valve 39 for improving scavenging effect in the cylinders 12A through 12D.

On the other hand, if it is determined at the step SS206 that the target air fuel ratio is the stoichiometry or richer than that, the routine proceeds to a step SS209 and sets a fourth target speed $N_{TARGET4}$ which is even higher than the second target speed $N_{TARGET2}$ and may be for example 860 rpm. Then it proceeds to a step SS210 and sets a target intake air pressure $Bt_{TARGET1}$ which is a relatively higher pressure even for the given fourth target engine speed $N_{TARGET4}$ and may be for example −400 mm Hg. Therefore, to reduce the torque to maintain the target engine speed, the ignition timing is retarded heavily, so that the exhaust gas temperature becomes higher and activity of the catalyst 37 may be maintained or it may be regenerated if it is a NOx catalyst due to the greater amount or mass of the stoichiometric or rich exhaust gas.

After the step SS208 or SS210, the routine S2 proceeds to a step SS211 and the ECU 2 controls the transmission to be in a neutral range to make a no-load condition. Then the routine proceeds to a step SS212 and the ECU 2 initiates feedback control of the fuel injection amount FP, the ignition timing and the throttle opening K to meet to the target values set at the steps SS207 or SS209 and SS210. Finally at a step S213, the routine resets the flag F2 to be Low and sets a flag F3 to be High, then it returns. The flag F3 indicates a readiness to stop the fuel for finally stopping the engine 1.

Figure 13:
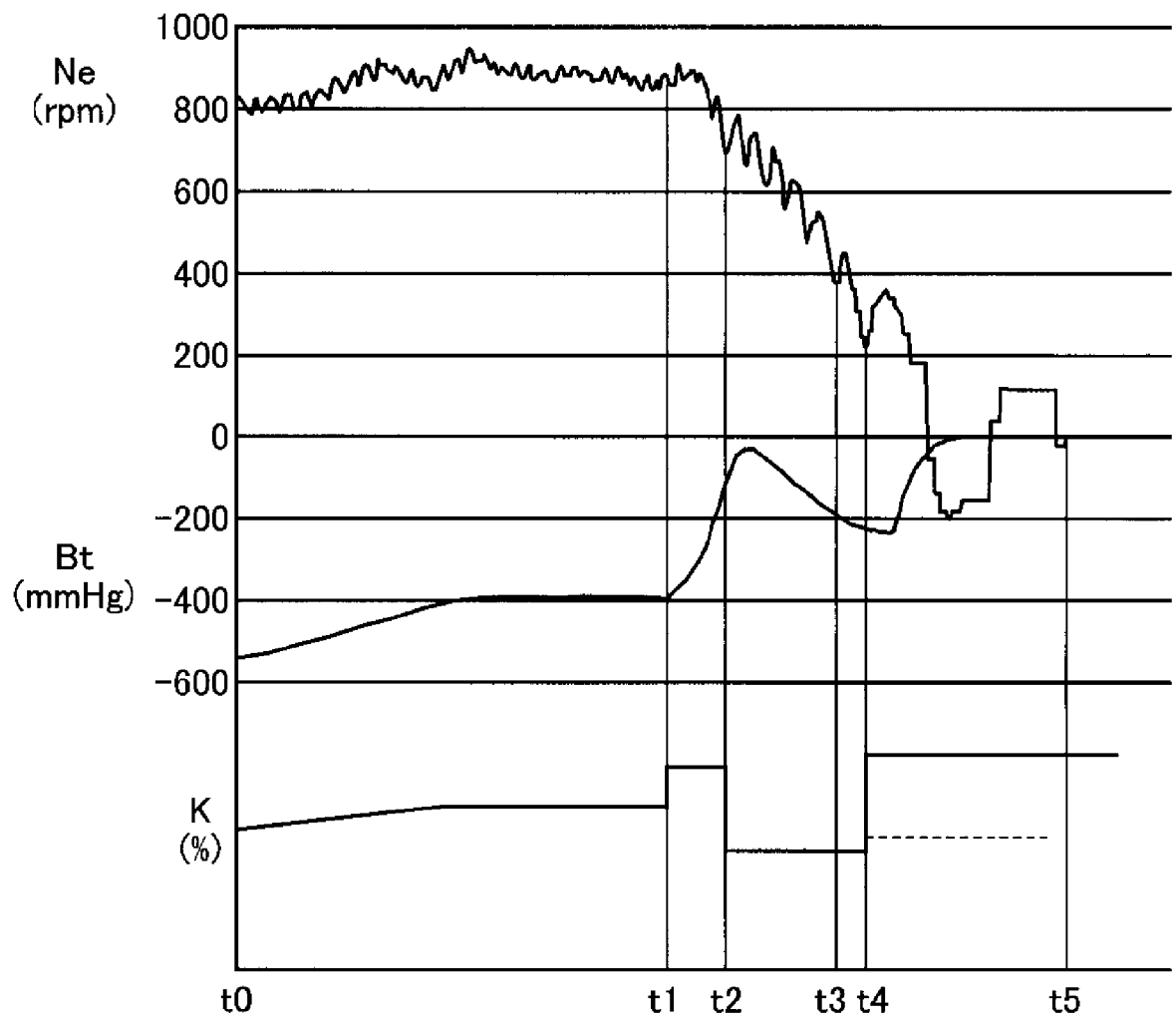
FIG. 13 is a diagram showing changes of parameters during the engine stop control according to the embodiments of the present description.

As shown in FIG. 13, at time t0 after the second stage of the engine stop control, the engine speed Ne starts to increase from the first to third or second to fourth target speeds by the feedback control initiated at the step SS210. At the time t1 in FIG. 13, the engine speed is substantially at to the target speed ($N_{TARGET4}$ in FIG. 13). The smaller gap between the two target speeds set may substantially prevent the discomfort of the vehicle occupants described above. When the engine is determined to operate in a lean air fuel ratio at the step SS204, the airflow amount to the engine is greater, so that more scavenging effect within the cylinder can be expected and the engine speed can be put relatively low, thereby reducing the noise or the fuel consumption.

Figure 8:
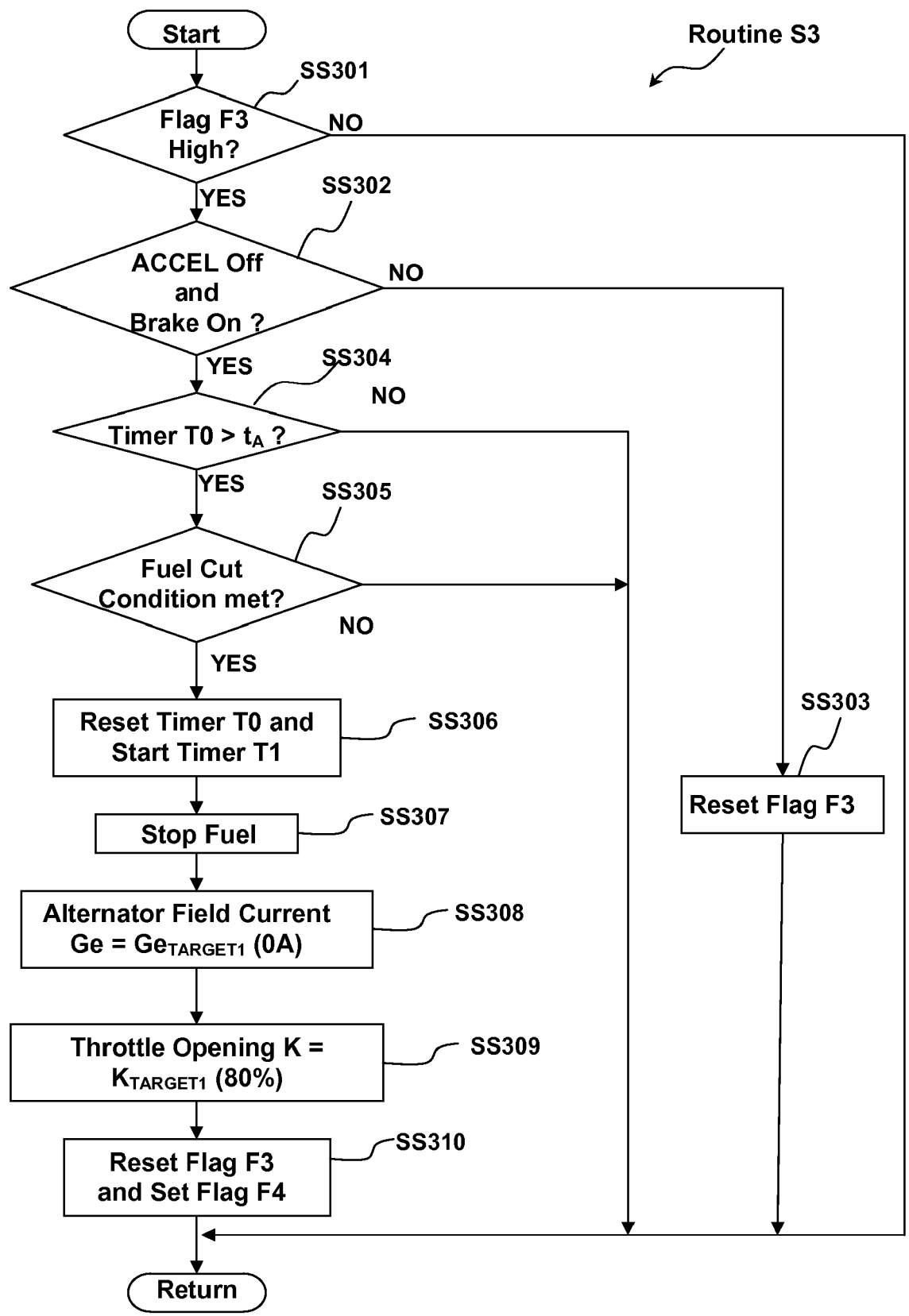
FIG. 8 is a flowchart showing a third stage of the engine stop control of FIG. 6.

Now the third stage of the engine stop control will be described with reference to a flow chart of FIG. 8 which illustrates the third control routine S3. After the start, at a step SS301, the routine determines whether the flag F3 is High or Low. If it is Low, the routine S3 returns and waits for the flag F3 High. If it is ON, it proceeds to a step SS302 and determines whether the accelerator pedal is fully released and the brake pedal is depressed more than a reference level or not from the driver operation sensor 34. If it is NO at the step SS302, which means that the engine stop is not desired any more, and the routine proceeds to a step SS303 and resets the flag F3 to be OFF so that the ECU 2 takes the normal engine control. Then the routine returns. If it is YES at the step SS302, the routine proceeds to a step SS304 and determines whether or not the timer T0 exceeds a predetermined threshold value $t_A$, which may be for example one second. If it is determined the timer T0 exceeds the threshold value (YES) at the step SS304, the routine proceeds to a step SS305, and otherwise it returns and waits for the count up of the timer T0. At the step SS305 the routine determines whether a condition for cutting off the fuel is met or not. The fuel cut condition may include a stable engine speed Ne at the target speed $N_{TARET3}$ or $N_{TARGET4}$ and a stable boost pressure Bt at the target intake air pressure P1. If it is YES at the step SS305, which means that the predetermined time period $t_A$ has passed since the time t0 and it is now time t1 in FIG. 12, the routine proceeds to a step SS306 and resets the timer T0 and starts another timer T1. Otherwise, the routine returns and waits for the fuel cut condition to be met. After the step SS306, the routine proceeds to a step SS307 and stops the fuel supply. Then it proceeds to a step SS308 and sets a target value $Ge_{TARGET1}$ of a field current Ge of the alternator 28 to be 0 A, so that the alternator control section 44 controls the regulator circuit 28a to shut off the field current to the alternator 28, thereby stopping the electric generation.

Figure 14:
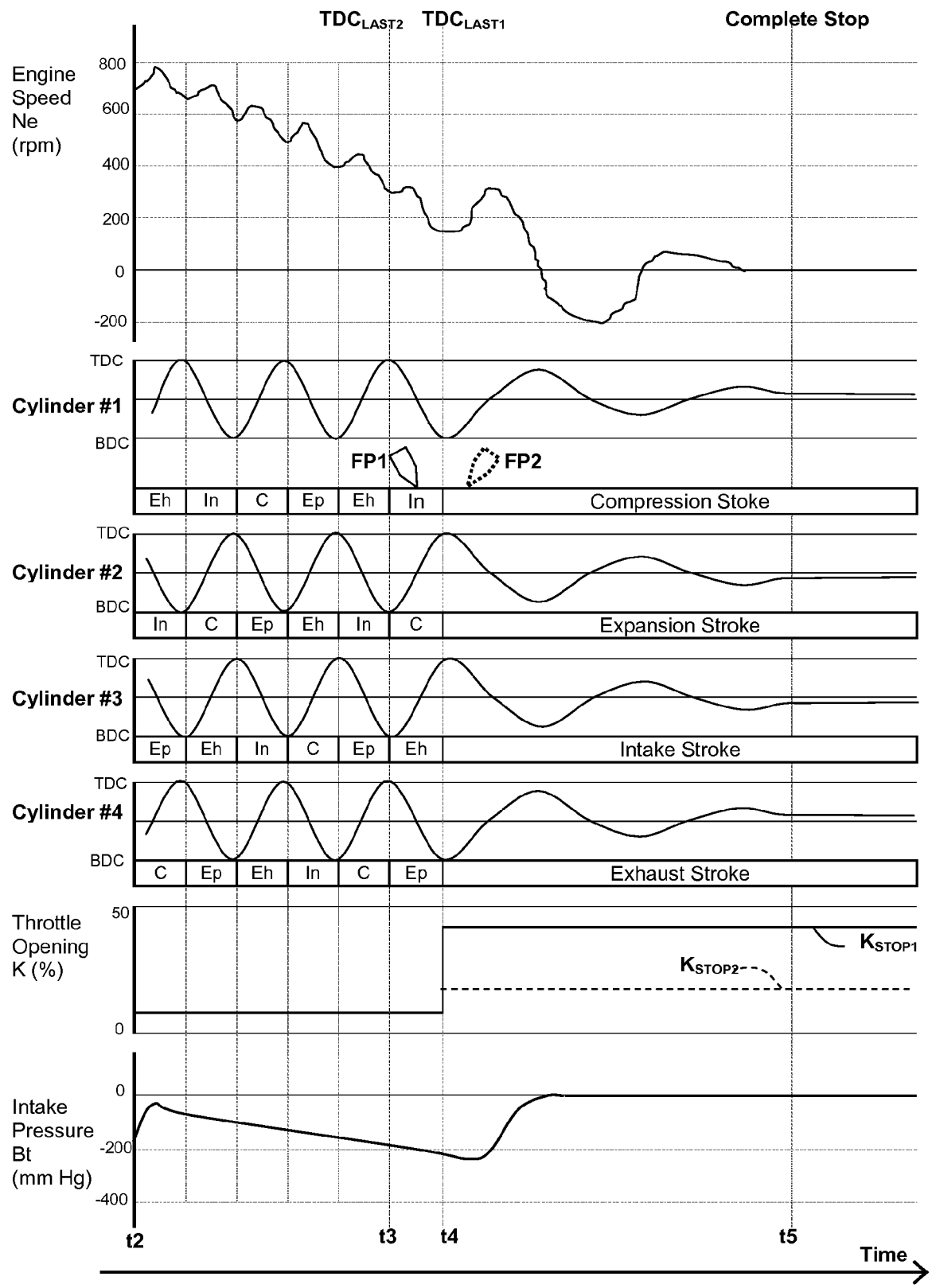
FIG. 14 is a diagram showing an operation of the engine system and the change of parameters, particularly during the last stage of the engine stop control.

After the step SS308, the routine proceeds to a step SS309 and sets a target throttle valve opening $K_{TARGET1}$ to be for example 80%, so that the throttle control section 43 of the ECU 2 controls the throttle actuator 24 to open the throttle valve 23 up to 80%, thereby increasing the intake air pressure Bt as shown in FIGS. 13 and 14 between the time t1 and time t2. Finally at a step SS310, the routine resets the flag F3 to be Low and sets a flag F4 to be High. The flag F4 indicates that the fuel supply is already stopped but the engine is still running.

Figure 9:
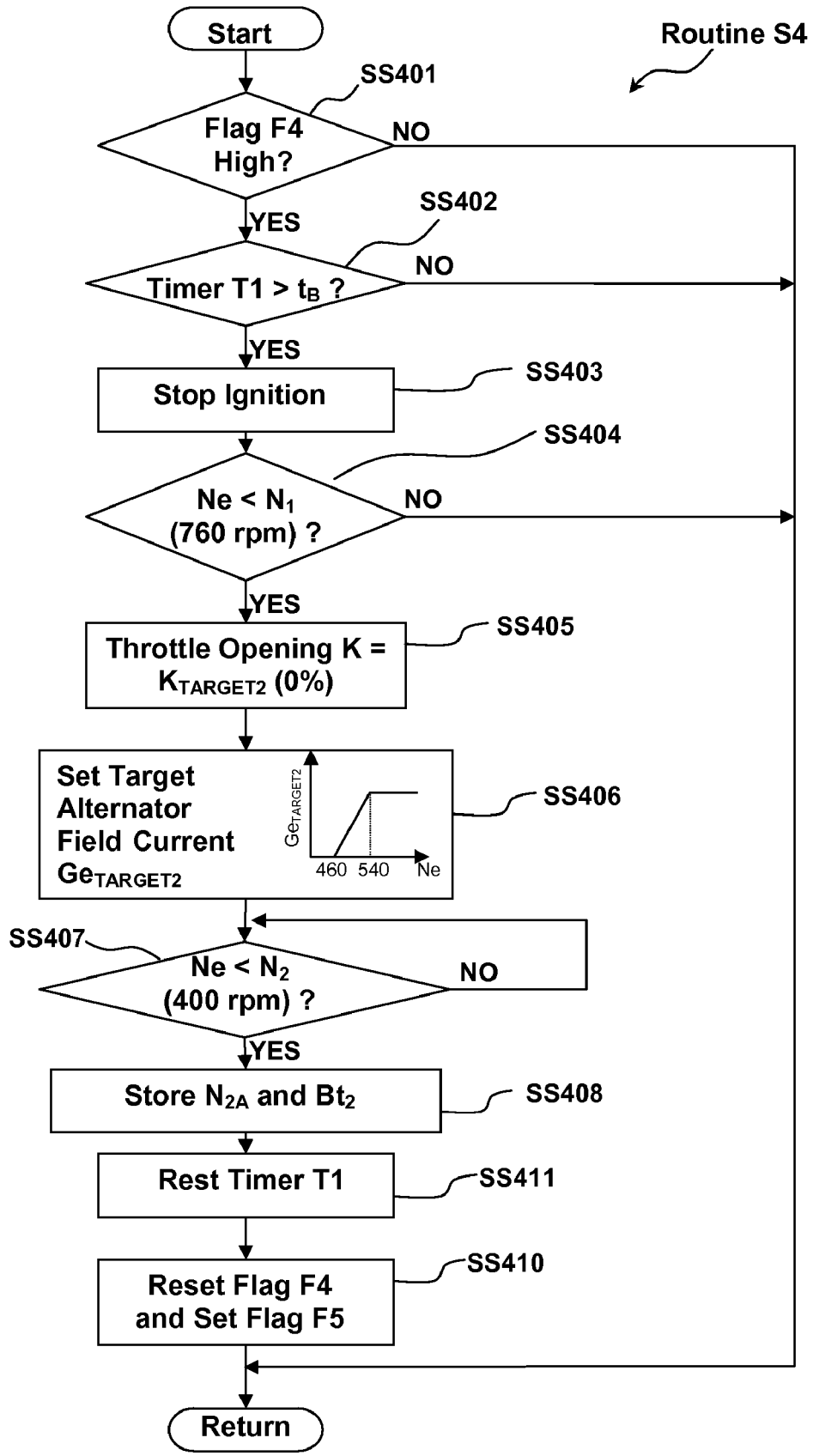
FIG. 9 is a flowchart showing a fourth stage of the engine stop control of FIG. 6.

Now the fourth stage of the engine stop control will be described with reference to a flow chart of FIG. 9 which illustrates the fourth control routine S4. After the start, at a step SS401, the routine determines whether the flag F4 is High or Low. If it is Low, the routine returns and waits for the flag F4 to be High. If it is High, it proceeds to a step SS402 and determines whether the timer T1 counts exceeding a reference value $t_B$, which corresponds to a time period of one engine cycle or two crankshaft rotations or 720° CA, as can be seen in FIG. 13 between time t1 and t2. The value $t_B$ may be, for example, 32 ms, given that the engine speed is now 810 rpm as set at the step SS207 of the second routine.

If it is determined that the timer T1 exceeds the predetermined value $t_B$ (YES) at the step SS402, the last injected fuel is supposed to be combusted, and the routine proceeds to a step SS403 and stops the ignition because it is not needed any more. If it is NO at the step SS402, the routine returns and waits for the count up of the timer T1. After the step SS403, the routine proceeds to a step SS404 and determines whether the engine speed Ne is lower than a first reference speed $N_1$. The reference speed $N_1$ is set lower than the third target speed $N_{TARGET3}$ and the fourth target speed $N_{TARGET4}$ which are respectively set at the steps SS208 and SS209 of the second routine and may be for example 760 rpm. If it is determined the engine speed Ne is lower than the reference speed $N_1$ at the step SS404, which means that the engine speed has started falling, as shown in FIGS. 13 and 14 at time t2, the routine S4 proceeds to a step SS405 and sets a target throttle opening $K_{TARGET2}$ to be zero so that the throttle control section 43 of the ECU 2 controls the throttle actuator 24 to fully close the throttle valve 23. Therefore the intake air pressure Bt is falling, and a cylinder which takes an intake stroke later will hold less air therein at the time of complete engine stop. In the case of FIG. 14, the cylinder #1 takes the intake stroke last before a last cylinder stroke or last compression stroke, specifically between the time t3 and time t4 and holds the least air therein and holds the least amount or mass of air at the compression stroke after the time t4.

After the step SS405, the routine proceeds to a step SS406 and sets a target generated electric current $Ge_{TARGET2}$ in accordance to a target field current map M1 stored in the ECU 2. The map M1 sets the target generated electric current $Ge_{TARGET2}$ versus the engine speed Ne so that the $Ge_{TARGET2}$ is set 60 A at 540 rpm or greater and set gradually falling to zero at 460 rpm. Based on the set target generated current $Ge_{TARGET2}$, the alternator control section 44 of the ECU 2 controls the regulator circuit 28a of the alternator 28.

Then, the routine S4 proceeds to a step SS407 and determines whether the engine speed Ne is lower than a second reference speed $N_2$, which is significantly lower than the first reference speed $N_1$. As shown in FIG. 14, the engine speed Ne is falling while oscillating with its lower peak at each top dead center. The second reference speed $N_2$ is set lower than a speed at which the engine 1 or the crankshaft 3 reaches a second last top dead center before the complete stopping ($TDC_{LAST2}$) and may be for example 400 rpm. If it is determined at the step S407 that the engine speed Ne is lower than the second reference speed $N_2$, which means that the engine 2 reaches the second last top dead center $TDC_{LAST2}$, as shown in FIG. 14 at the time t3, the routine proceeds to a step SS408, and otherwise it returns and waits for the engine speed Ne falling to $N_2$.

At the step SS408, the routine S4 stores the engine speed Ne determined at the previous step SR407 as a value $N_{2A}$ and an air intake pressure Bt detected by the intake air pressure sensor 25 in the memory of the ECU 2 as a value $Bt_2$ for a later use, specifically at the sixth stage of the engine stop control. Then the routine proceeds to a step SS409 and resets the timer T1 to be zero. Next at a step SS410, it resets the flag F4 to be Low and sets another flag F5 to be High, then returns. The flag F5 indicates that the engine 2 reaches the second last top dead center or the time t3 in FIG. 14.

The fifth stage of the engine stop control will now be described with reference to a flow chart of FIG. 10 which illustrates the fifth control routine S5. After the start, at a step SS501, the routine determines whether the flag F5 is High or Low. If it is Low, the routine returns and waits for the flag F5 to be High. If it is High, it proceeds to a step SS502 and determines whether an air density ρ computed by the air density estimation section 47 of the ECU 2 is greater than a reference density $ρ_1$ or not. The reference density $ρ_1$ may be for example 1.08 kg/m³. It may be determined by considering a fact that, when the vehicle is at a higher altitude, for example, higher than 1500-1800 m above sea level, if fuel is injected at the engine restarting, the fuel is not evaporated enough by the ignition, the rate of combustion may be too fast and the start-ability might be deteriorated. Therefore, in such a case, the fuel injection beforehand is desired.

If it is determined the air density ρ is less than the reference density $ρ_1$ (YES) at the step SS502, the routine proceeds to a step SS503 and determines an amount of fuel ($FP_1$) for restarting the engine to be injected into a cylinder which is now in its intake stroke and the cylinder #1 in FIG. 14. The fuel amount $FP_1$ is determined based on the actual engine speed $N_{2A}$ at the second last top dead center $TDC_{LAST2}$ stored at the step SS408 of the fourth stage of the engine stop control or at the time t3, so that the fuel amount $FP_1$ is greater as the speed $N_{2A}$ is greater, thereby more effectively utilizing the intake airflow during the intake stroke for the evaporation and atomization of fuel to be injected.

The cylinder #1 which is in its intake stroke at the step SS503 or between the times t3 and t4 is supposed to be in its compression stroke when the engine 1 completely stops, as shown in FIG. 14 after the time t4, so that in this case the cylinder #1 is a compression stroke cylinder described above. Therefore, the injected fuel is trapped in the cylinder and then is evaporated and atomized, making a homogeneous mixture of air and fuel within the cylinder #1 during the engine stop. Also, it cools the temperature and decreases the pressure inside of the combustion chamber 14. After the step SS503, the routine S5 proceeds to a step SS504 and the fuel control section 41 of the ECU 2 controls the fuel supply system 16 to inject fuel of the amount $FP_1$ into the cylinder #1 in FIG. 14. At the same time the routine S5 sets a flag F5f to be High for later use at the time of restarting the engine.

If it is determined that the air density is greater than the reference density $ρ_1$ (NO) at the step SS502, the steps SS503 and SS504 are skipped and the fuel is not injected to that cylinder. Then, the routine S5 proceeds to a step SS505 and determines whether the engine speed Ne is lower than a third reference speed $N_3$, which is significantly lower than the second reference speed $N_2$ and may be for example 260 rpm. If it is determined at the step SS505 that the engine speed Ne is lower than the third reference speed $N_3$, which means that the engine 2 reaches the last top dead center $TDC_{LAST1}$, as shown in FIG. 14 at the time t4, the routine proceeds to a step SS506, and otherwise it returns and waits for the engine speed Ne falling to $N_3$. At the step SS506, the routine resets the flag F5 to be Low and sets another flag F6 to be High, then returns. The flag F6 indicates that the engine 2 reaches the last top dead center or the time t4 in FIG. 14.

Figure 11:
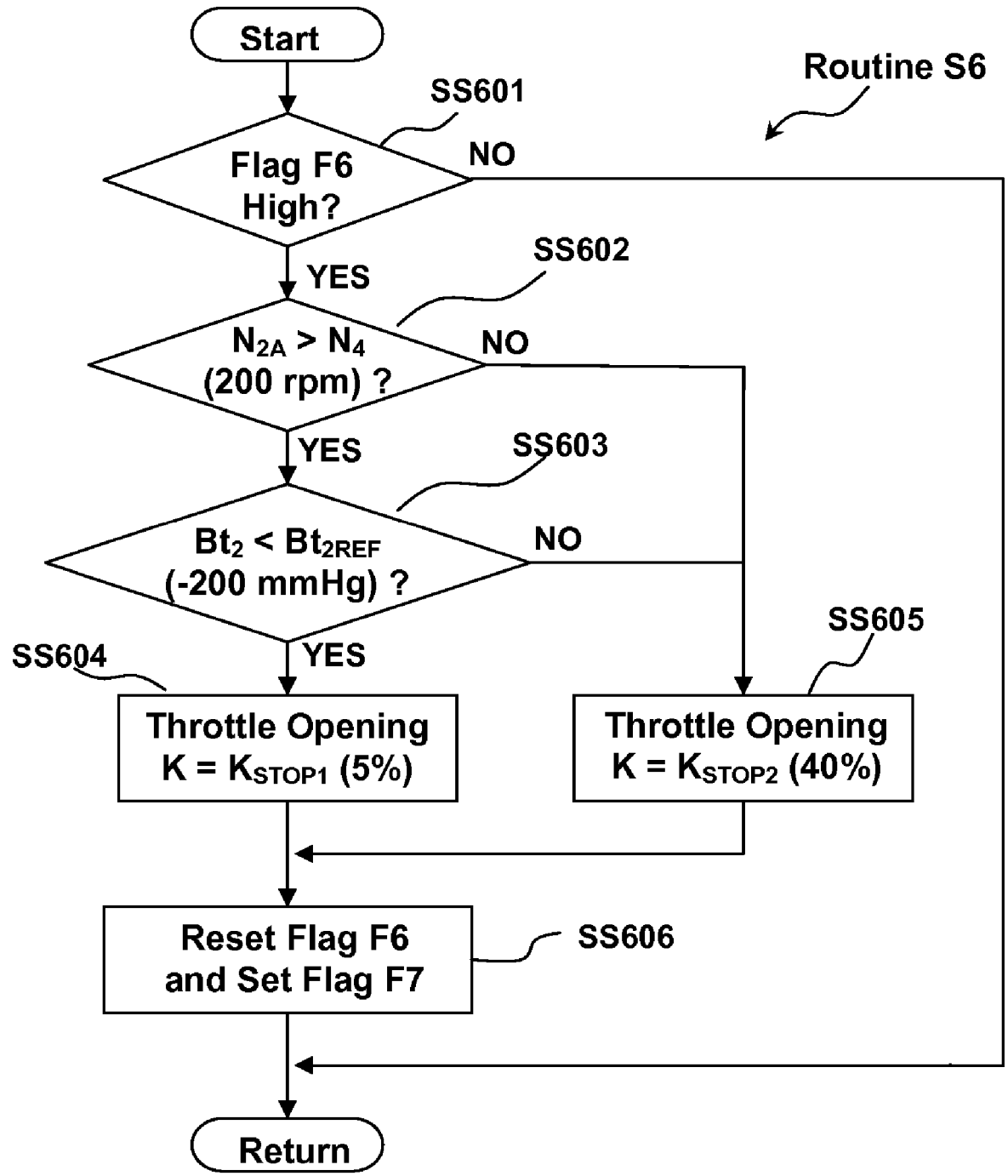
FIG. 11 is a flowchart showing a sixth stage of the engine stop control of FIG. 6.

The sixth stage of the engine stop control will now be described with reference to a flow chart of FIG. 11 which illustrates the sixth control routine S6. After the start, at a step SS601, the routine determines whether the flag F6 is High or Low. If it is Low, the routine returns and waits for the flag F6 to be High. If it is High, it proceeds to a step SS602 and determines whether or not the engine speed $N_{2A}$, which is a speed at the second last top dead center $TDC_{LAST2}$ and stored in the memory of the ECU 2 at the step SS408 of the routine R4, is higher than a fourth reference speed $N_4$, which is lower than the third reference speed $N_3$ and may be for example 200 rpm which is lower than the $N_3$ by 60 rpm.

If it is determined at the step SS602 that the engine speed $N_{2A}$ is higher than a fourth reference speed $N_4$, it can be considered that the crankshaft 3 has a greater rotational inertia at the last top dead center $TDC_{LAST1}$ at the time t4 of FIG. 14. Then, the routine S6 proceeds to a step SS603 and determines whether or not the intake air pressure $Bt_2$ at the second last top dead center $TDC_{LAST2}$ which is stored at the step SS408 of the fourth stage of the engine stop control and detected at the time t3, is less than a reference pressure $Bt_{2REF}$ such as −200 mm Hg. If it is determined that the intake air pressure Bt is lower than the reference pressure $Bt_2$ (YES) at the step SS603, an amount of air inducted into the cylinder (cylinder #1 in the case of FIG. 14), which was in its intake stroke at the time t3 and is now in its compression stroke, is relatively small, and it can be assumed that the pressure inside of the cylinder #1 is relatively low at the time of complete engine stop. Therefore if the both decisions at the steps SS602 and SS603 are YES, the rotational inertia is relatively great and the counterforce acting in the cylinder #1 against the rotational inertia is relatively small so that the piston 13 in the cylinder #1 may finally stop at 100° CA or farther from the bottom dead center. That stop position may be within a preferable range R of stop position for the engine restarting, which will be described with greater detail below with reference to FIG. 15 and may be between 100 and 120° CA from the bottom dead center of a cylinder which is in its compression stroke at the time of complete stop. So, in this case, the throttle valve 23 needs to be positioned just for the restarting. Then, the routine S6 proceeds to a step SS604 and sets a throttle opening K during stopping K to be a value $K_{STOP1}$ which may be for example 5% so that the throttle control section 43 of the ECU 2 controls the throttle actuator 24 to slightly open the throttle valve 23.

Figure 15:
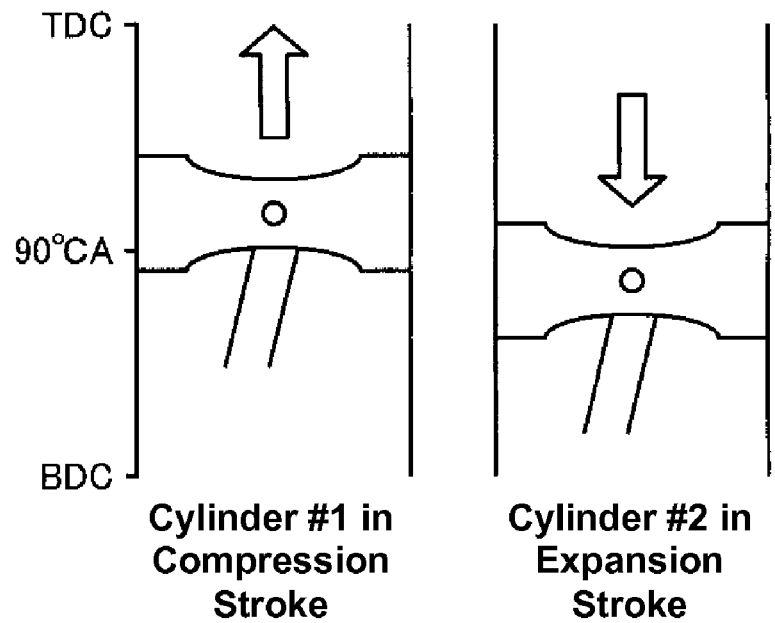
FIG. 15 are diagrams illustrating a preferred stop range R for the idle stop control according to the embodiments of the present description.
Figure 15:
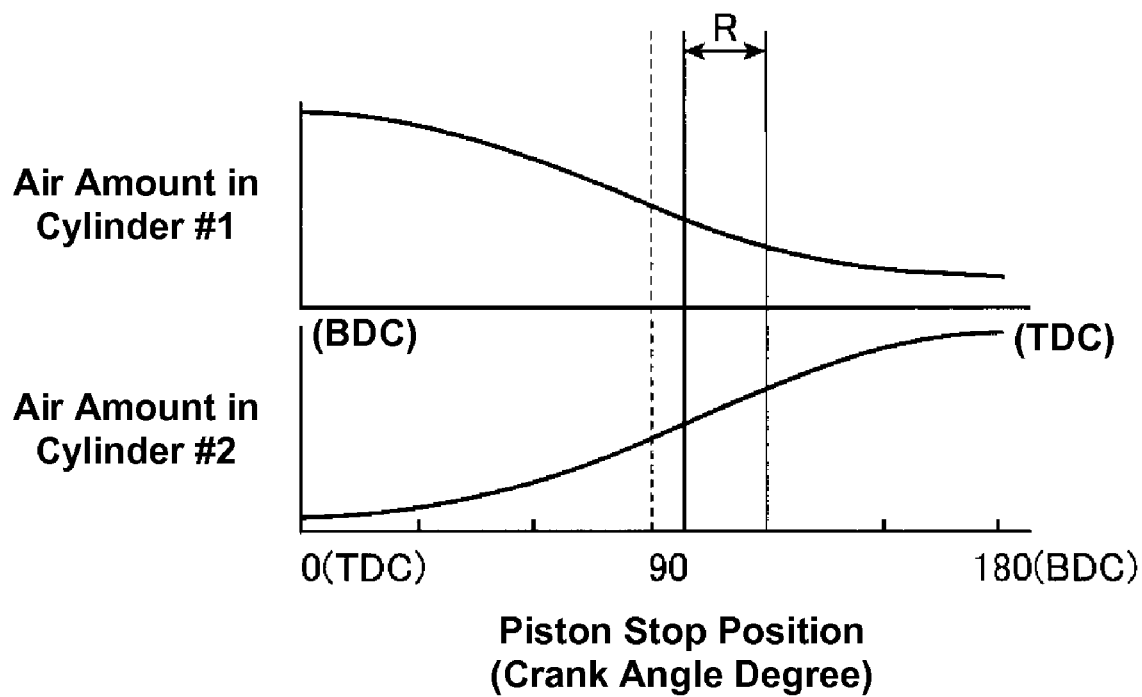

On the other hand, either of the decisions at the steps SS602 and SS603 is NO, the piston 13 in the cylinder #1 may finally stop at 100° CA or closer to the bottom dead center which is out of the preferable stop range R in FIG. 15. Therefore, amount of intake air, which is now inducted into the cylinder #4 that is now in its intake stroke, is increased by widely opening the throttle valve 23, so as to reduce the resistance of the airflow and the decrease of the rotational inertia caused by the airflow resistance, thereby stopping the piston 13 in the cylinder #1 within the preferable stop range R. Specifically, the routine S6 proceeds to a step SS605 and sets a target throttle valve opening K during the engine stop to be a value $K_{STOP2}$ which may be for example 80%, so that the throttle control section 43 of the ECU 2 controls the throttle actuator 24 to open the throttle valve 23 up to 80%.

After either of the routines SS604 and SS605, the routine proceeds to a step SS606 and resets the flag F6 to be Low and another flag F7 to be High. The flag F7 indicates that the engine does not make any continuous rotation but oscillates in rotation.

Figure 12:
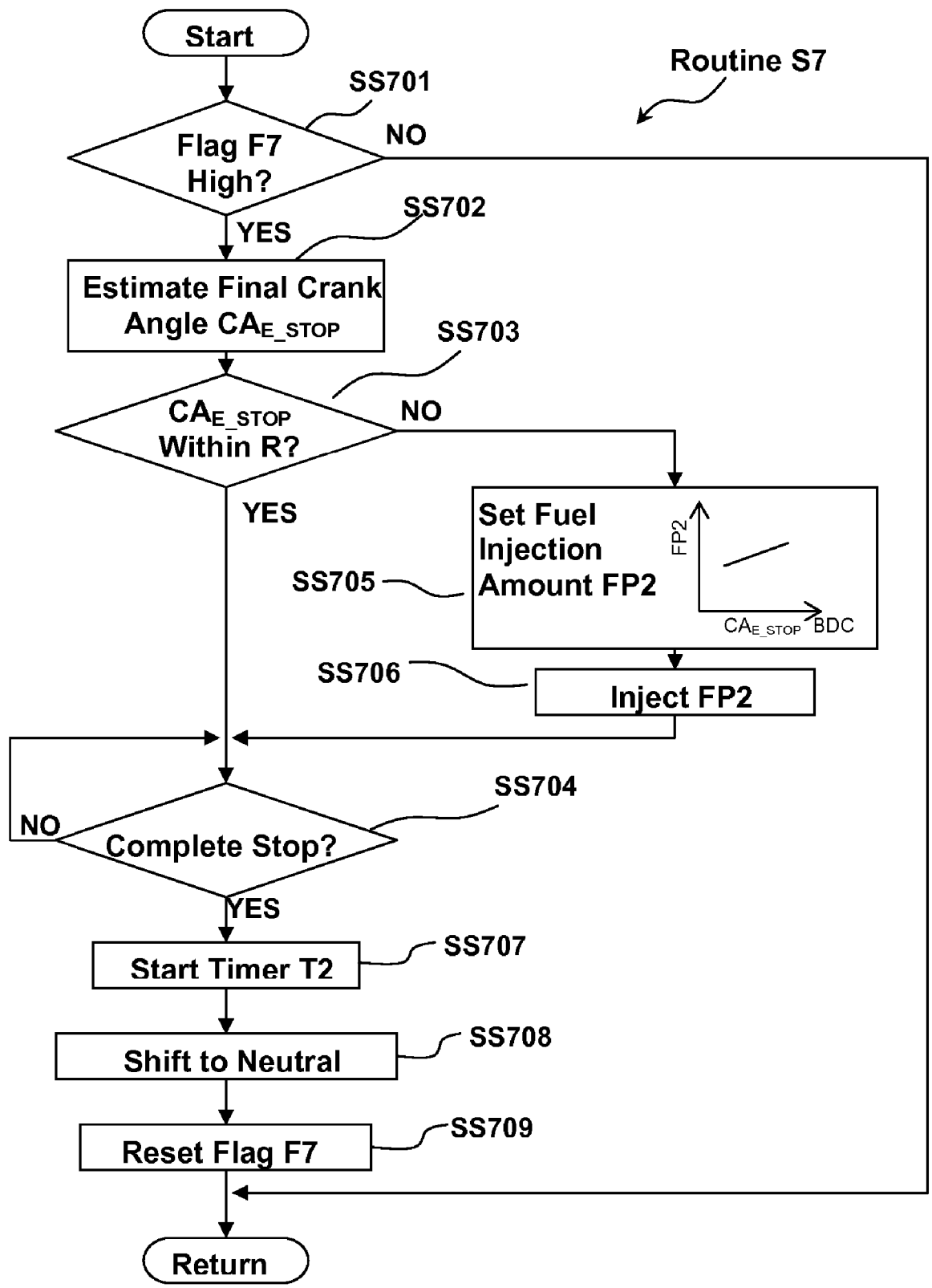
FIG. 12 is a flowchart showing a seventh stage of the engine stop control of FIG. 6.

The seventh or final stage of the engine stop control will now be described with reference to a flow chart of FIG. 12 which illustrates the seventh control routine S7. After the start, at a step SS701, the routine determines whether the flag F7 is High or Low. If it is Low, the routine returns and waits for the flag F7 to be High. If it is High, the routine S7 proceeds to a step SS702 and estimates a final engine stop position $CA_{E\_STOP}$, more particularly a final position of the piston 13 in the cylinder #1 which is now in its compression stroke in the case of FIG. 14. Specifically, for the estimation, the crank angle determination section 45 of the ECU 2 continuously monitors the absolute position CA of the crankshaft 3 at the step SP9 in the crank angle determination routine C1 in FIG. 5. Based on the change of the absolute crankshaft position CA, the final stop position $CA_{E\_STOP}$ is estimated.

After the step SS702, the routine S7 proceeds to a step SS703 and determines whether or not the estimated stop position $CA_{E\_STOP}$ is within the preferred stop range R shown in FIG. 15. If it is YES at the step SS703, nothing is supposedly to be done, so that the routine S7 proceeds to a step SS704 and determines whether or not the crankshaft 3 completely stops based on the change of the absolute crankshaft position CA and waits for the complete stop.

On the other hand, if it is determined at the step SS703 that the estimated stop position $CA_{E\_STOP}$ is out of the preferred stop range R or less than 100° from the bottom dead center of the cylinder #1 which is in its compression stroke, the routine S7 proceeds to a step SS705 and determines an amount of fuel (FP2) for restarting the engine to be additionally injected into a cylinder which is the cylinder #1 in FIG. 14. The fuel amount FP2 is determined based on the estimated stop position $CA_{E\_STOP}$ so that the amount is greater as the $CA_{E\_STOP}$ is farther away from the preferred range R or the cylinder #1 is supposed to stop closer to its bottom dead center. The additional fuel decreases the temperature and pressure within the cylinder #1 through the evaporative latent heat, thereby making it more likely to stop the piston 13 in the cylinder #1 within the preferred stop range R. Then the routine S7 proceeds to a step SS706 and the fuel control section 41 of the ECU 2 controls the fuel supply system 16 to inject fuel of the amount FP2 into the cylinder #1 in FIG. 14. Next, the routine F7 proceeds to the step SS704, and determines the engine 1 completely stops or not, as described above.

After the engine 1 has completely stopped, the routine F7 proceeds to a step SS707 and starts a timer T2, which indicates the engine 1 is being stopped by the idle stop control. Then it proceeds to a step SS708 and the ECU 2 controls the transmission to be shifted from the neutral range to a drive range for the engine restart and the following vehicle launch. Then, it proceeds to a step SS709 and reset the flag F7 to be Low, so that the engine stop control is completed.

According to the engine stop control described above, the engine 1 is now stopped within the preferred stop range R shown in FIG. 15. In the case of FIG. 14, the cylinder #1 is now in its compression stroke (therefore, hereafter referred to as compression stroke cylinder), the cylinder #2 is in its expansion stroke (therefore, hereafter referred to as expansion stroke cylinder) and their rotational phases are offset by 180° CA, as shown in FIG. 15(A). Over time during the engine stop, even if the intake and exhaust valves are closed such as for the compression stroke cylinder and the expansion stroke cylinder, the pressure inside of the cylinder approaches an atmospheric pressure, because air inside of the cylinder somewhat communicates with the outside through a small gap, for example, between the cylinder wall or between the piston ring or the valve and the valve seat.

Figure 16:
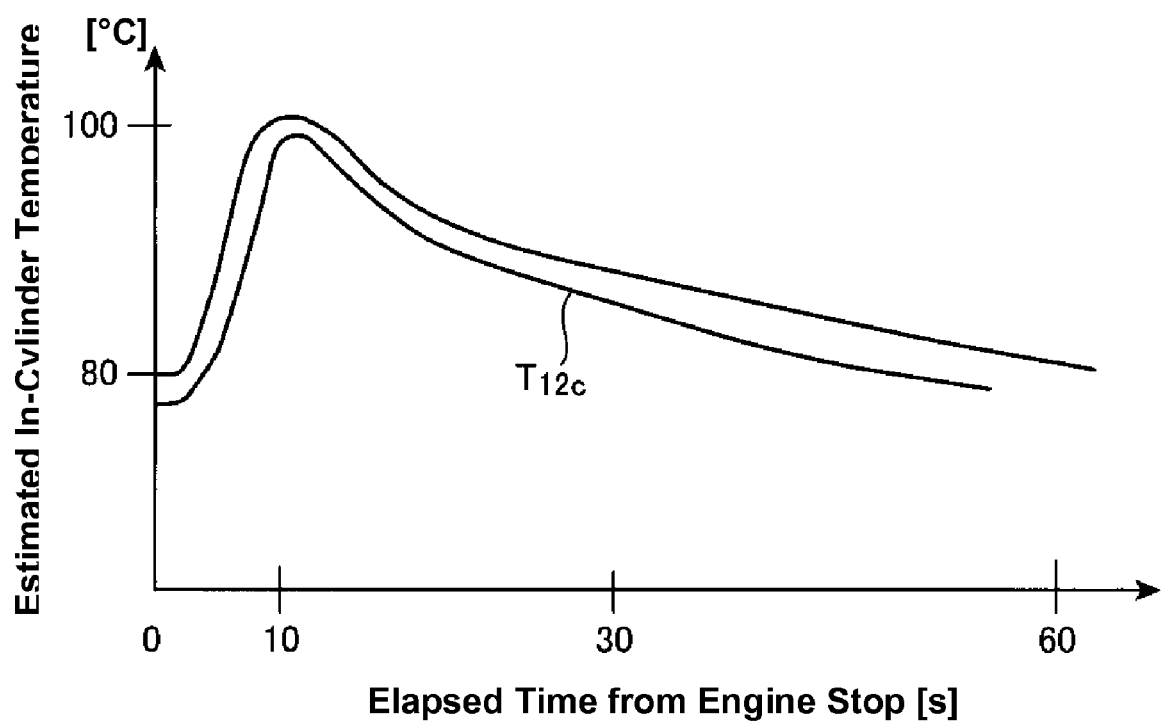
FIG. 16 is a graph depicting a change of temperature in a cylinder after an engine stop.

As shown in a graph of FIG. 16, from the time of the engine stop, a temperature inside of the cylinder is predicted to change. When the engine 1 completely stops, flow of engine coolant stops as well, and it causes the temperature inside of the cylinder to rapidly rise and the pressure inside to rise as well. This pressure increase may help the air inside go out of the cylinder.

In accordance with the above prediction, it can be said that, at the time of restarting the engine, the volume inside of the cylinder or the position of the piston shown in FIG. 15 directly influences mass of the air inside. As can be seen from FIG. 15(A), the expansion stroke cylinder has more air mass than the compression stroke cylinder does. For restarting the engine 1, the air in the compression stroke cylinder is used for temporary reverse rotation to compress the air in the expansion stroke cylinder, while the air in the expansion stroke cylinder is used for a start of a continuous rotation. In this instance, the expansion stroke cylinder needs more air than the compression stroke cylinder does, while excessively small amount or mass of the air in the compression stroke cylinder can not generate energy to rotate the crankshaft 3 in reverse. Therefore, the preferred range R of the stop position of the compression stroke cylinder is set between 100 and 120° CA from its bottom dead center, as shown in FIG. 15.

Engine Restart Control

Now an operation of automatically restarting the engine 1 will be described. The ECU 2 processes the engine restart control by running a computer program stored therein, and comprised of first through fifth stages or four control routines R1 through R5 illustrated by the flowcharts of FIGS. 17 through 21. The engine restart control at first initiates the combustion in the compression stroke cylinder (or the cylinder #1 in the diagrams of FIGS. 14 and 22) to rotate the crankshaft 3 in reverse and compress air in a cylinder which stops in its expansion stroke (therefore, hereafter referred to as expansion stroke cylinder) and is the cylinder #2 in FIGS. 14 and 22, and then initiates the combustion in the expansion stroke cylinder and the forward rotation of the crankshaft 3.

Figure 17:
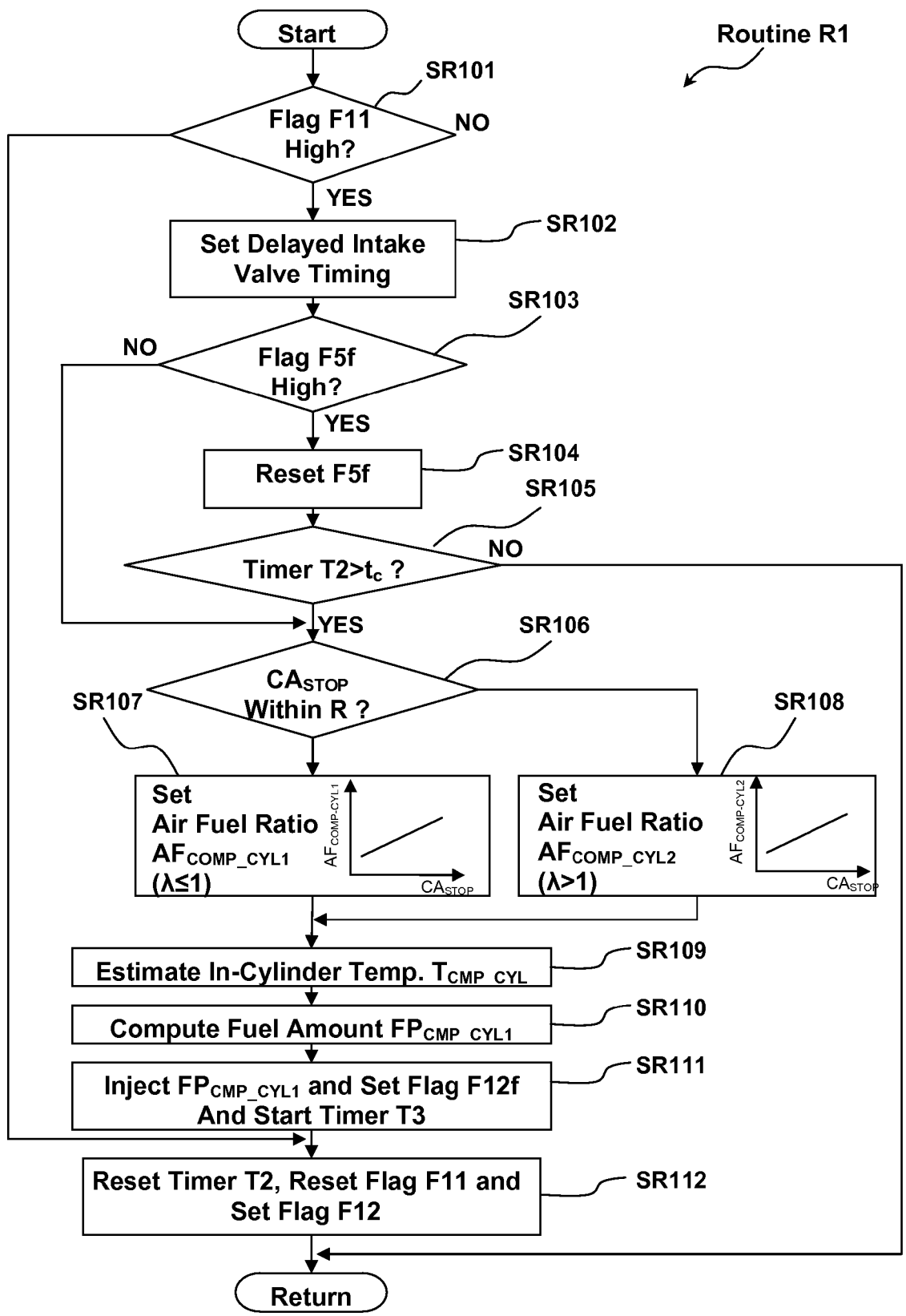
FIG. 17 is a flowchart showing a first stage of an engine restart control of the idle stop control of the reverse rotational type according to the embodiment of the present description.

After a start of the first stage or the routine R1 shown in FIG. 17, it determines at a step SR101 whether a flag F11 is High or Low. The flag F11 is set High when there is one of conditions to restart the engine, which include that the accelerator pedal is depressed, that a voltage of the vehicle battery is less than the reference voltage and that the air condition of the vehicle is ON. If it is determined that the flag F11 is High at the step SR101, the routine R1 proceeds to a step SR102, or otherwise it returns and waits for the flag F11 to be High. At the step SR102, the valve control section 49 of the ECU 2 controls the variable valve timing mechanism 190 so that the intake valve close timing is delayed to, for example, 100° CA after top dead center. Thereby, the intake valve 19 of the compression cylinder (#1) will be slightly opened at the late stage of the reverse rotation and the early stage of the reverse rotation, as shown in FIG. 22, so that some of combusted gas is exchanged with fresh air in the intake passage 21.

After the step SR102, the routine R1 proceeds to a step SR103 and determines whether the flag F5f is High or not. If the flag F5f is High, the fuel FP1 was injected to the compression stroke cylinder or the cylinder #1 in FIG. 14 at the step SS503 of the fifth stage of the engine stop control shown in FIG. 10. If it is YES at the step SR103, the routine R1 proceeds to a step SR104 and resets the flag F5f to be Low. Then, it proceeds to a step SR105 and determines whether the timer T2 counts exceeding a reference value $t_C$. The timer T2 was started at the step SS706 of the engine stop control at the time of the complete stop of the engine. The reference value $t_C$ is set corresponding to a time period for which the inside of the compression stroke cylinder gets diluted too much to achieve the desired combustion status. The dilution in the cylinder may be caused by the communication of the air in the cylinder to the outside described above.

If it is determined that the timer T1 exceeds the predetermined value $t_C$ (YES) at the step SR105, it is considered that fuel needs to be injected to the compression stroke cylinder due to the dilution in the cylinder. Also if it is determined that the flag F5f is Low (NO) at the step SR103, it is considered that fuel needs to be injected to the compression stroke cylinder, because there may be no fuel in the cylinder. On the other hand, if it is determined that the timer T1 does not exceed the predetermined value $t_C$ (NO) at the step SR105, it is considered that no more fuel is needed for the compression stroke cylinder, because the fuel was injected (YES at the step SR102) and the time $t_c$ to dilute the air fuel mixture is not passed.

If it is considered fuel is needed for the compression stroke cylinder, the routine R1 proceeds to a step SR106. Since the engine rotation during the engine stop control is adjusted to stop the engine 1 or the crankshaft 3 within the range R of FIG. 15, the decision of the step SR106 is not likely to be YES, but even if it is smaller, the possibility of stopping outside of the range R can not be ignored. Therefore, the routine R1 determines from a crank angle $CA_{STOP}$ when the engine stops, which is derived from the routine shown in FIG. 5 and stored in the memory of the ECU 2, whether or not the compression stroke cylinder (cylinder #1 in FIGS. 14 and 22) is positioned at 100° CA or farther from its bottom dead center. That crank angle 100° CA of is the lower end of the preferred stop range R, as described above.

If it is determined that the compression stroke cylinder is positioned at 100° CA or farther from its bottom dead center (YES) at the step SR106, it is considered an amount of air in the compression stroke cylinder is appropriate, the routine R1 proceeds to a step SR106 and sets a target air fuel ratio $AF_{CMP\_CYL1}$ to be stoichiometric or rich ($\lambda \leq 1$) so that the later combustion generates enough energy for the reverse rotation. A target air fuel ratio $AF_{CMP\_CYL1}$ is set in accordance with a map M11 which defines the air fuel ratio as a function of the stop crank angle $CA_{STOP}$ so that the air fuel ratio $AF_{CMP\_CYL1}$ is richer as the crank angle $CA_{STOP}$ is closer to the top dead center of the compression stroke cylinder. On the other hand, it is determined NO at the step SR106, it is considered an amount of air in the compression stroke cylinder is too much, the routine R1 proceeds to a step SR108 and sets a target air fuel ratio $AF_{CMP\_CYL1}$ to be lean of the stoichiometry ($\lambda > 1$) so as to prevent the later combustion from generating too much energy for the reverse rotation and the piston of the expansion stroke cylinder from exceeding the top dead center. The lean target air fuel ratio is set in accordance with a map M12 which also defines the air fuel ratio as a function of the crank angle $CA_{STOP}$ in the same manner as the map M11 does.

After either of the steps SR107 and SR108, the routine R2 proceeds to a step SR109 and the in-cylinder temperature estimation section 46 estimates a temperature $T_{CMP\_CYL}$ based on an engine coolant temperature from the engine temperature sensor 33, the count of the timer T2 which corresponding to elapsed time from the complete engine stop, and others in accordance with a map or mathematical formula which is determined from a prior experiment and generally in line with the graph of FIG. 16. Then the routine R1 proceeds to a step SR110 and determines a fuel injection amount $FP_{CMP\_CYL1}$. It is computed based on the target air fuel ratio $AF_{COM-CYL1}$ determined at the step SR107 or SR108 and an estimated amount of air in the compression stroke cylinder ($AM_{CMP\_CYL}$). The air amount $AM_{CMP\_CYL}$ is estimated based on a volume in the compression stroke cylinder derived from the crank angle $CA_{STOP}$, air density $\rho$ derived from the air density estimation section 47 of the ECU 2 and the temperature $T_{CMP-CYL}$ in the compression stroke cylinder.

After the fuel amount $FP_{CMP\_CYL1}$ is determined at the step SR110, the routine R1 proceeds to a step SR110 and sets a flag F11f to be High and starts a timer T3 and the fuel control section 41 of the ECU 2 controls the fuel supply system 16 to inject fuel of the computed amount $FP_{CMP\_CYL1}$ into the compression stroke cylinder.

After the step SR111 or after the decision of the step SR105 is N0, the routine R1 proceeds to a step SR112 where it stores the current count value of the timer T2 into the memory of the ECU 2 for its later use, resets the timer T2 to be zero, resets the flag F11 to be Low and sets another flag F12 to be High. The flag F12 indicates the compression stroke cylinder is ready for ignition.

The second stage of the engine restart control will now be described with reference to a flow chart of FIG. 18 which illustrates the second control routine R2. After the start, at a step SR201, the routine determines whether the flag F12 is High or Low. If it is Low, the routine returns and waits for the flag F12 to be High. If it is ON, it proceeds to a step SR202 and determines whether the flag F12f is High or not. If the flag F11f if is High, the fuel $FP_{CMP\_CYL1}$ is injected at the first stage of the restart control as described above and illustrated in FIG. 16 at the step SR109, then the routine R2 proceeds to a step SR203 and determines whether the timer T3 counts exceeding a reference value $t_F$ or not. The value $t_F$ is preset corresponding to a time period for which the fuel injected at the first stage of the restart evaporates. If it is determined that the timer T3 count exceeds the value $t_F$ (YES) at the step SR203, this means that it is ready to ignite the fuel in the compression stroke cylinder, then the routine R2 proceeds to a step SR204. On the other hand, if it is NO at the step SR203, it is not ready to ignite and the routine R2 returns and waits for the timer T3 counts up to the value $t_F$. At the step SR204, the routine R2 resets the flag F11f to be Low and the timer T3 to be zero.

After the step SR204 or after the decision at the step SR202 is NO, the routine R2 proceeds to a step SR205 and the ignition control section 42 of the ECU 2 controls the ignition system 27 to cause the spark plug 15 to make a spark in the compression stroke cylinder (cylinder #1 in FIG. 22). Then, the routine R2 proceeds to step SR206 and increments a counter C1 by one, and waits at a step SR207 for the counter C1 counting up every predetermined counts which correspond to a predetermined time period, such as 50 ms. After the count up of the counter C1, the routine R2 proceeds to a step SR208 and determines whether or not a crankshaft angle CA is changed. If it is YES at the step SR208, the ignition made at the step SR205 is successful, because the crankshaft is determined to rotate. Then, the routine R2 proceeds to a step SR209 and resets the counter C1 to be zero, resets the flag F12 to be Low, and sets another flag F13. The flag F13 indicates that combustion in the compression stroke cylinder is successful and that the engine 1 or the crankshaft 3 rotates in reverse.

If it is not determined that the crank angle CA is not changed (NO) at the step SR208, the ignition at the step SR205 is failed and another ignition will be attempted. First, the routine R2 determines at a step 210 whether or not the counter C1 counts more than a reference count number $C_{F1}$. If it is YES at the step SR210, it is considered that too many attempts to ignite the air and fuel mixture in the compression stroke cylinder are made, and the routine proceeds to a step SR211 and resets the counter C1 to be zero, resets the flag F12 to be OFF and sets a flag $F_{FAIL}$. On the other hand, if it is NO at the step SR210, the routine R2 returns and repeats ignition attempts at the step SR205 until the crank angle change is detected at the step SR208.

The third stage of the engine restart control will now be described with reference to a flow chart of FIG. 19 which illustrates the second control routine R3. After the start, at a step SR301, the routine determines whether the flag F13 is High or Low. If it is Low, the routine returns and waits for the flag F13 to be High. If the flag F13 is High at the step SR301, the routine R3 proceeds to a step SR302 and estimates a current temperature $T_{EXP\_CYL}$ in the expansion stroke cylinder. The in-cylinder temperature estimation may be made in the same manner as is done for the temperature $T_{COM\_CYL}$ of the expansion stroke cylinder at the step SR108 of the first routine R1 or the first stage of the restart control. Then the routine proceeds to a step SR303 and determines an air amount in the expansion stroke cylinder ($AM_{EXP\_CYL}$) based on the estimated in-cylinder temperature $T_{EXP\_CYL}$ and a cylinder volume. The cylinder volume may be computed based on the crank angle $CA_{STOP}$ when the engine stops, which is derived from the routine shown in FIG. 5 and stored in the memory of the ECU 2.

Then, the routine R3 proceeds to a step SR304 and determines a fuel injection amount for the expansion stroke cylinder ($FP_{EXP\_CYL}$) based on the air amount $AM_{EXP\_CYL}$ and the stop crank angle $CA_{STOP}$ so that an air fuel ratio in the compression stroke cylinder ($AF_{EXP\_CYL}$) is stoichiometric or rich ($\lambda \leq 1$) for maximizing energy exerted from the first forward rotation of the engine 1 or the crankshaft 3. Then, it proceeds to a step SR305 and determines first and second halves split from the fuel amount $FP_{EXP\_CYL}$ based on the stop crank angle $CA_{STOP}$ and the estimated in-cylinder temperature $T_{EXP\_CYL}$. The second half of the fuel amount $FP_{EXP\_CYL2}$ is set larger as the stop crank angle $CA_{STOP}$ indicates the expansion stroke cylinder stopped closer to its bottom dead center, because more air exists in the cylinder and compression counterforce will be higher so that the evaporative latent heat from the second half fuel will be necessary to reduce the compression counterforce. Also, the second half of the fuel amount $FP_{EXP\_CYL2}$ is set larger as the in-cylinder temperature $T_{EXP\_CYL}$ is higher, because it promotes to evaporate the injected fuel to reduce need for the earlier injection and later injection promotes faster combustion intended for the expansion stroke cylinder. Then, the routine R3 proceeds to a step SR306 and determines second fuel injection timing to the expansion stroke cylinder. The second fuel injection timing is set based on the stop crank angle $CA_{STOP}$ and the estimated in-cylinder temperature $T_{EXP\_CYL}$ so that evaporative latent heat of the second half of the fuel helps to compress the air in the expansion stroke cylinder in the reverse movement and the injected fuel can be evaporated enough until the ignition. Then, the routine R3 proceeds to a step SR307 and determines timing of an ignition for the expansion stroke cylinder or a delay time period of the ignition from the second injection timing so that the injected fuel evaporates enough.

After the step SR307, the routine proceeds to a step SR308 and determines a fuel injection amount for the compression stroke cylinder after a reversal of rotation ($FP_{CMP\_CYL2}$). When the intake valve 19 of the compression stroke is not expected to open at a later stage of the reverse rotation (such as when the intake valve closing timing set at the step SR102 is relatively early), the fuel amount $FP_{CMP\_CYL2}$ is determined based on the air amount $AM_{CMP\_CYL}$ estimated at the step SR109 and any of the fuel amounts $FP_1$, $FP_2$ and $FP_{CMP\_CYL1}$ injected into the compression stroke cylinder. The fuel amount $FP_{CMP\_CYL2}$ is set so that the air fuel ratio in the compression stroke cylinder after the reversal is richer than the combustible limit (7.0 or 8.0 for a gasoline engine) and may be for example 6.0, thereby preventing self-ignition of the air fuel mixture therein and counterforce caused by it.

On the other hand, when the intake valve 19 is expected to open at the later stage of the reverse rotation as shown in FIG. 22, amount of fresh air inducted into the compression stroke cylinder during the opening of the intake stroke cylinder ($AM_{CMP\_IN}$) is estimated based on the stop crank angle $CA_{STOP}$, intake air temperature detected by the intake air temperature sensor 25 and an engine coolant temperature detected by the engine temperature sensor 33. Then, the fuel amount $FP_{CMP\_CYL2}$ is determined based on the intake air amount $AM_{CMP\_IN}$, the air amount $AM_{CMP\_CYL}$ estimated at the step SR109 and any of the fuel amounts $FP_1$, $FP_2$ and $FP_{CMP\_CYL1}$ injected into the compression stroke cylinder. In this case, the fuel amount $FP_{CMP\_CYL2}$ is set so that the air fuel ratio in the compression stroke cylinder after the reversal is richer than the stoichiometry and combustible by spark ignition.

After the step SR308, the routine R3 proceeds to a step SR309 and the fuel control section 41 of the ECU 2 controls the fuel supply system 16 to inject fuel of the first half amount ($FP_{EXP\_CYL1}=FP_{EXP\_CYL}-FP_{EXP\_CYL2}$) which is determined at the steps SR304 and SR305 into the expansion stroke cylinder. Then, the routine R3 proceeds to a step SR310 and waits for the second injection timing determined at the step SR306. At the second injection timing or at a step SR311, the fuel control section 41 of the ECU 2 controls the fuel supply system 16 to inject fuel of the first second half amount ($FP_{EXP\_CYL2}$) which is determined at the step SR305 into the expansion stroke cylinder.

After the fuel is injected into the expansion stroke cylinder, the routine R3 proceeds to a step SR312 and waits for the ignition timing which is determined at the step SR307. At the ignition timing or at a step SR313, the ignition control section 42 of the ECU 2 controls the ignition system 27 to cause the spark plug 15 to make a spark in the expansion stroke cylinder.

On the other hand, for the compression stroke cylinder, the routine R3 waits at a step SR314 for injection timing of fuel of the amount $FP_{CMP\_CYL2}$ determined at the step SR308. This injection timing is after the reversal of the rotation and before the compression stroke reaches its top dead center. Then, at the injection timing, the routine R3 proceeds to a step SR315 and the fuel control section 41 of the ECU 2 controls the fuel supply system 16 to inject fuel of the amount $FP_{CMP\_CYL2}$ which is determined at the step SR308 into the compression stroke cylinder. Finally, the routine R3 proceeds to a step SR316 and resets the flag F13 to be Low and sets another flag F14 to be High. The flag F14 indicates the engine 1 has started a forward rotation.

Figure 20:
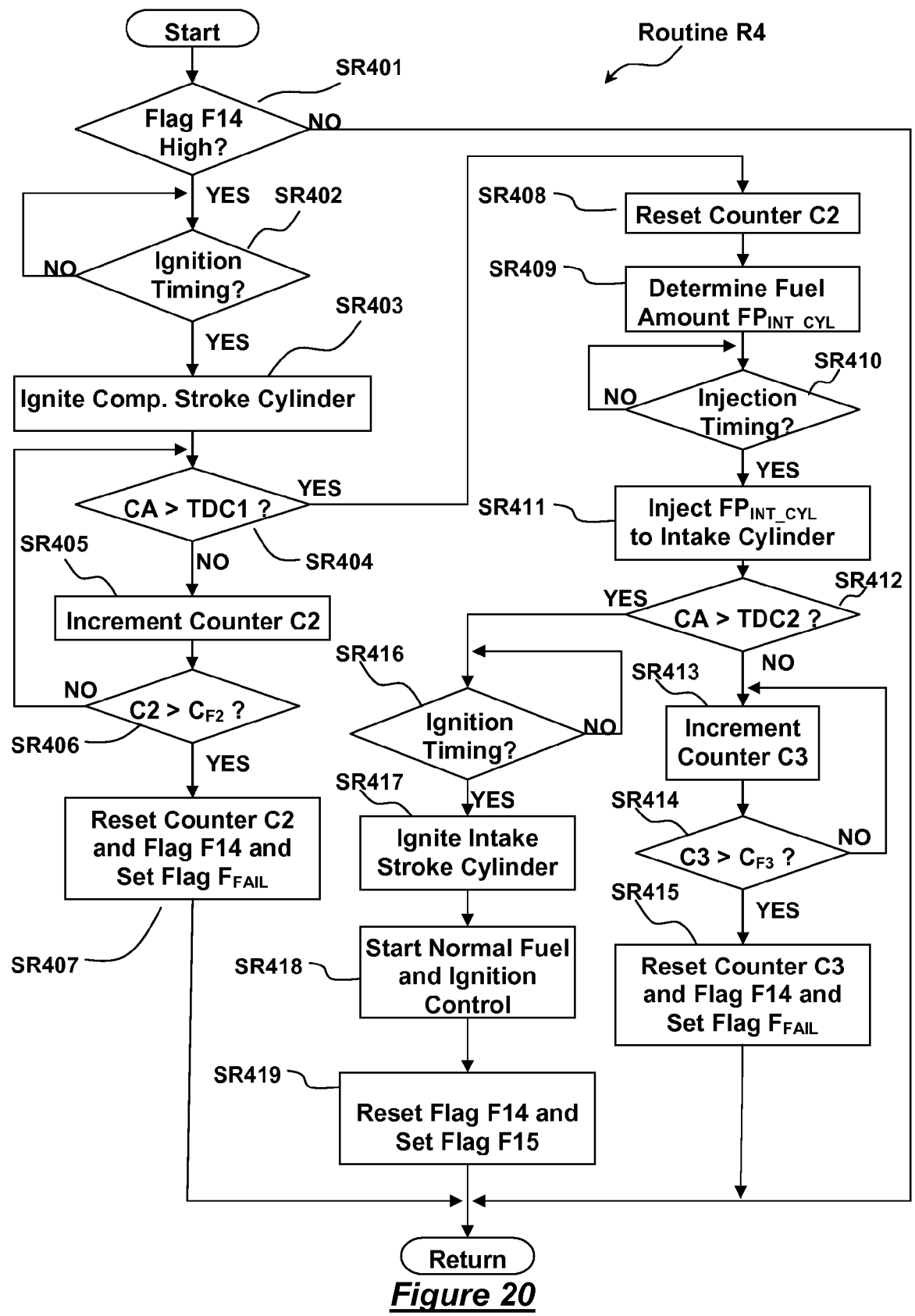
FIG. 20 is a flowchart showing a fourth stage of the engine restart control of FIG. 17.

The fourth stage of the engine restart control will now be described with reference to a flow chart of FIG. 20 which illustrates the fourth control routine R4. After the start, at a step SR401, the routine determines whether the flag F14 is High or Low. If it is Low, the routine returns and waits for the flag F14 to be High. If it is High, it proceeds to a step SR402 and waits for ignition timing of the compression stroke cylinder. This timing is set just (for example a couple of degrees crank angle) before a top dead center of the compression stroke cylinder or a first top dead center of the forward rotation (TDC1), so that the ignited air fuel mixture generates energy after the first top dead center TDC1, as shown in FIG. 22, thereby accelerating the forward rotation, if combustible gas exists in the compression stroke cylinder even after the combustion for the reverse rotation. Then, at the ignition timing, the routine R4 proceeds to a step SR403 and the ignition control section 42 of the ECU 2 controls the ignition system 27 to cause the spark plug 15 to make a spark in the compression stroke cylinder.

The routine R4 proceeds to a step SR404 and determines whether of not the crank angle CA indicates the engine 1 or the crankshaft 3 has passed the first top dead center TDC1. If it is NO, the routine R4 proceeds to a step SR405 and increments a counter C2 by one. Then, it proceeds to a step SR406 and determines whether or not the counter C2 exceeds a reference value $C_{F2}$. If it is determined that the counter C2 exceeds the reference value $C_{F2}$ (YES) at the step SR407, it indicates that the first top dead center could not be passed and this engine restart operation is failed. Then, the routine R4 proceeds to a step SR407 and resets the counter C2 to be zero, resets the flag F14 to be Low and sets the fail flag $F_{FAIL}$ to be High. If it is NO at the step SR406, the step SR404 is repeated until it determines the first top dead center TDC1 is passed.

After it is determined at the step SR404 that the TDC1 is passed, the routine R4 proceeds to a step SR408 and resets the counter C2 to be zero. Then, it proceeds to a step SR409 and determines amount of fuel to be injected into a cylinder which was stopped in its intake stroke ($FP_{INT\_CYL}$). That cylinder is the cylinder #3 in the case of FIGS. 14 and 22 and hereafter referred to as intake stroke cylinder. The fuel amount $FP_{INT\text{-}CYL}$ is determined based on air amount in the intake stroke cylinder and an air fuel ratio $AF_{INT\text{-}CYL}$. The air amount may be derived from air density estimated by the air density estimation section 47 of the ECU 2 and the cylinder volume when the intake valve 19 is closed. The air fuel ratio $AF_{INT\_CYL}$ is set leaner than the stoichimetory so that self ignition of the air fuel mixture does not occur before a top dead center of the intake stroke cylinder or a second top dead center TDC2. If the self ignition occurred before the TDC2, the ignition would cause combustion energy to be generated and the piston 13 in the intake stroke cylinder would be pushed down thereby acting against the rotational inertia of the crankshaft (negative torque) so that it would be harder to pass the second top dead center TDC2.

Then, the routine R4 proceeds to a step SR410 and waits for an injection timing of the fuel of the amount $FP_{INT\_CYL}$. This injection timing is set at a later stage of the compression stroke so that the evaporative latent heat will reduce the compression pressure and the energy to pass the second top dead center. Specifically, it may be determined based on count value of the timer T2 at the step SR104 of the first routine R1 corresponding to a time period of the engine stopping, an intake air temperature detected by the intake air temperature sensor 25, an engine coolant temperature detected by the engine coolant temperature sensor 33, and others.

If it is determined that the injection timing is reached at the step SR410, the routine R4 proceeds to a step SR411 and the fuel control section 41 of the ECU 2 controls the fuel supply system 16 to inject fuel of the amount $FP_{INT\_CYL}$ which is determined at the step SR409 into the intake stroke cylinder. Therefore, the fuel is injected before the second top dead center TDC2. To prevent the generation of the combustion energy against the rotational inertia, ignition of the injected fuel is made after the second top dead center TDC2.

After the fuel injection to the intake stroke cylinder at the step SR411, the routine proceeds to a step SR412 and determines whether or not the crank angle CA indicates the engine 1 or the crankshaft 3 has passed the second top dead center TDC2. If it is NO, the routine R4 proceeds to a step SR413 and increments a counter C3 by one. Then, it proceeds to a step SR414 and determines whether or not the counter C3 exceeds a reference value $C_{F3}$. If it is determined that the counter C3 exceeds the reference value $C_{F3}$ (YES) at the step SR414, it indicates that the second top dead center could not be passed and this engine restart operation is failed. Then, the routine R4 proceeds to a step SR415 and resets the counter C3 to be zero, resets the flag F14 to be Low and sets the fail flag $F_{FAIL}$ to be High. If it is NO at the step SR414, the step SR412 is repeated until it determines the second top dead center TDC2 is passed.

If it is determined at the step SR 412 that the second top dead center TDC2 is passed, the step proceeds to a step SR416 and waits for the ignition timing for the intake stroke cylinder. At the ignition timing, the routine R4 proceeds to a step SR417 and the ignition control section 42 of the ECU 2 controls the ignition system 27 to cause the spark plug 15 to make a spark in the intake stroke cylinder. Then, the routine R4 proceeds to a step SR418 and starts the normal fuel and ignition control. Finally, it resets the counter C3 to be zero, resets the flag F14 to be OFF and sets another flag F15 to be ON at a step SR419. The flag F15 indicates that the engine 1 has successfully passed the second top dead center TDC2 and has started a continuous forward rotation and that the fuel control section 41 and ignition control section 42 of the ECU 2 have restarted the control for the normal engine operation.

Figure 21:
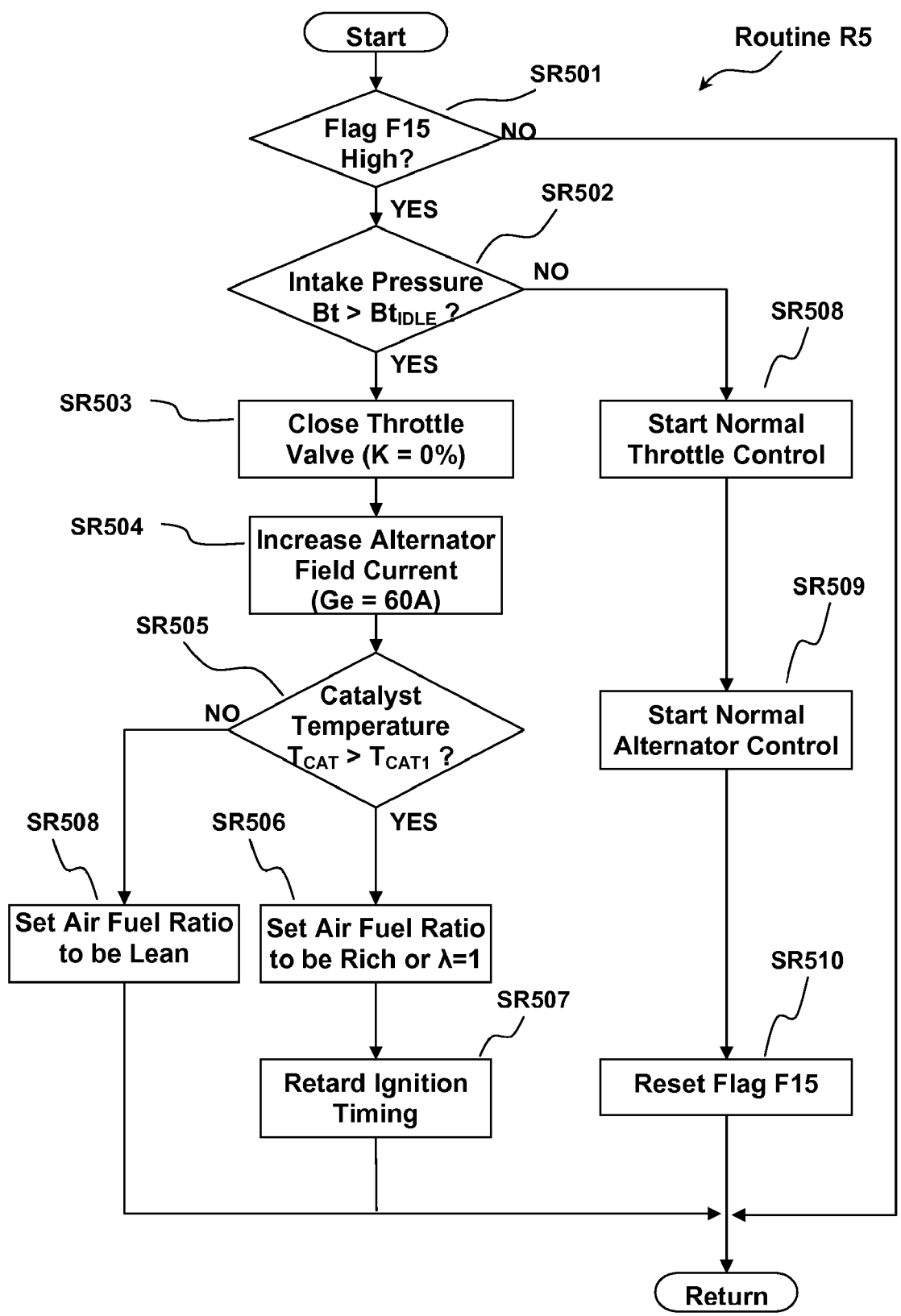
FIG. 21 is a flowchart showing a fifth stage of the engine restart control of FIG. 17.

The fifth or final stage of the engine restart control will now be described with reference to a flow chart of FIG. 21 which illustrates the fifth control routine R5. After the start, at a step SR501, the routine determines whether the flag F15 is High or Low. If it is Low, the routine returns and waits for the flag F15 to be High. If it is High, it proceeds to a step SR502 and determines whether or not an intake air pressure Bt detected by the intake air pressure sensor 26 is greater than a reference intake air pressure $Bt_{IDLE}$ which corresponds to an intake air pressure at a normal idle operation. If it is YES at the step SR502, it is supposed that there is too much air in the intake air passage 21 and the engine speed may increase too much. This may be unfavorable because it may cause an acceleration shock or cause a vehicle driver to feel uncomfortable.

If it is determined at the step SR502 that the intake air pressure Bt is greater than the reference value $Bt_{IDLE}$, the routine R5 proceeds to a step SR503 and the throttle control section 43 of the ECU 2 controls the actuator 24 to close the throttle valve, for example, fully close it (throttle opening K=0), thereby decreasing the intake air pressure Bt and the air amount to be inducted into the cylinders. Then, the routine R5 proceeds to a step SR504 and the alternator control section 44 of the ECU 2 controls the regulator circuit 28a to increase the field current Ge of the alternator 28, for example, to 60 A, thereby increasing the load on the engine 1 or the crankshaft. The steps SR503 and SR504 are continued until it is determined that the intake air pressure Bt is less than the reference value $Bt_{IDLE}$ (NO) at the step SR502.

After the step SR504, the routine R5 proceeds to a step SR505 and estimates a temperature of the catalyst 37 ($T_{CAT}$) from various parameters including the count value of the timer T2 which is stored in the step SR111 of the routine R1 and is corresponding to the time period of the engine stopping, and determines whether the catalyst temperature $T_{CAT}$ is lower than a reference value $T_{CAT1}$. If it is YES at the step SR504, it is considered the catalyst 37 is cooled down beyond a proper active temperature of the catalyst 37 during the engine stopping, then the routine R5 proceeds to a step SR506 and sets a target air fuel ratio to be the stoichiometry or richer than that ($\lambda \leq 1$) so that the fuel control section 41 of the ECU 2, which has started the normal control operation at the step SR418 of the routine R4, controls the fuel supply system 16 to inject fuel with the stoichiometric or rich air fuel ratio into the cylinders. Then, the routine R5 proceeds to a step SR507 and sets an ignition timing to be after the top dead center so that the ignition control section 42 of the ECU 2, which has also started the normal control operation at the step SR418 of the routine R4, controls the ignition system 27 to make a spark in the cylinder after the top dead center. Thereby, the exhaust gas temperature is raised so that the catalyst 37 is heated up while the generated torque is reduced, preventing too much increase of the engine speed.

On the other hand, if it is determined at the step SR505 that the catalyst temperature $T_{CAT}$ is lower than a reference value $T_{CAT1}$, it is considered the catalyst 37 is not cooled down during the engine stopping, then the routine proceeds to a step SR507 and sets the target air fuel ratio to be lean of the stoichiometry ($\lambda > 1$). Thereby, fuel consumption is reduced while the generated torque is reduced, preventing too much increase of the engine speed.

If it is determined that the intake air pressure MAP is less than the reference pressure $Bt_{IDLE}$ (NO) at the step SR502, it is considered that there is not too much air in the intake air passage 21 and any special control is needed. Then, the routine R5 proceeds to a step SR508, the throttle control section 43 starts its normal control operation. And, the routine R5 proceeds to a step SR509 and the alternator control section 44 starts its normal operation. Finally, the routine R5 proceeds to a step SR510 and resets the flag F15, finishing the engine restart control.

Figure 10:
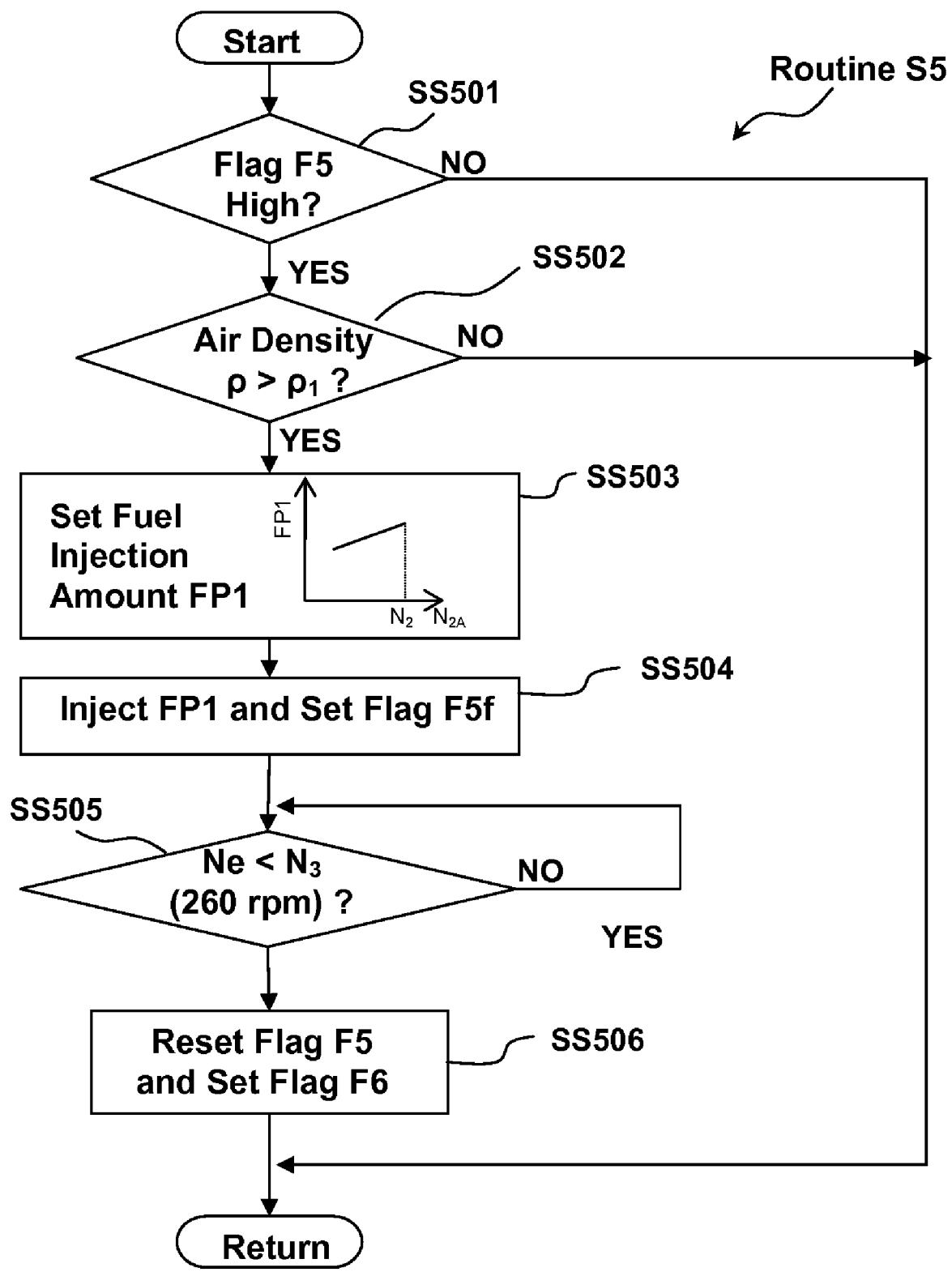
FIG. 10 is a flowchart showing a fifth stage of the engine stop control of FIG. 6.

Slower Combustion for the Compression Stroke Cylinder and Faster Combustion for the Expansion Stroke Cylinder According to this embodiment of the reverse rotational type of the idle stop control, when the compression stroke cylinder (cylinder #1) is in its intake stroke during the engine stop control, as show in FIG. 14 between the times t3 and t4, the fuel is injected into the compression stroke cylinder, specifically at the step SS504 of the routine S5 shown in FIG. 10. This fuel injected during the intake stroke is mixed well with the intake airflow, so that it is evaporated and atomized, thereby promoting the homogenization of the air fuel mixture.

Figure 18:
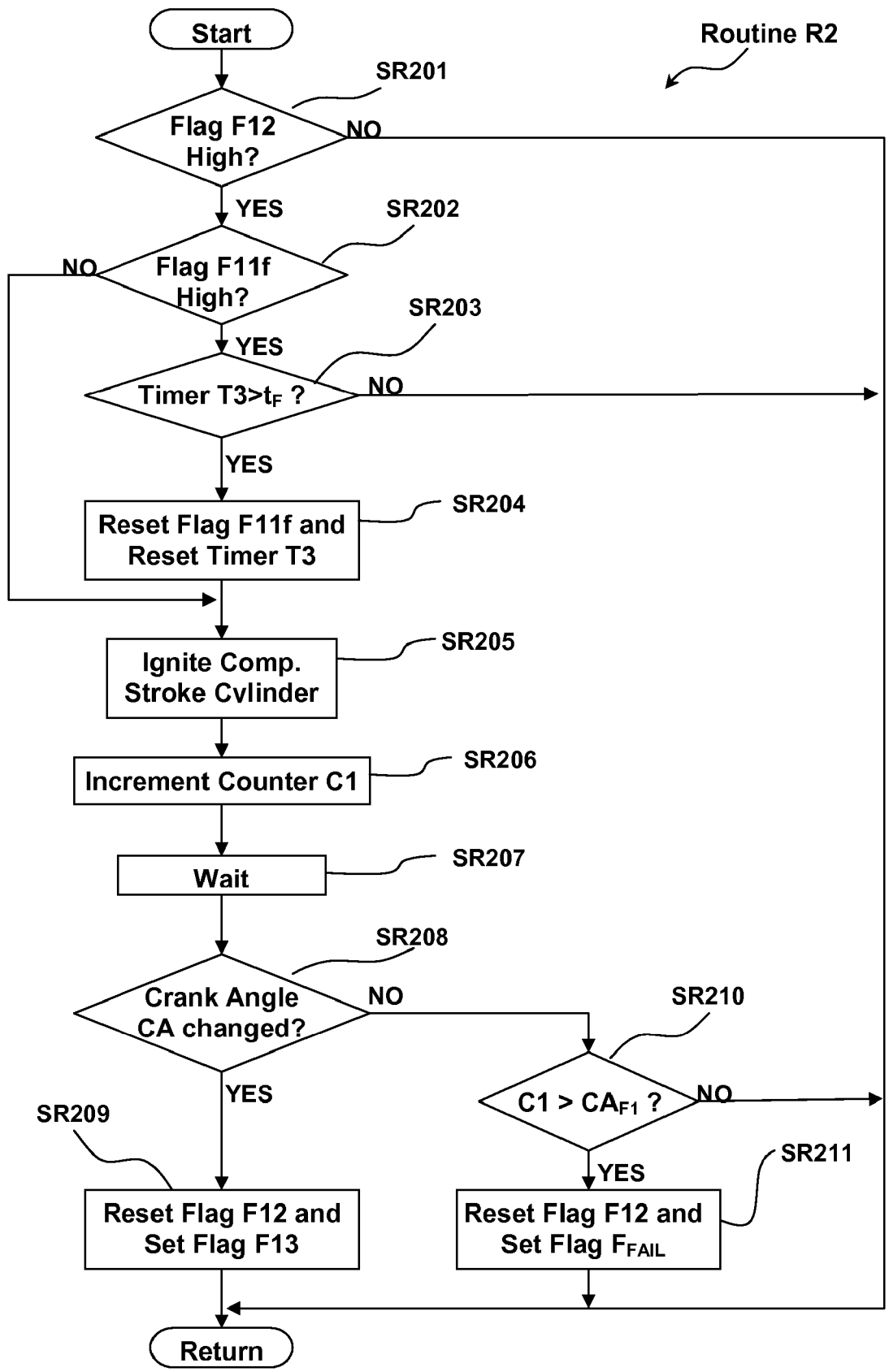
FIG. 18 is a flowchart showing a second stage of the engine restart control of FIG. 17.
Figure 23:
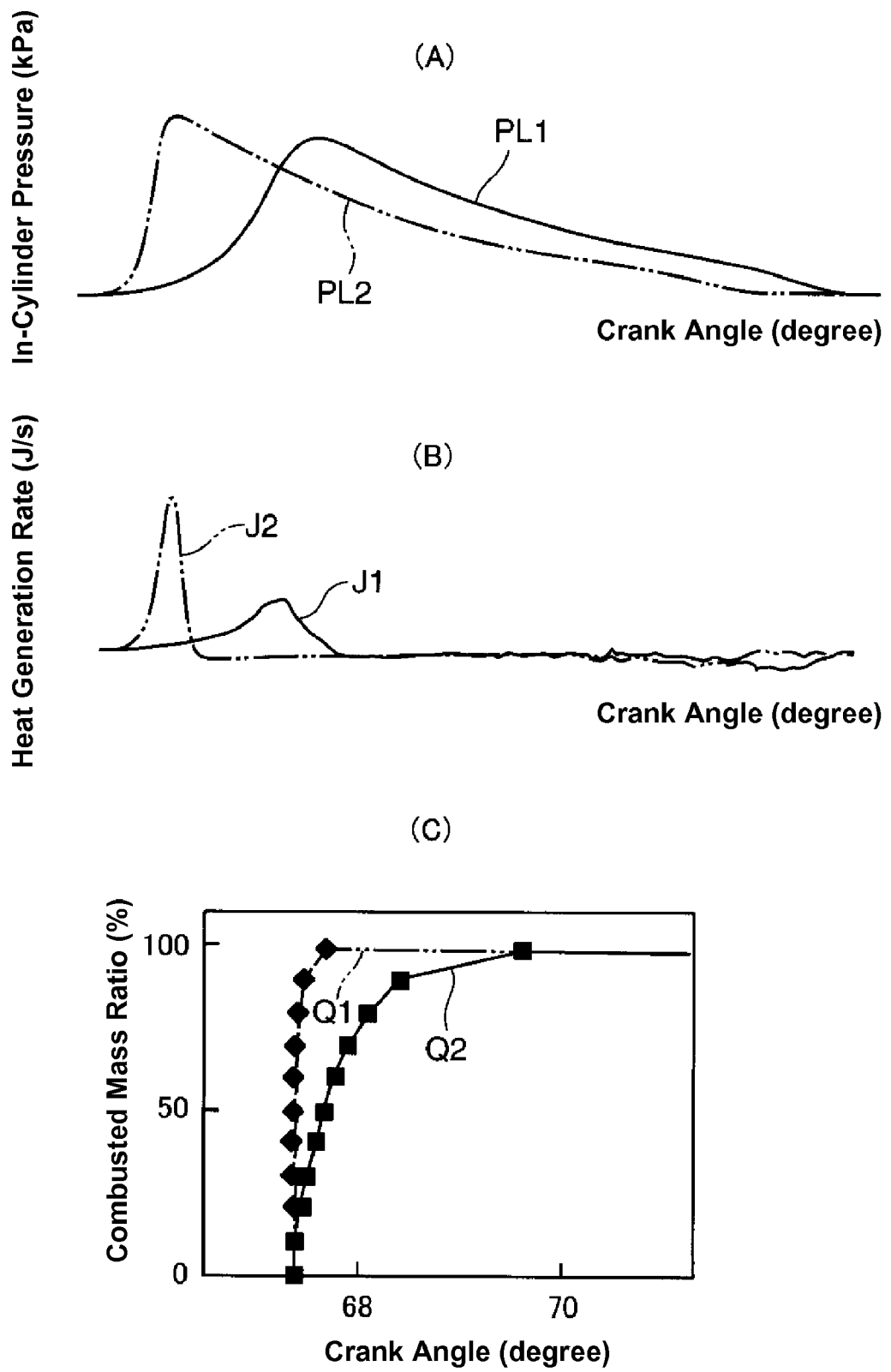
FIG. 23 illustrates graphs depicting characteristics of combustions in the cylinder.

In the engine restart control, specifically at the time zero in FIG. 22, the air fuel mixture in the compression stroke cylinder (#1) is ignited, specifically at the step SR205 of the routine R2 shown in FIG. 18. Then, the ignited mixture exerts the slower combustion, which may take, for example, 28 ms. Referring to FIG. 23, solid lines PL1, J1 and Q2 show a physical characteristic of the slower combustion in the present embodiment, and broken lines PL2, J2 and Q1 show a physical characteristic of the faster combustion for which fuel is injected into the compression stroke cylinder just before the ignition.

The slower combustion in the compression stroke cylinder may moderate the heat loss, which is caused by the cylinder wall absorbing the heat generated by the combustion, thereby enabling conversion of larger amount of the energy into the movement energy of the crankshaft 3 rotating in reverse. This movement energy in the reverse rotation turns into movement energy in the forward rotation through the reversal of the rotation or the change of rotational direction.

Figure 19:
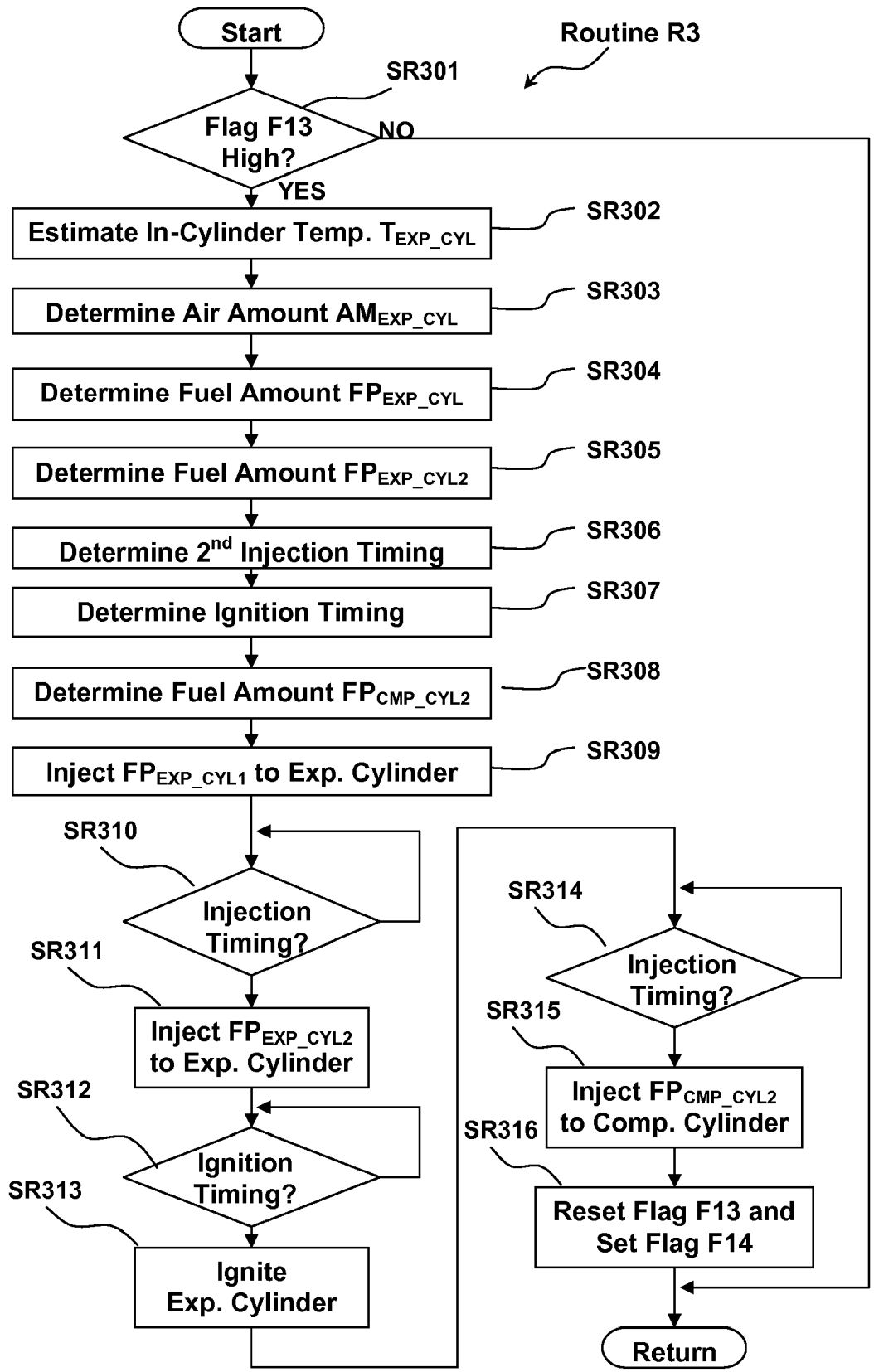
FIG. 19 is a flowchart showing a third stage of the engine restart control of FIG. 17.

On the other hand, as shown in FIG. 22, the fuel ($F_{PEXP\_CYL1}$ and $FP_{EXP\_CYL2}$) is injected to the cylinder #2 (expansion stroke cylinder), specifically at the steps SR306 and SR311 of the routine R3 shown in FIG. 19, and relatively shortly after it the spark is made, specifically at the steps SR313, thereby initiating the combustion. The rate of this combustion may be greater and the combustion may take shorter time period than that in the compression stroke cylinder (28 ms). So, the combustion time may be, for example, 15 ms, more preferably 11 ms.

The time difference between the last fuel injection and the ignition in the expansion stroke cylinder (#2 in FIG. 22) is set, specifically at the steps SR306 and SR307 of the routine R3 shown in FIG. 19, so that turbulence of the air fuel mixture caused by the fuel injection in the cylinder remains at the time of ignition. Therefore, the air fuel mixture is ignited when the turbulence remains, thereby making the combustion faster. The faster combustion enables the expansion stroke cylinder to generate larger energy within a limited piston stroke.

It will now be described how to set the injection timing to the expansion stroke cylinder in accordance with a specific engine configuration. The inventors herein have simulated several factors which may affect the combustion in the expansion stroke cylinder for a specific engine configuration.

Figure 24:
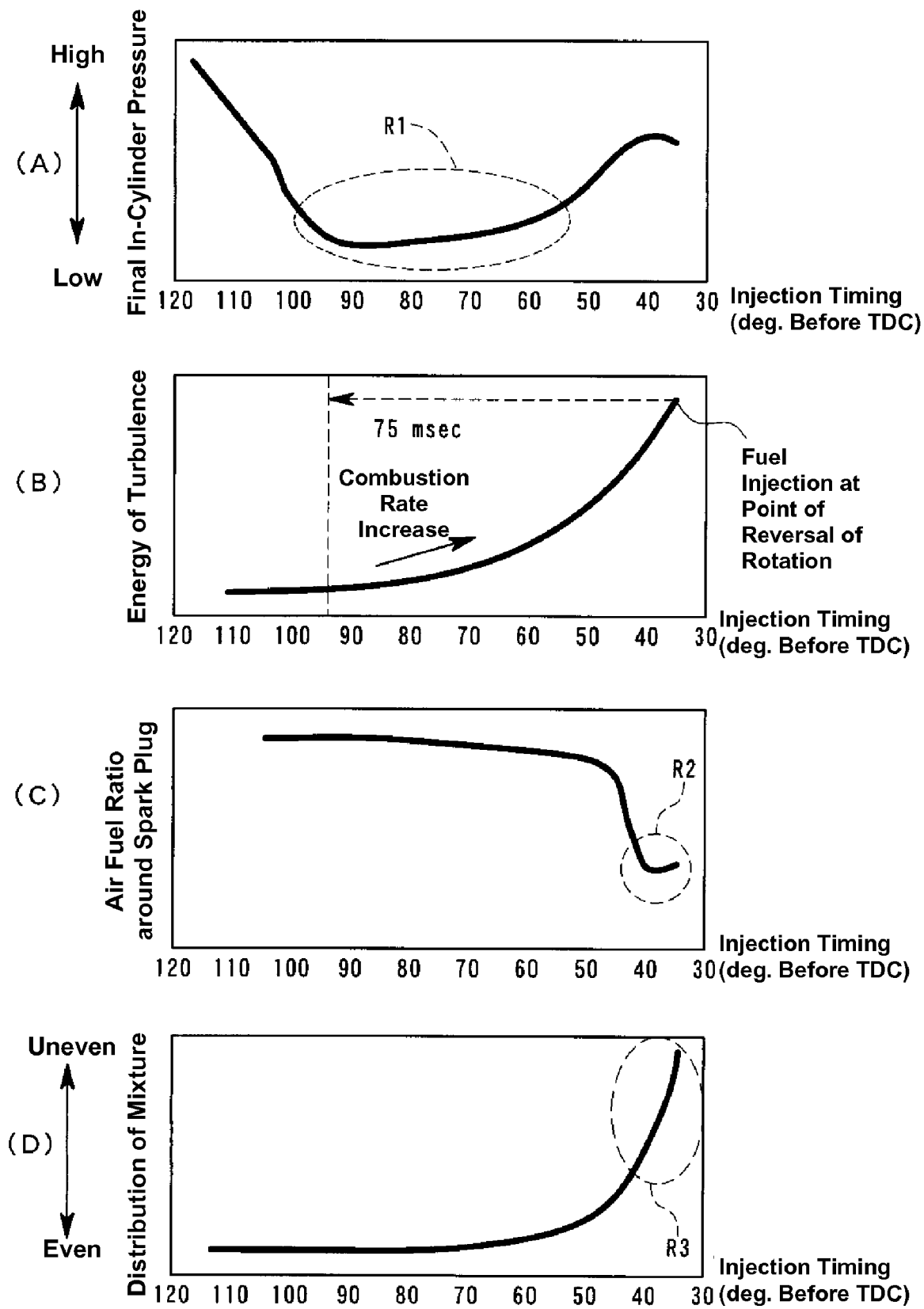
FIG. 24 illustrates graphs depicting characteristics in the cylinder when fuel injection timing is changed.

As shown in a graph (A) of FIG. 24, a pressure in the expansion stroke cylinder at the reversal of the rotation is at an acceptable level, when the fuel is injected between 105 degree crank angle before top dead center (° CA BTDC) and 45° CA BTDC during the reverse rotation. That acceptable level is preferred for making a piston stroke of the compression stroke cylinder after the reversal of the rotation to be longer. Further if the fuel is injected between 100 and 55° CA BTDC as shown by a preferred range R1, it is supposed that penetration of the injected fuel mist is reduced so that the fuel is less likely to adhere the cylinder wall thereby promoting evaporation and atomization of the fuel and further decreasing the pressure in the expansion stroke cylinder.

As show in a graph (B) of FIG. 24, energy of turbulence of the fuel mist increases as the injection timing is closer to the top dead center. The energy of turbulence means energy of random flow of the injected fuel mist. It is supposed that the combustion is faster as the energy of turbulence is greater.

As show in a graph (C) of FIG. 24, an air fuel ratio around the spark plug 15 is constant when the fuel is injected between 105 and 45° CA BTDC. When the fuel is injected after 45° CA BTDC, the air fuel ratio becomes too rich, so that the combustion may be slower. In this instance, the fuel injection timing is preferably 45° CA BTDC or before.

As show in a graph (C) of FIG. 24, a distribution of the mixture is evener when the fuel is injected before 45° CA BTDC. If it is injected after 40° CA BTDC, the mixture distribution becomes radically uneven and it is supposed that air usage ratio at the combustion is too low to combust the fuel appropriately. In this instance, the fuel injection timing is preferably 40° CA BTDC or earlier.

Figure 25:
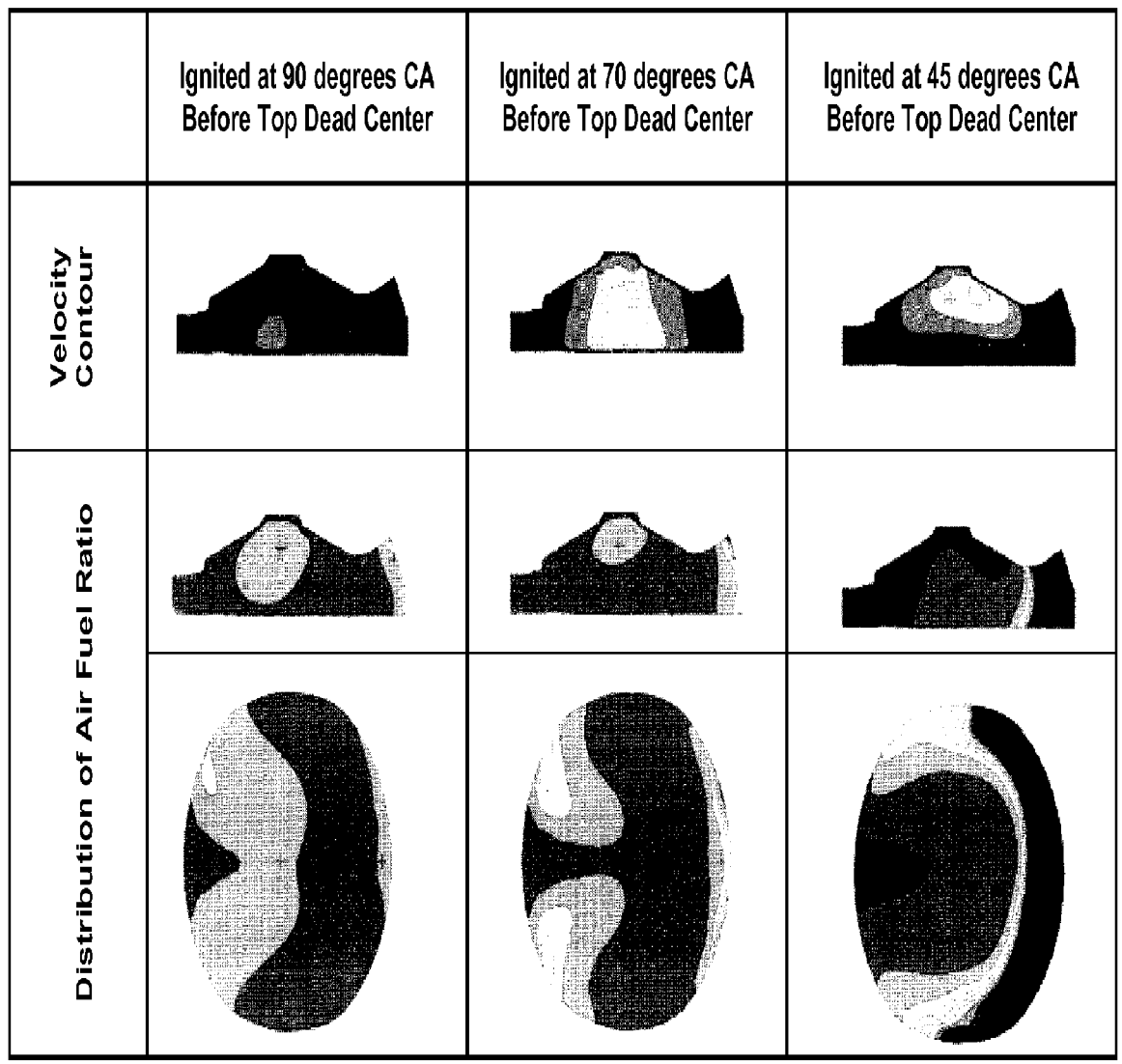
FIG. 25 illustrates states in the cylinder when fuel injection timing is changed.

FIG. 25 shows velocity contours of the air fuel mixtures and distribution of air fuel ratio in the expansion stroke cylinder when the piston is located relatively close to the top dead center after the fuel is injected respectively at 90, 70 and 45° CA BTDC. It can be seen from FIG. 25, within the preferable range R1 (the fuel injection between 100 and 55° CA BTDC), the turbulence is smaller and the air fuel ratio is relatively even. On the other hand, the fuel injection timing is relatively later (45° CA BTDC), the turbulence is larger and the air fuel ratio is relatively uneven.

From the foregoing, the inventors herein have reached a conclusion that if the fuel is dividedly injected between 90 and 60° CA BTDC, combination of preferable characters at the respective fuel injection timing can be obtained. For example, a first half of the fuel may be injected at 80° CA BTDC and the second half may be injected at 65° CA BTDC Then, the fuel mist may be ignited 30 ms after the second half, while the turbulence of the mist remains. Thereby, the first half fuel has a low penetration character because the piston is located relatively low at the injection timing and causes relatively even mixture distribution as shown in the graph (D) of FIG. 24, so that the first half fuel can effectively cool the air in the expansion stroke cylinder and effectively reduce the final in-cylinder pressure and increase a piston stroke. The second half fuel causes relatively higher energy of turbulence as shown in the graph (B) and is injected into the evenly distributed mixture of the first half fuel with relatively even air fuel ratio around the spark plug as shown in the graphs (C) and (D), so that relatively great turbulence energy may be generated. As a result of the greater piston stroke and the greater turbulence energy will make greater movement energy from the combustion in the expansion stroke cylinder.

The fuel injection to the expansion stroke cylinder may be divided into three, instead of two, and the timings may be 90, 75 and 60° CA BTDC.

Further in the case of the fuel injection divided into two, the injection timing for the first half may be between 90 and 70° CA BTDC, and that for the second half may be between 70° CA BTDC and the top dead center. In this case, there should be an interval of at least 2° CA or 1.5 ms, so that the reduced pressure by the in-cylinder cooling and the rapid homogeneous combustion described above can be achieved, thereby deriving the greater movement energy from the expansion stroke cylinder.

Engine Configurations for the Faster Combustion

Figure 26:
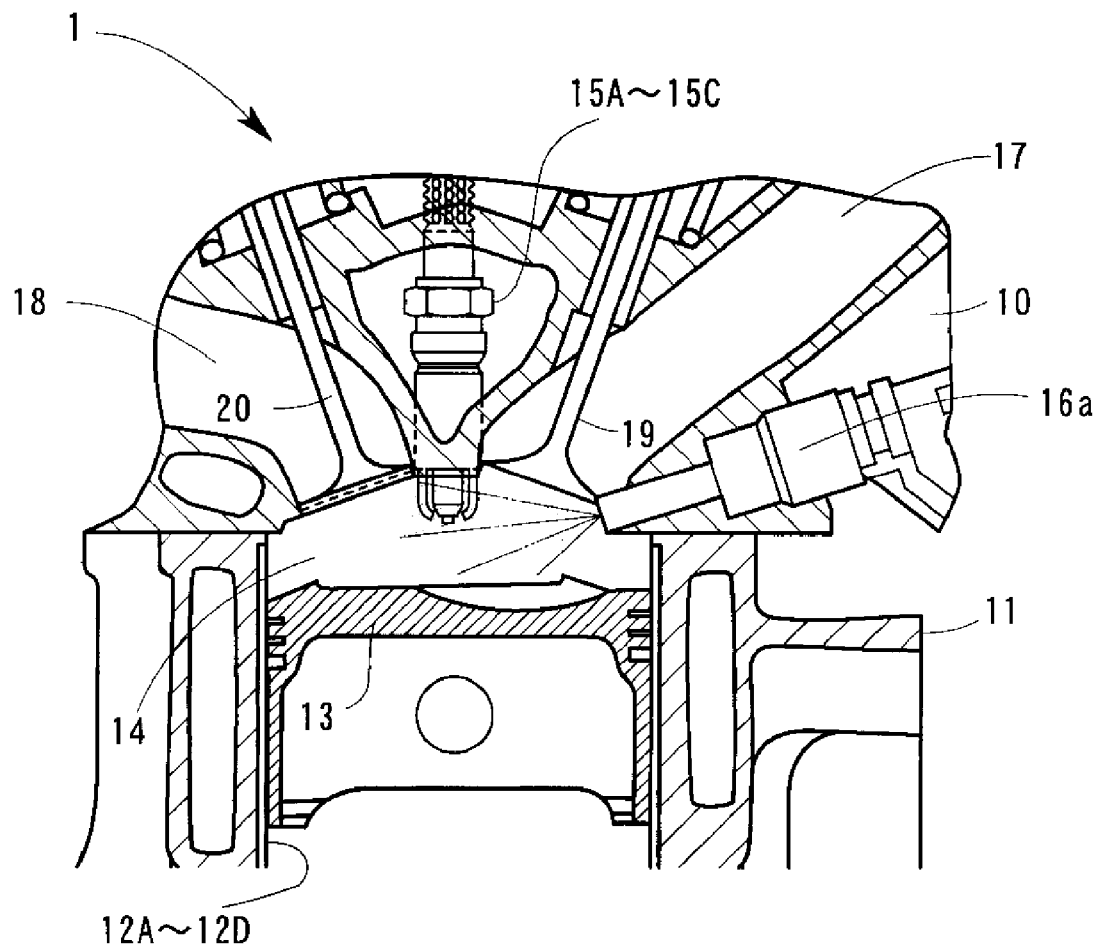
FIG. 26 is a sectional view of an engine cylinder according to another embodiment of the present description.
Figure 27:
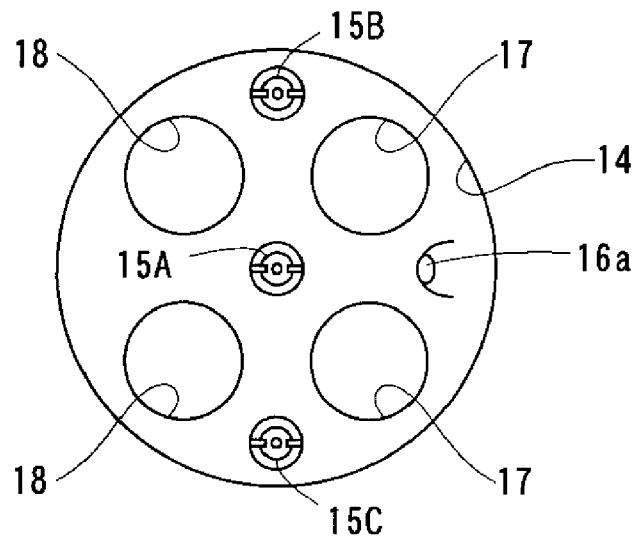
FIG. 27 is a plain view of the cylinder head showing three spark plugs according the embodiment of FIG. 26.

A different engine configuration may be employed for the faster combustion for the expansion stroke cylinder than for the compression stroke cylinder. At first, as shown in FIGS. 26 and 27, a multipoint spark ignition may be employed. Specifically, three spark plugs 15A through 15C are arranged on the cylinder head 10 and face the inside of the combustion chamber 14. The spark plug 15A is arranged at a center of the combustion chamber 14, while the spark plugs 15B and 15C are at a periphery of the combustion chamber 14. The ignition control section 42 of the ECU 2 may independently control the spark of the three spark plugs 15A through 15C through the ignition system 27. The injector 16a of the multi-hole type may inject fuel toward each of the three spark plugs 15A through 15C.

Figure 28:
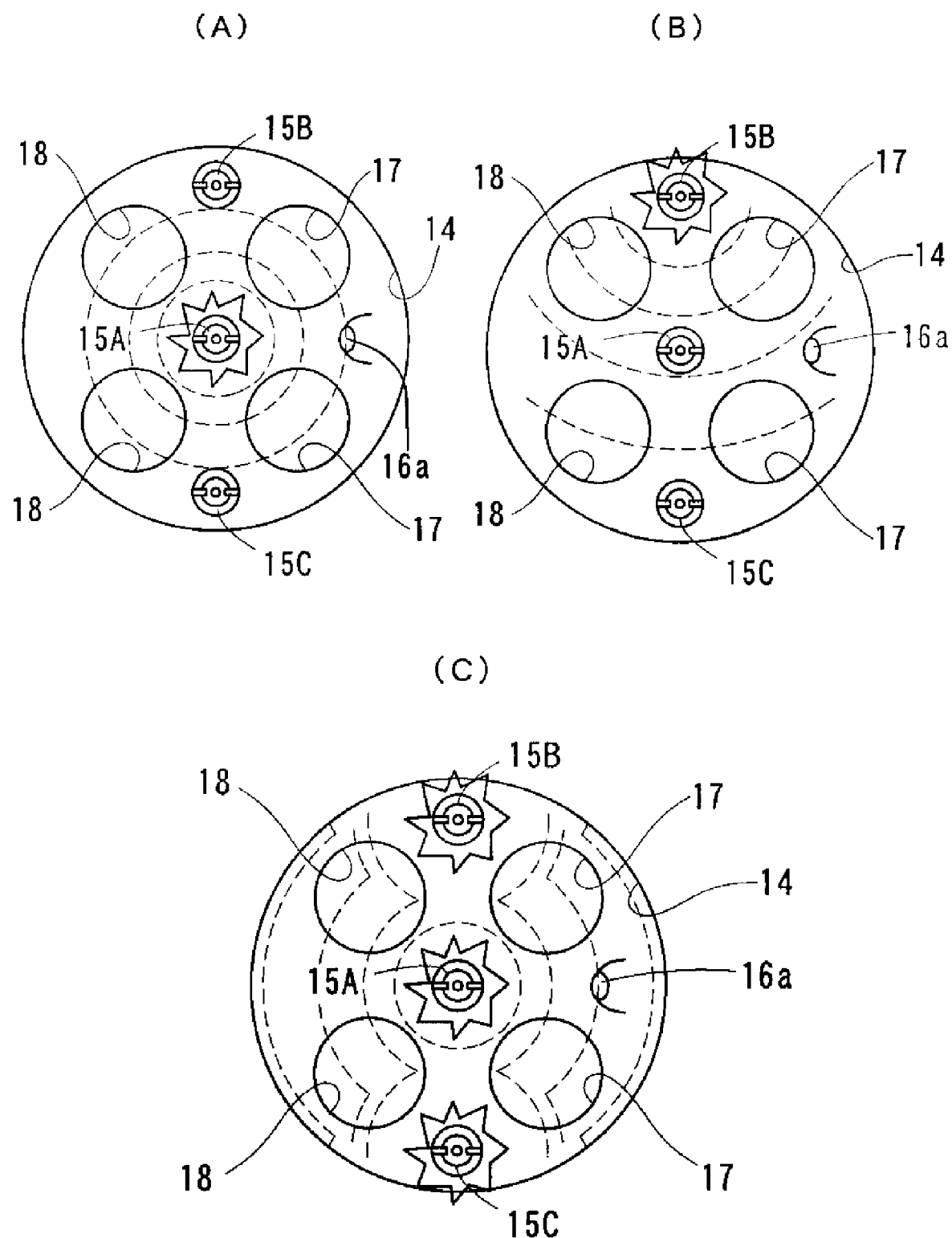
FIG. 28 illustrates three different spark patterns of the embodiment of FIG. 26.
Figure 29:
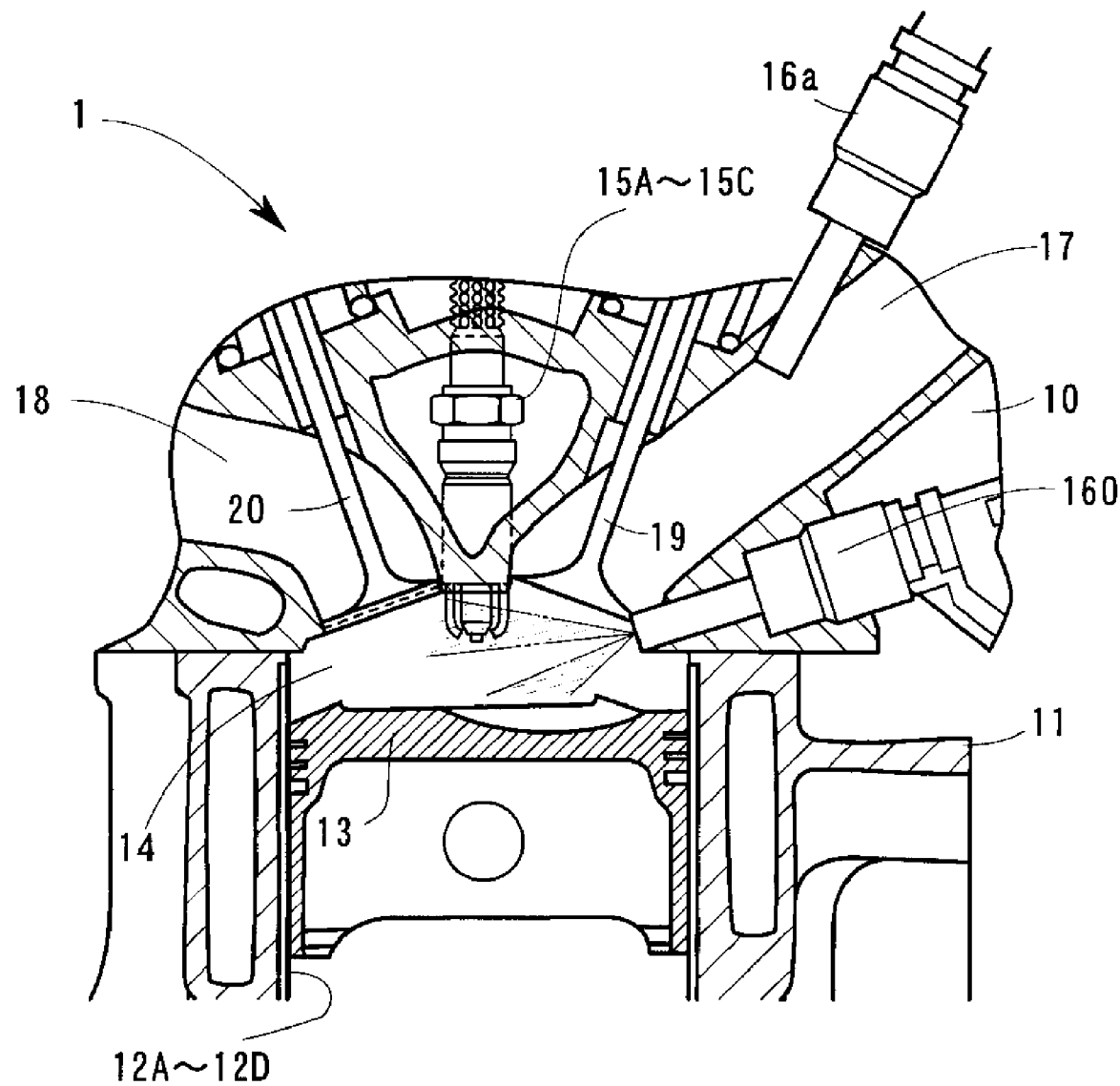
FIG. 29 is a sectional view of an engine cylinder according to another embodiment of the present description.
Figure 30:
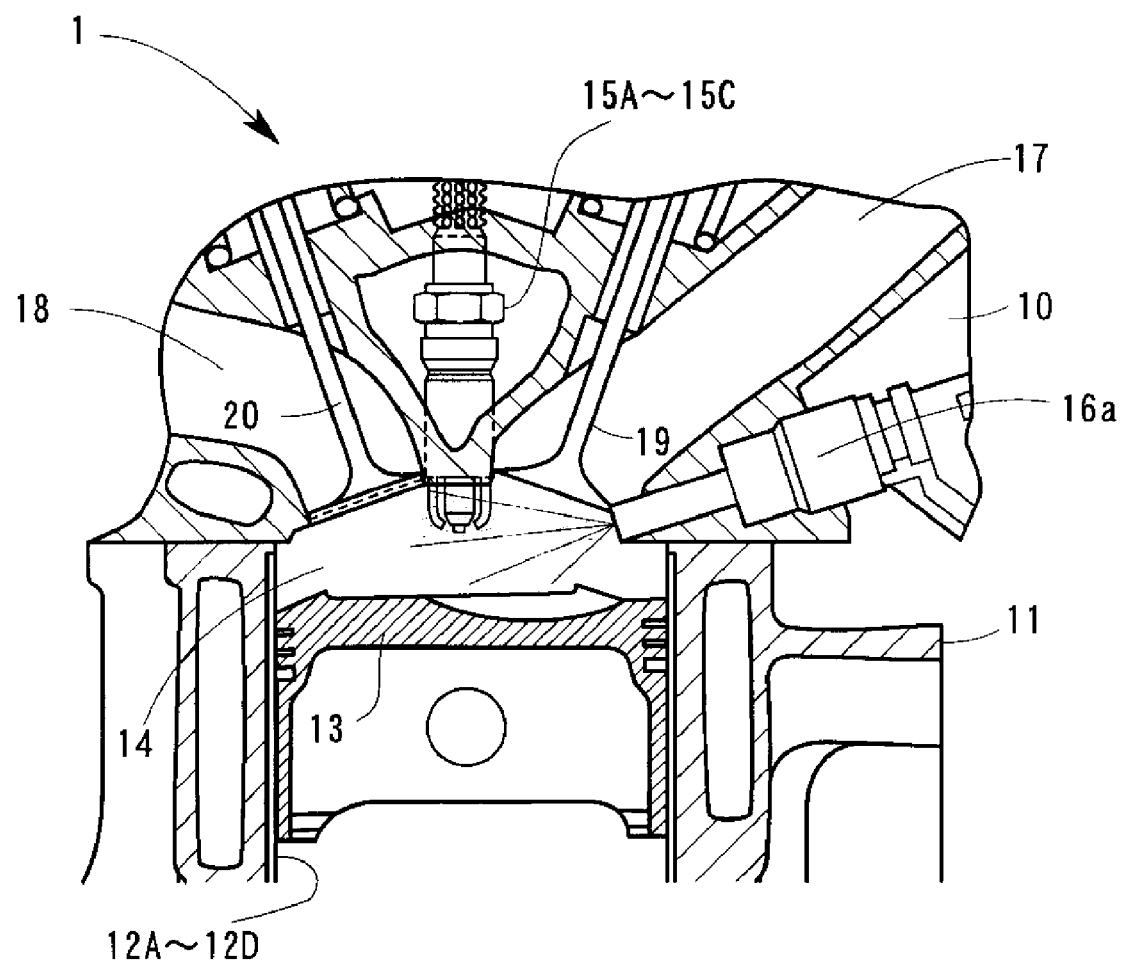
FIG. 30 is a sectional view of an engine cylinder according to further another embodiment of the present description.
Figure 31:
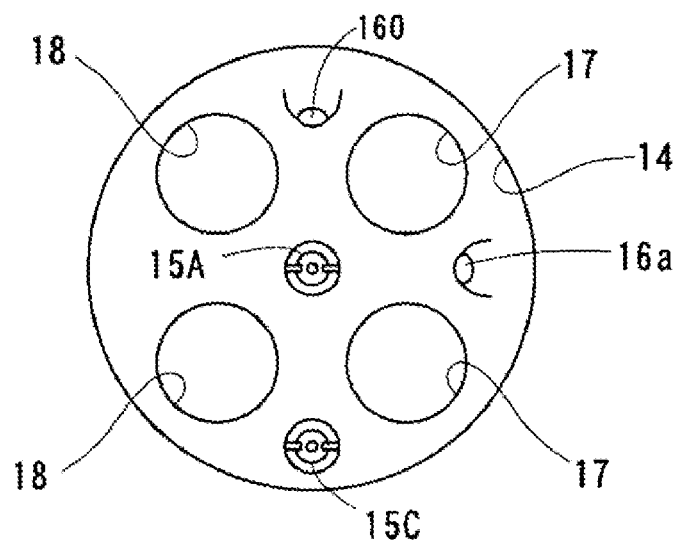
FIG. 31 is a plain view of the cylinder head according to the embodiment of FIG. 30.

When the compression stroke cylinder is ignited at the step SR205 in FIG. 18, as shown in FIG. 22 at the time zero, only one or two of the three plugs 15A through 15C may spark, as shown in a diagram (A) or (B) of FIG. 28, thereby causing slower combustion. On the other hand, when the expansion stroke cylinder is ignited at the step SR312, all of the three spark plugs may spark simultaneously, as shown in a diagram (C) of FIG. 28, thereby exerting multipoint flame and shortening the flame propagation distance. Consequently, the shorter distance of flame propagation makes combustion at the expansion stroke cylinder faster than the combustion at the compression stroke cylinder.

Further, FIGS. 22 through 24 show other configurations of the engine 1 for the faster combustion at the expansion stroke cylinder. An additional injector 160 is arranged and faces the inside of the combustion chamber 14. The additional injector 160 injects fuel which is easier to ignite than the fuel injected from the fuel injector 16a. For example, in the case of gasoline injected from the injector 16a, the additional injector 160 may inject hydrogen or mixture of gasoline and hydrogen. By only using the fuel injector 16a for the compression stroke cylinder, and only using the additional injector 160 for the expansion stroke cylinder, the combustion at the expansion stroke cylinder may be faster than that at the compression stroke cylinder, because of the difference of the ignitability levels.

Forward Rotational Type of Idle Stop Control

Now, a forward rotational type of idle stop control will be described. At the time of restarting the engine 1, fuel may already exist in a cylinder which has stopped in its expansion stroke (expansion stroke cylinder). Then, a spark is made in the expansion stroke cylinder, thereby initiating combustion. The first combustion for restarting the engine is for the forward rotation, rather than the reverse rotation in the case of the reverse rotational type of idle stop control described above. However, a piston stroke of the expansion stroke cylinder is limited and there is no force acting on the crankshaft 3 such as the rotational inertia and the compressive counterforce, so that the first combustion should be slower than the following combustions.

Figure 32:
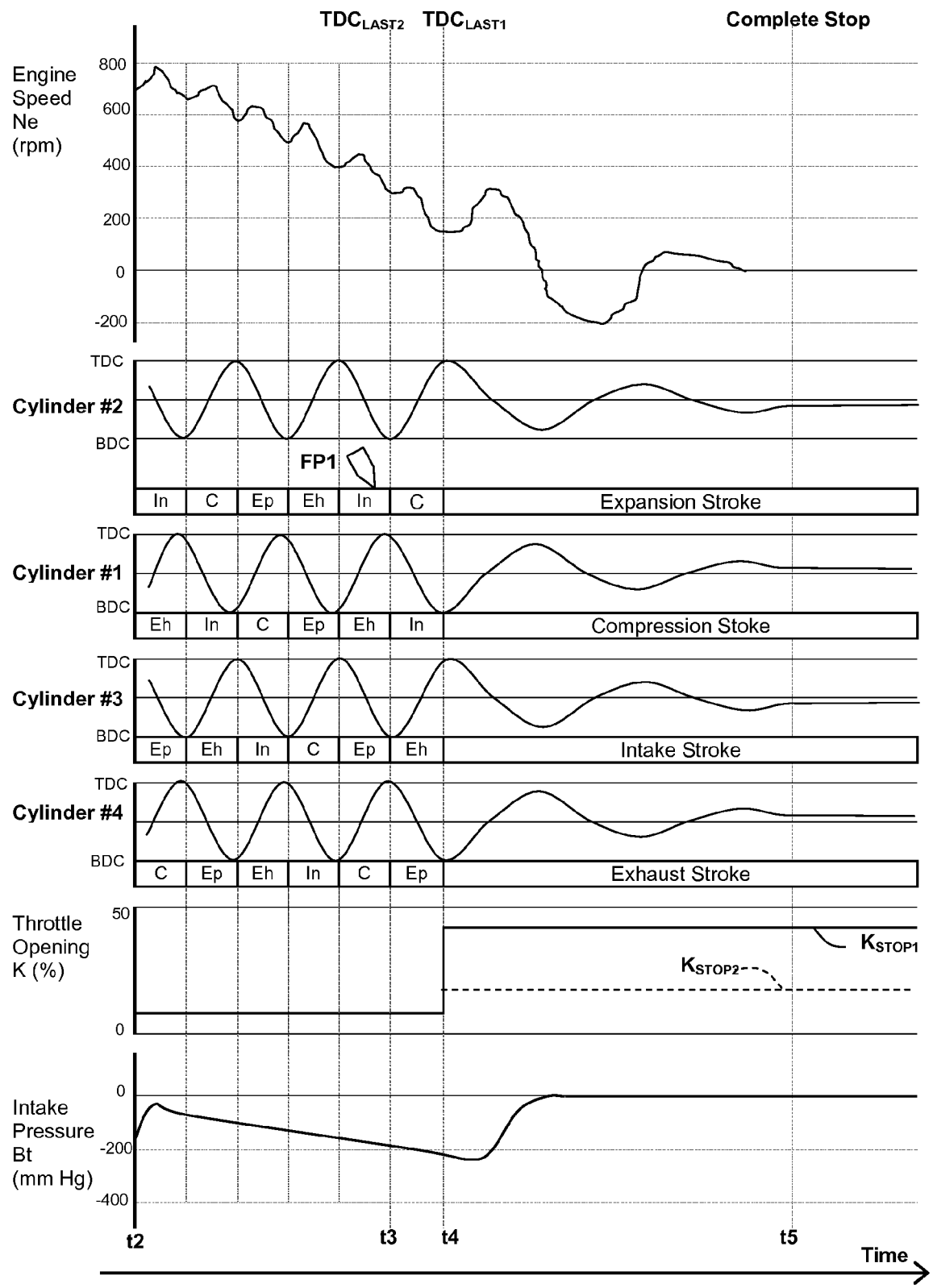
FIG. 32 is a diagram similar to FIG. 14, but depicting fuel injection during engine stop control of a forward rotational type of engine stop control according to another embodiment of the present description.

The idle stop control of the forward rotation type consists of an engine stop control and an engine restart control. For the engine stop control, similar control routines to those of the engine stop control of the reverse rotational type are employed, except that the fuel injection at the step SS504 of the routine S5 is made to the expansion stroke cylinder or the cylinder #2, as shown in FIG. 32. Further, the steps SS702, SS703, SS705 and SS706 are not needed for the forward rotation type of the idle stop control.

Figure 33:
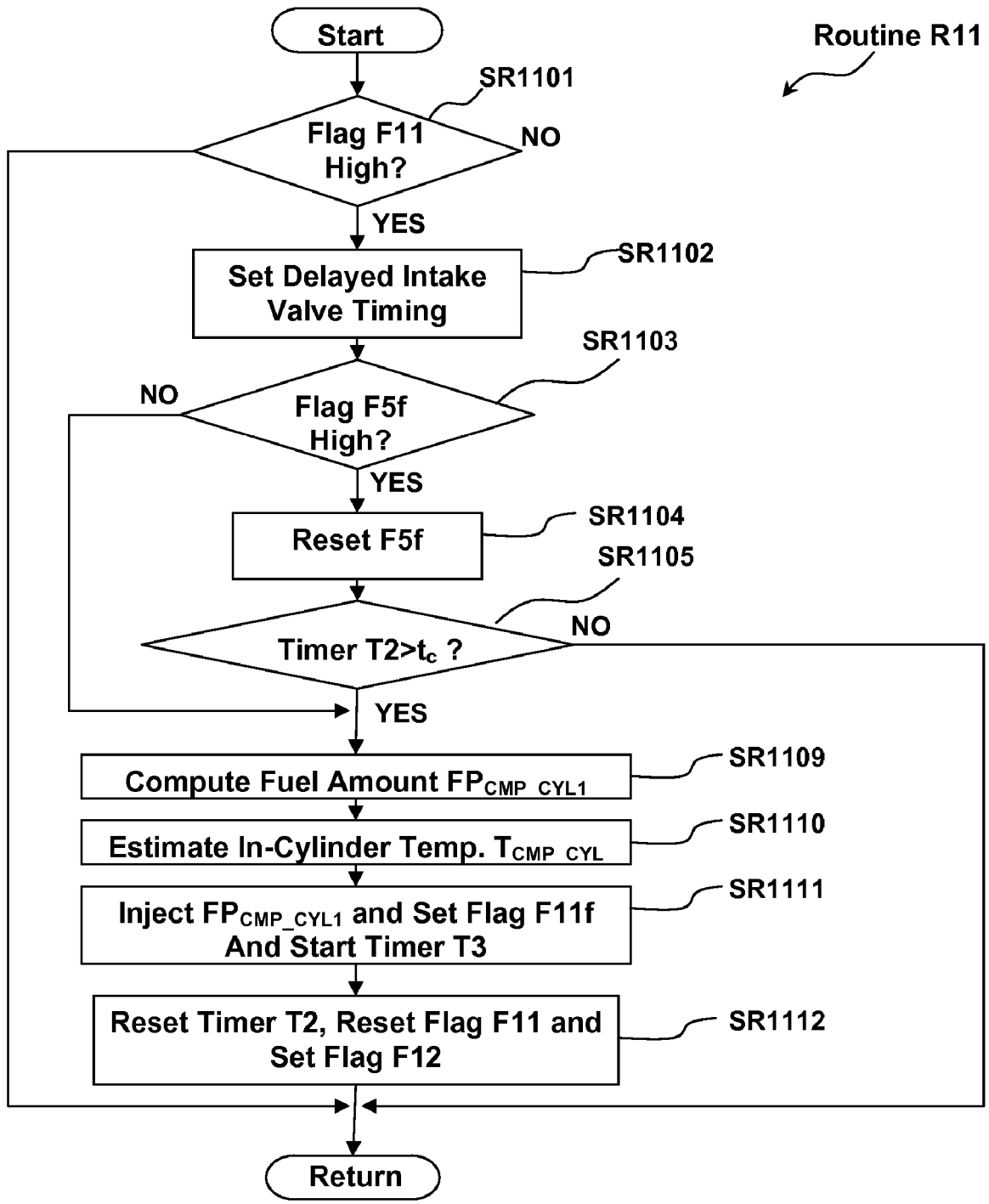
FIG. 33 is a flowchart showing a first stage of engine restart control of the forward rotational type of idle stop control.

For the engine restart control, similar control routines to those of the reverse rotational type are employed. For example, the first stage of the engine restart control, a routine R11 is run, as shown in FIG. 33. The routine R11 is similar to the routine R1 of the reverse rotational type, except for the steps SR106, SR107 and SR108 shown in FIG. 17. Further, fuel $FP_{EXP\_CYL}$ is injected into the expansion stroke cylinder or the cylinder #3, as shown in FIG. 34.

Figure 34:
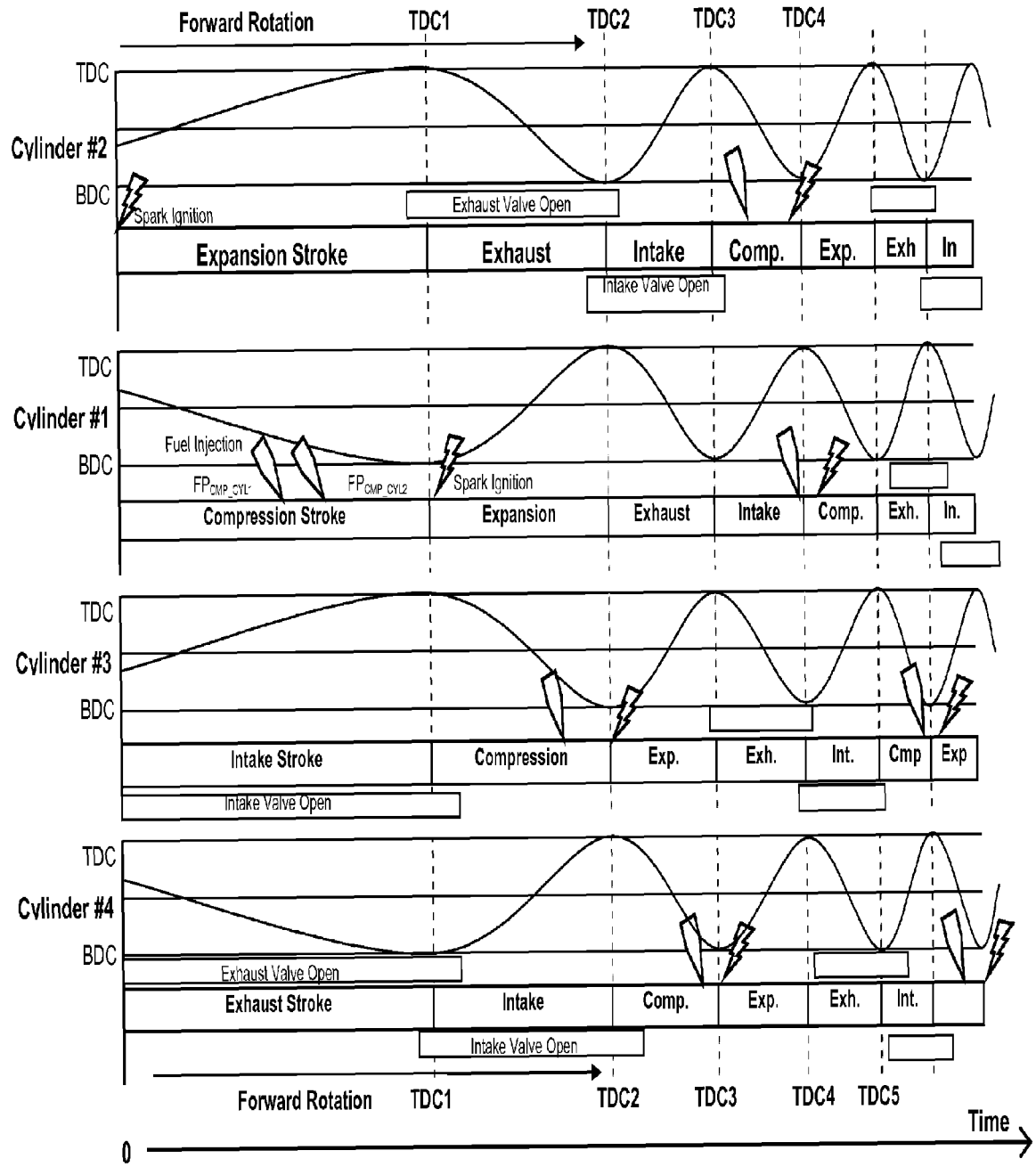
FIG. 34 is a diagram similar to FIG. 22 for the engine restart control of the forward rotational type of idle stop control.

After the first stage of the engine restart control or the routine R11, control routines similar to the routines R2 through R5 are taken, in which fuel injection and spark ignition are made in a sequence as shown in FIG. 34. Especially, amount of fuel injection and timing to the compression stroke cylinder are determined in the routine R3, in the same manner as for the reverse rotational type of the idle stop control, taking into account of the combustion rate described above. So, the combustion made in the compression stroke is faster than the combustion made in the expansion stroke.

It is needless to say that the invention is not limited to the illustrated embodiments and that various improvements and alternative designs are possible without departing from the substance of the invention as claimed in the attached claims.

The invention claimed is:

1. A method for starting a spark ignition engine having multiple cylinders, comprising:
   determining a first cylinder before said engine completely stops; and
   supplying air and initial fuel for restart into the first cylinder without said spark ignition before said engine completely stops; and
   igniting the mixture of said air and said fuel in said first cylinder in response to an engine restart request after said engine completely stops, wherein said first cylinder is on an expansion stroke when said engine stops, wherein an amount of said fuel for restart is greater as an engine speed at a second to last top dead center is greater.

2. The method as described in claim 1, further comprising:
   after a piston in said first cylinder starts moving, injecting fuel into a second cylinder that is on a compression stroke when said engine stops, on a compression stroke where a piston of said second cylinder is moving in a direction opposite to an operative direction of said piston in said first cylinder.

3. The method as described in claim 1, further comprising injecting additional fuel into said first cylinder in response to said engine restart request in accordance with a certain condition.

4. The method as described in claim 3, wherein said additional fuel is injected in response to said engine restart request before said engine completely stops if a certain time period has passed since the supplying of air and initial fuel for restart into the first cylinder.

5. The method as described in claim 1, further comprising:
   injecting fuel into a second cylinder in response to said engine restart request, said second cylinder being on a compression stroke, when said engine stops; and
   igniting the mixture of air and fuel in said second cylinder after the mixture in said first cylinder is ignited and the engine rotates in a forward direction.

6. The method as described in claim 5, wherein
   just after engine restart, combustion made in said second cylinder is faster than combustion made in the first cylinder.

7. The method as described in claim 5, wherein
   an air fuel ratio in said second cylinder is stoichiometric or rich.

8. The method as described in claim 5, wherein
   said fuel injected into said second cylinder is split into a first amount of fuel injected earlier and a second amount of fuel injected later.

9. A method for starting a spark ignition engine having multiple cylinders, comprising:
   determining a first cylinder before said engine completely stops;
   supplying air and initial fuel for restart into the first cylinder without said spark ignition before said engine completely stops; and
   igniting the mixture of said air and said fuel in said first cylinder in response to an engine restart request after said engine completely stops, wherein said first cylinder is on an expansion stroke when said engine stops, wherein
   when air density of atmosphere is below a reference value, said supplying air and fuel for restart into a first cylinder before said engine completely stops is not implemented.

10. The method as described in claim 9, further comprising injecting a fuel for restart into said first cylinder in response to said engine restart request if said supplying air and fuel for restart into the first cylinder before said engine completely stops is not implemented.

11. A method for starting a spark ignition engine having multiple cylinders, comprising:
   determining a first cylinder before said engine completely stops;
   supplying air and initial fuel for restart into the first cylinder without said spark ignition before said engine completely stops; and
   igniting the mixture of said air and said fuel in said first cylinder in response to an engine restart request after said engine completely stops, wherein said first cylinder is on an expansion stroke when said engine stops, wherein
   when an engine speed at a second to last top dead center is greater than a specific speed, an amount of intake air for said engine is increased.

12. A method for starting a spark ignition engine having multiple cylinders, comprising:
   determining a first cylinder before said engine completely stops;
   supplying air and initial fuel for restart into the first cylinder without said spark ignition before said engine completely stops; and
   igniting the mixture of said air and said fuel in said first cylinder in response to an engine restart request after said engine completely stops, wherein said first cylinder is on an expansion stroke when said engine stops, wherein
   when an intake air pressure at a second to last top dead center is greater than a specific speed, an amount of intake air for said engine is increased.

13. An engine operating system for operating a spark ignition engine having multiple combustion cylinders with a spark plug, comprising:
   an air intake device for supplying air into said cylinder;
   a fuel injector for supplying fuel into said cylinder;
   an engine speed sensor;
   a driver operation sensor for determining an engine stop request or an engine restart request; and
   a controller configured to communicate with said engine speed sensor and said driver operation sensor, to control said air intake device, said fuel injector, and said spark plug, to determine a first cylinder before said engine completely stops, and to control such that air and fuel for restart are provided into the first cylinder without said spark ignition before said engine completely stops and a mixture of said air and said fuel in said first cylinder is ignited in response to the engine restart request after said engine completely stops, wherein said first cylinder is on an expansion stroke when said engine stops, and wherein an amount of said fuel for restart is greater as an engine speed at a second to last top dead center is greater.

14. An engine operating system for operating a spark ignition engine having multiple combustion cylinders with a spark plug, comprising:
   an air intake device for supplying air into said cylinder;
   a fuel injector for supplying fuel into said cylinder;
   an engine speed sensor;
   a driver operation sensor for determining an engine stop request or an engine restart request; and
   a controller configured to communicate with said engine speed sensor and said driver operation sensor, to control said air intake device, said fuel injector, and said spark plug, to determine a first cylinder before said engine completely stops, and to control such that air and fuel for restart are provided into the first cylinder without said spark ignition before said engine completely stops and a mixture of said air and said fuel in said first cylinder is ignited in response to the engine restart request after said engine completely stops, wherein said first cylinder is on an expansion stroke when said engine stops, and wherein when air density of atmosphere is below a reference value, said supplying air and fuel for restart into the first cylinder before said engine completely stops is not implemented.

15. An engine operating system for operating a spark ignition engine having multiple combustion cylinders with a spark plug, comprising:
   an air intake device for supplying air into said cylinder;
   a fuel injector for supplying fuel into said cylinder;
   an engine speed sensor;
   a driver operation sensor for determining an engine stop request or an engine restart request; and
   a controller configured to communicate with said engine speed sensor and said driver operation sensor, to control said air intake device, said fuel injector, and said spark plug, to determine a first cylinder before said engine completely stops, and to control such that air and fuel for restart are provided into the first cylinder without said spark ignition before said engine completely stops and a mixture of said air and said fuel in said first cylinder is ignited in response to the engine restart request after said engine completely stops, wherein said first cylinder is on an expansion stroke when said engine stops, and wherein when an engine speed at a second to last top dead center is greater than a specific speed, an amount of intake air for said engine is increased.

16. An engine operating system for operating a spark ignition engine having multiple combustion cylinders with a spark plug, comprising:
   an air intake device for supplying air into said cylinder;
   a fuel injector for supplying fuel into said cylinder;
   an engine speed sensor;
   a driver operation sensor for determining an engine stop request or an engine restart request; and
   a controller configured to communicate with said engine speed sensor and said driver operation sensor, to control said air intake device, said fuel injector, and said spark plug, to determine a first cylinder before said engine completely stops, and to control such that air and fuel for restart are provided into the first cylinder without said spark ignition before said engine completely stops and a mixture of said air and said fuel in said first cylinder is ignited in response to the engine restart request after said engine completely stops, wherein said first cylinder is on an expansion stroke when said engine stops, and wherein when an intake air pressure at a second to last top dead center is greater than a specific speed, an amount of intake air for said engine is increased.

* * * * *